(12) United States Patent
Nakamura et al.

(10) Patent No.: US 7,331,856 B1
(45) Date of Patent: Feb. 19, 2008

(54) GAME APPARATUS, INPUT DEVICE USED IN GAME APPARATUS AND STORAGE MEDIUM

(75) Inventors: Shun Nakamura, Tokyo (JP); Takao Itagaki, Tokyo (JP); Mitsuru Kawamura, Tokyo (JP); Yutaka Yokoyama, Tokyo (JP); Hideyuki Yamada, Tokyo (JP); Kenji Tosaki, Tokyo (JP); Atsunori Himoto, Tokyo (JP); Takashi Abe, Tokyo (JP); Kazuhiro Takayama, Tokyo (JP); Takanori Hasumi, Tokyo (JP)

(73) Assignee: Sega Enterprises, Ltd. (JP)

( * ) Notice: Subject to any disclaimer, the term of this patent is extended or adjusted under 35 U.S.C. 154(b) by 0 days.

(21) Appl. No.: 09/657,154

(22) Filed: Sep. 7, 2000

(30) Foreign Application Priority Data

| Sep. 7, 1999 | (JP) | ................................. 11-253171 |
| Oct. 25, 1999 | (JP) | ................................. 11-303172 |
| Dec. 3, 1999 | (JP) | ................................. 11-345491 |
| Mar. 6, 2000 | (JP) | ............................. 2000-060918 |
| May 26, 2000 | (JP) | ............................. 2000-156852 |

(51) Int. Cl.
*A63F 13/00* (2006.01)

(52) U.S. Cl. ......................................................... 463/7

(58) Field of Classification Search ................ 463/2–5, 463/7, 36–38; 345/156, 158; 434/247, 307 R, 434/250, 258
See application file for complete search history.

(56) References Cited

U.S. PATENT DOCUMENTS

| 5,009,501 A | * | 4/1991 | Fenner et al. ............ 356/141.3 |
| 5,229,756 A | * | 7/1993 | Kosugi et al. .............. 345/156 |
| 5,649,861 A | * | 7/1997 | Okano et al. ................. 463/30 |
| 5,733,193 A | * | 3/1998 | Allard et al. .................. 463/8 |
| 5,741,182 A | * | 4/1998 | Lipps et al. .................. 463/36 |
| 5,833,549 A | * | 11/1998 | Zur et al. .................... 434/247 |
| 6,001,013 A | * | 12/1999 | Ota ............................ 434/250 |
| 6,146,278 A | * | 11/2000 | Kobayashi .................. 345/156 |
| 6,184,863 B1 | * | 2/2001 | Sibert et al. ................. 345/156 |
| 6,225,547 B1 | * | 5/2001 | Toyama et al. ............... 84/609 |
| 6,227,968 B1 | * | 5/2001 | Suzuki et al. ............... 434/250 |
| 6,234,479 B1 | * | 5/2001 | Watanabe et al. ....... 273/148 B |
| 6,320,110 B1 | * | 11/2001 | Ishikawa et al. ........ 434/307 A |
| 6,379,244 B1 | * | 4/2002 | Sagawa et al. ......... 434/307 A |

OTHER PUBLICATIONS

World Class Track Meet. Review [online]. Nintendo of America Inc, 1988 [retrieved on Aug. 13, 2002]. Retrieved from the Internet: <URL:www.clearvisiongaming.com/classic/99961036240899.shtml>.*

* cited by examiner

*Primary Examiner*—Kim Nguyen
(74) *Attorney, Agent, or Firm*—Dickstein Shapiro LLP

(57) ABSTRACT

A video monitor 13 is provided on the front surface of a game apparatus casing 2. An operation panel 11 is provided immediately below the video monitor 13. Light detection units 15 for detecting a position provided on both side of the upper end. In the game apparatus casing below the video monitor 13 there are provided a game processing board 10 for generally controlling the game apparatus, an operation device control board 16 for controlling maraca-shaped operation device 20 operated by a game player, and a position detecting board 17 for detecting a position of the operation device 20. The game apparatus enables a game player to operate operation device by natural motions without directly operating the operation device, etc.

9 Claims, 50 Drawing Sheets

FIG. 11
(a)   (b) 
(c)   (d) 
(e)   (f) 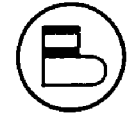
(g)   (h) 
(i)   (j) 
(k)   (l) 
(m) 
(n) 

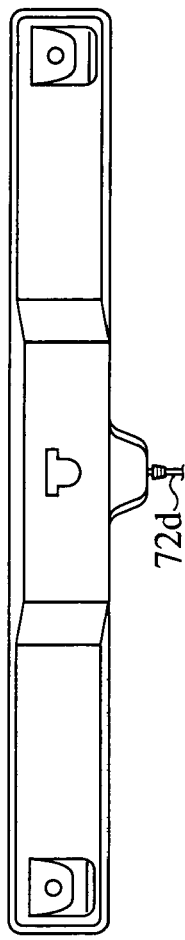
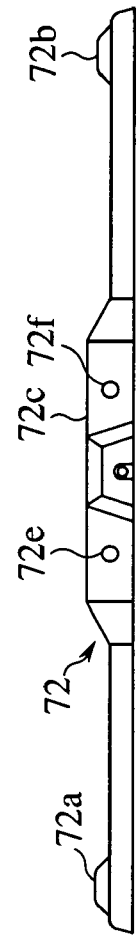
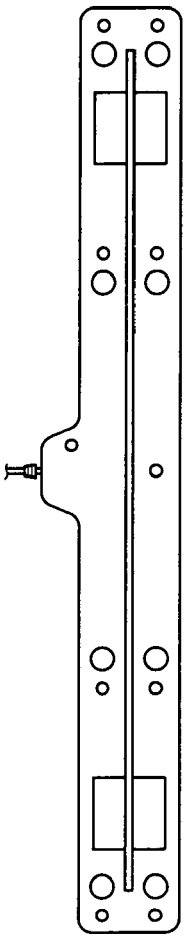
FIG. 34B
FIG. 34C
FIG. 34A
FIG. 34D
FIG. 34F
FIG. 34E

FIG. 39A CONTROL SIGNAL FROM GAME APPARATUS

FIG. 39B INITIAL TRANSMISSION SIGNALS OF PORT A AND PORT C

FIG. 39C TRANSMISSION SIGNALS OF PORT B AND PORT D

OPERATION MEANS

GAME APPARATUS

GAME APPARATUS, INPUT DEVICE USED IN GAME APPARATUS AND STORAGE MEDIUM

BACKGROUND OF THE INVENTION

The present invention relates to a game apparatus which is operated by motions of a game player opposing to a display screen.

Recently, game apparatuses which permit game players to operate the game apparatuses for producing games, or to dance or make other motions have become burstingly popular. Such game apparatuses having various ideas have appeared.

However, such conventional game apparatuses must be operated by game players pressing the operation buttons with hands, stamping the operation mats, etc., i.e., by direct operations, such as pressing operations, etc. made onto the operation device.

SUMMARY OF THE INVENTION

An object of the present invention is to provide a game apparatus which is not operated by direct operations of operation device, etc. by a game player but can be operated by natural motions of the game player.

Another object of the present invention is to provide a method for coordinate the game apparatus to operate a plurality of operation device without confusion.

The above-described objects are achieved by a game apparatus operated by motions of a game player opposed to a display screen, comprising: a light emitter operated by the game player and emitting light; a position detector detecting light from the light emitter to detect a spatial position of the light emitter; and a control unit controlling a game, based on the spatial position detected by the position detector.

The above-described objects are achieved by a game apparatus operated by motions of a game players opposed to a display screen, comprising: a light emitter disposed at a prescribed position and emitting light; a light detector operated by the game player and detecting light; a position detector detecting light from the light emitter to detect a spatial position of the light detector; and a control unit controlling the game, based on the spatial position detected by the position detector.

The above-described objects are achieved by a game apparatus operated by motions of a game player opposed to a display screen, comprising: a sound wave generator operated by the game player and generating sound waves; a position detector receiving sound waves from the sound wave generator to detect a spatial position of the sound wave generator; and a control unit controlling a game, based on the spatial position detected by the position detector.

The above-described objects are achieved by a game apparatus operated by motions of a game player opposed to a display screen, comprising: a sound wave generator disposed at a prescribed position and generating sound waves; a sound wave receiver operated by the game player and receiving the sound waves; a position detector detecting a spatial position of the sound wave receiver for the sound waves from the sound wave generator by being received by the sound wave receiver; and a control unit controlling a game, based on the spatial position detected by the position detector.

The above-described objects are achieved by a game apparatus operated by motions of a game player opposed to a display screen, comprising: an operation device operated by the game player and connected to a cable extended from a prescribed position; a position detector measuring a length of the cable to detect a spatial position of the operation device; and a control unit controlling a game, based on the spatial position detected by the position detector.

The above-described objects are achieved by a game apparatus operated by motions of a game players opposed to a display screen, comprising: an operation device including an operation unit operated by the game player connected by a flexible cable to a signal unit transmitting or receiving a position signal; a position detector receiving or transmitting the position signal from or to a signal unit of the operation device to detect a spatial position of the operation device, based on the spatial position; and control unit controlling a game, based on the spatial position detected by the position detector.

In the above-described game apparatus, it is possible that a command display commanding a prescribed operation to the game player is presented on the display screen; and the control unit judges whether or not the game player has operated in accordance with the prescribed operation commanded by the command display, and controls the game, based on a judgement result.

In the above-described game apparatus, it is possible that on the display screen, a plurality of positions to which the game player can respond are displayed, and a command mark appears at a preset appearance position and moved to one of said plurality of positions; and the control unit judges at a timing that the command mark arrives at said one of the positions whether or not the game player has responded to said one of the positions.

In the above-described game apparatus, it is possible that the command mark contains a command of a specific operation; the control unit judges at a timing that the command mark arrives at said one of the positions whether or not the game player has made the specific operation.

In the above-described game apparatus, it is possible that the light emitter is provided on the operation device operated by the game player in the hand; said plurality of positions are displayed at locations where the game player can operate the control unit with himself positioned at the center.

In the above-described game apparatus, it is possible that the light emitter is put on a part of the body of the game player; and said plurality of positions are displayed at locations where the game player can operate the control unit with himself at the center.

In the above-described game apparatus, it is possible that the operation device has a shape of a percussion musical instrument which is operated, gripped in the hand, and further comprises vibration detector detecting a vibrated state of the operation device; and the control unit controls the game in accordance with a position and/or the vibrated state of the operation device.

In the above-described game apparatus, it is possible that on the display screen, a plurality of positions to which the game player can respond are displayed, and a command mark appears at a preset appearance position and moved to one of said plurality of positions; and the control unit judges at a timing that the command mark arrives at said one of the positions whether or not the game player has responded to said one of the positions, and a judgment result is displayed near the appearance position.

In the above-described game apparatus, it is possible that a plurality of game players operate, and a game is controlled based on a level of agreement of the operation between the game players.

In the above-described game apparatus, it is possible that a plurality of positions to which the game player can respond are displayed on the display screen; and the control unit allocate operation sound to said plurality of positions, and when the game player operates, the operation sounds which are different corresponding to said plurality of positions are generated.

In the above-described game apparatus, it is possible that a plurality of positions to which the game player can respond are displayed on the display screen; and the control unit temporarily prohibits an operation of responding to one selected out of said plurality of positions, and displays that the position is prohibited.

In the above-described game apparatus, it is possible that the light emitter is provided in operation device operated by the game player in the hand or on a part of the body of the game player; the position detector detects based on the detected spatial position of the light emitter whether or not the game player has take a specific pose and retained the pose for a prescribed period of time; and the control unit controls the game, based on a detected result of the pose.

In the above-described game apparatus, it is possible that said plurality of positions are different from each other corresponding to a height of the game player.

The above-described objects are achieved by a method for adjusting a game apparatus including: an operation device operated by a game player, and transmitting or receiving a position signal; position detector receiving or transmitting the position signal from or to the operation device, and detecting a spatial position of the operation device, based on the position signal; and a control unit controlling a game, based on the spatial position detected by the position detector, a transmitting timing of the position signal being different from each other, based on a connection position where the operation device is connected.

The above-described objects are achieved by a method for adjusting a game apparatus including: an operation device operated by a game player, and transmitting or receiving a position signal; position detector receiving or transmitting the position signal from or to the operation device, and detecting a spatial position of the operation device, based on the position signal; and a control unit controlling a game, based on the spatial position detected by the position detector, a transmitting timing of the position signal being different from each other, based on a connection position where the operation device is connected.

In the above-described game apparatus, it is possible that the operation device is operated by a game player, held in the hand, and has a shape like a percussion musical instrument, and the operation device includes hit detector detecting hitting the operation device.

In the above-described game apparatus, it is possible that a plurality of indicative positions which the game player can indicate is displayed on the display screen; and the control unit displays which one of said plurality of indicative positions the operation device indicates.

In the above-described game apparatus, it is possible that, on the display screen, a plurality of indicative positions the game player can indicate are displayed, and a command mark is blown out at a preset blowout position and moves to one of said plurality of indicative positions; and the control unit judges, at a timing that the command mark arrives at said one of said indicative positions, whether or not the game player has indicated said one of said indicative position, and displays a judgement result near said one of said indicative positions.

In the above-described game apparatus, it is possible that, on the display screen, a plurality of indicative position which the game player can indicate are displayed, and a movement indication among plural ones selected out of said plurality of indicative positions is displayed; and the control unit judges whether or not the game player has moved the operation device along the movement indication.

As described above, according to the present invention, a spatial position of the light emitting means operated by a game player is detected, and a game is controlled, based on the spatial position, whereby the game player can operate the game with natural motions.

BRIEF DESCRIPTION OF THE DRAWINGS

FIG. 11 is views of modifications of a command mark used in the game apparatus according to the first embodiment of the present invention.

FIG. 34 is 6 views of a supersonic wave measuring unit of the fifth embodiment of the present invention, which shows its appearance.

DETAILED DESCRIPTION OF THE INVENTION

The game apparatus according to a first embodiment of the present invention will be explained with reference to FIGS. 1 to 11.

(Summary of the Game Apparatus)

Figure 1:
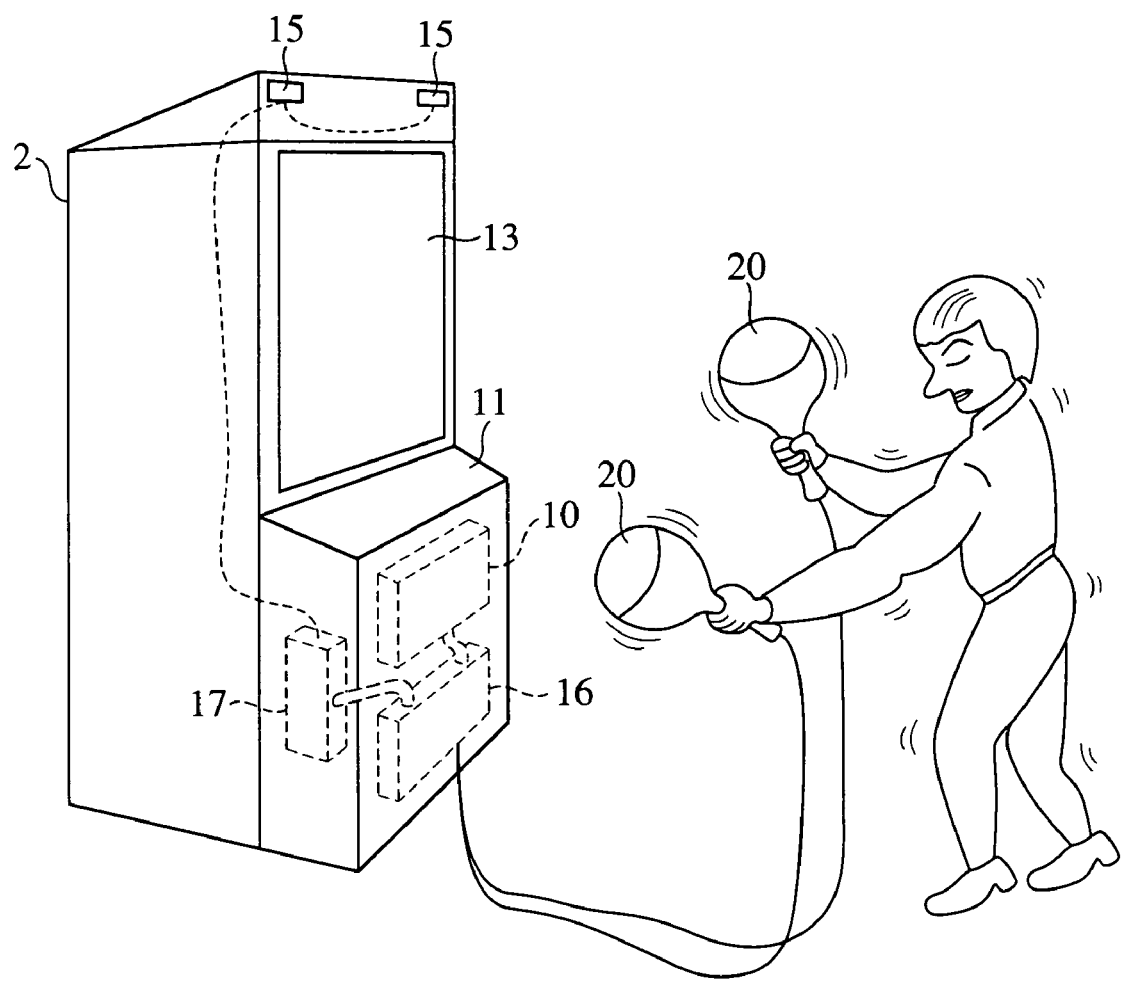
FIG. 1 is a schematic view of the game apparatus according to a first embodiment of the present invention.

The game apparatus according to the present embodiment will be summarized with reference to FIGS. 1 to 6. As shown in FIG. 1, the game apparatus according to the present embodiment has a video monitor 13 on the front side of a game apparatus casing 2. An operation panel 11 is disposed immediately below the video monitor 13. Photodetectors 15 for detecting positions are disposed on both sides of a part above the video monitor 13. Two photodetectors 15 may be disposed on both sides of the video monitor 15.

In the game apparatus casing 2 below the video monitor 13 there are disposed a game processing board 10 for generally controlling the game apparatus, an operation device control board 16 for controlling maraca-shaped operation device 20 to be operated by a game player, and a position detection board 17 for detecting positions of the operation device 20.

(Maraca-Shaped Operation Device (Part 1))

Figure 2A:
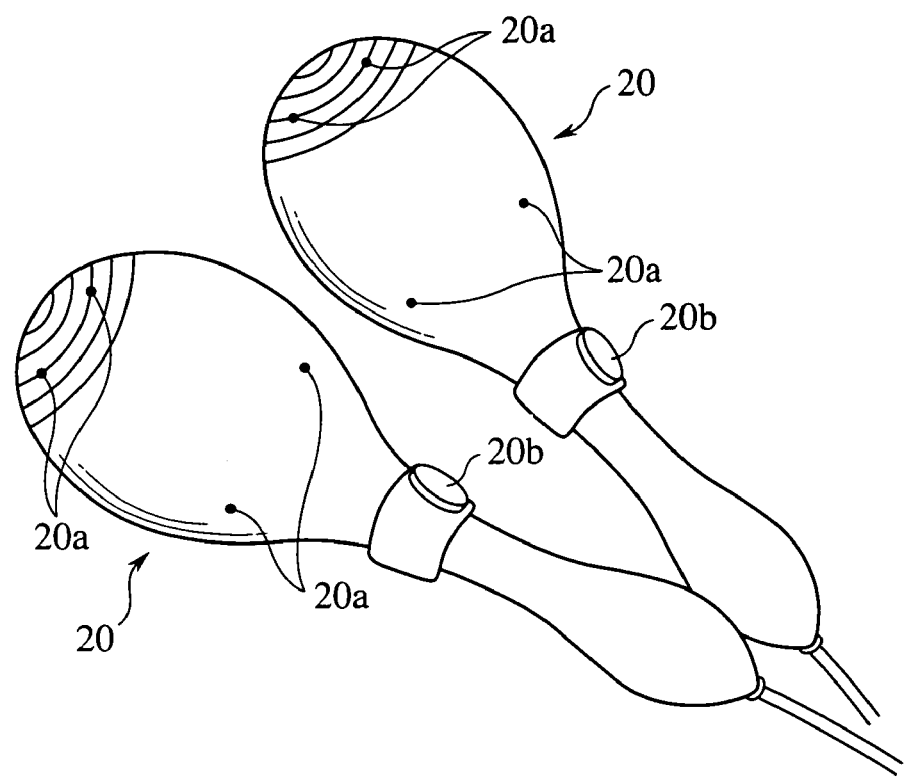
FIG. 2 is views of a first example of operation device of the game apparatus according to the first embodiment of the present invention.

A first example of the maraca-shaped operation device 20 is shown in FIG. 2. The operation device 20 are a pair. A game player holds the operation device 20 of the pair each in both hands to operate. The operation device 20, as shown in FIG. 2A, have a shape imitating a percussion instrument, a maraca and have a plurality of LEDs 20a which are light emitting units buried in the egg-shaped bodies of the respective maraca-shaped operation device 20, so that the light detectors 15 can detect light from the LEDs 20a even when the operation device 20 are positioned in any direction. The operation device 20 each has buttons 20b provided on the grips. The game player can operate the buttons 20b while gripping the operation device 20.

Figure 20A:
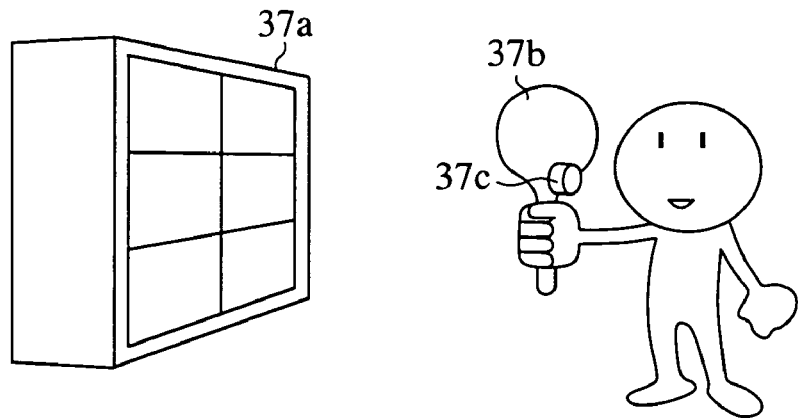
FIG. 20 is views of Zenigata Heiji game played on the game apparatus according to the third embodiment of the present invention.
Figure 20B:
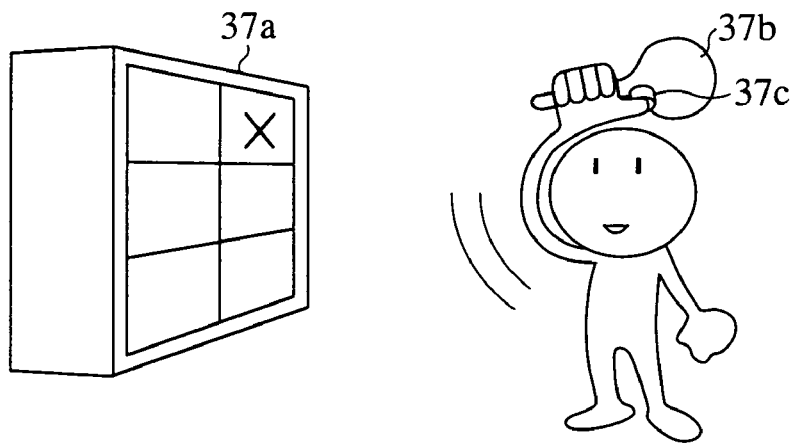

As shown in FIG. 20B, the operation device 20 have a hollow inside space. A spring 20c is extended inside the egg-shaped body of each operation device 20, and a metal wire 20d is passed through the center of the spring 20. A number of round balls 20e are enclosed in the hollow space of each egg-shaped body. When the operation device 20 are shaken, the springs 20c flex to contact the metal wires 20d, whereby vibration states are detected. Simultaneously therewith, the round balls 20e impinge on the inside wall of the empty inside space, making characteristic sounds of the maracas.

In addition to the switch in the form of the above-described spring 20c and the metal wire 20d, a microphone is provided inside the hollow inside space of each operation device 20 to detect sound of the round balls 20e. A deflection gauge may be provided inside each operation device 20 to detect vibration states of the operation device 20.

Figure 2B:
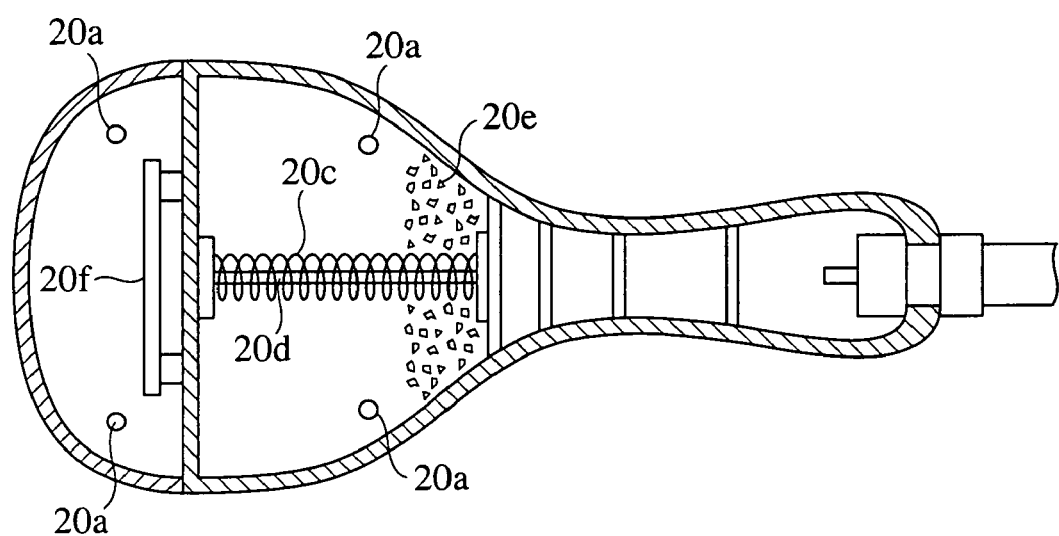

As shown in FIG. 2B, a circuit substrate 20f is provided inside each operation device 20. The circuit substrate 20f causes the LED 20a to suitably emit light, detect operational states of the button 20b, and detect contact of the spring 20c to the metal wire 20d.

(Maraca-Shaped Operation Device (Part 2))

A second example of the maraca-shaped operation device 20 is shown in FIG. 3. The operation device 20 shown in FIG. 2 has the LED 20a buried in the surface of the body. When the operation device 20 is dropped, the LED 20 is broken. The LED may be damaged by mischief. The operation device 20 of the present example is characterized by means for securing the LED 20a inside the body, and means for improving a decrease of an intensity of the light from the LED housed inside the body which are provided for the prevention of an decrease of an intensity of the light from the LED 20a.

Figure 3A:
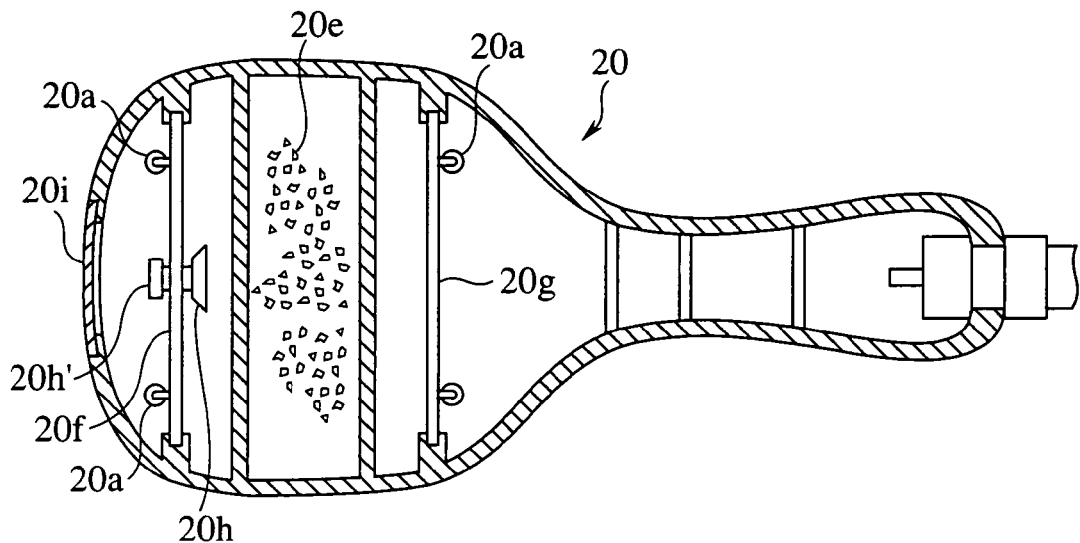
FIG. 3 is views of a second example of the operation device of the game apparatus according to the first embodiment of the present invention.

As shown in FIG. 3A, the operation device 20 has a hollow inside space. The hollow inside space of the egg-shaped body is divided in three chambers. A number of round balls 20e are enclosed in the central chamber. When the operation device 20 is shaken, the round balls 20e impinge on the inside wall of the hollow inside space, making sounds characteristic of maracas.

Circuit substrates 20f, 20g are disposed respectively in the left chamber and the right chamber of the body as viewed in the drawing. LEDs 20a are fixed to the circuit substrate 20f in the left chamber as viewed in FIG. 3 at, e.g., the four corner with the light emitting surfaces opposed to the inside wall of the body. LEDs 20a are fixed also to the circuit substrate 20g in the right chamber as viewed in FIG. 3A at, e.g., the four corners with the light emitting surfaces opposed to the inside wall of the body.

A microphone 20h is disposed substantially at the center of the circuit substrate 20f, faced inward. A volume adjuster 20h' of the microphone 29h is disposed, faced outward. The microphone 20 detects sounds made in the body by the round balls 20e impinging on the inside wall of the hollow inside space. A lid 20i is provided on the top of the body, so that even after the operation device 20 has been fabricated, the lid 20i is removed to permit a sensitivity of the microphone 20h to be adjusted. The microphone 20h may be disposed at a different position but is preferably positioned at the center, where the sound can be effectively sensed.

Figure 3B:
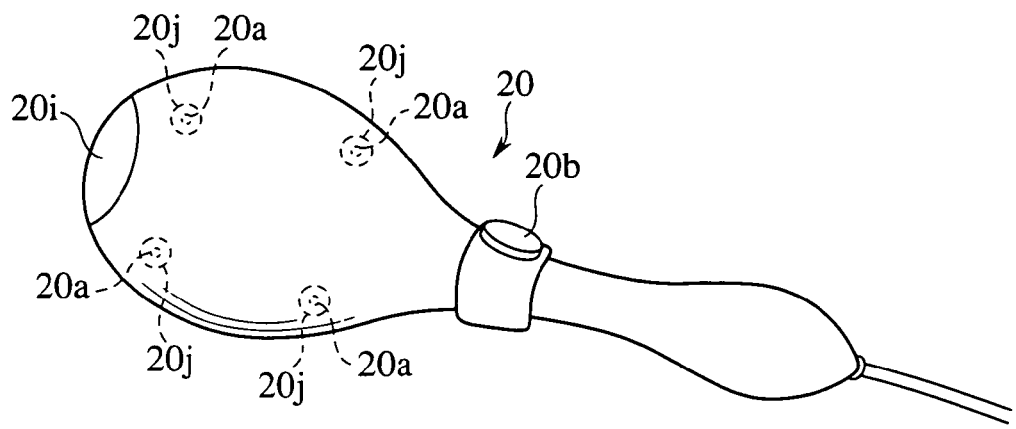
Figure 3C:
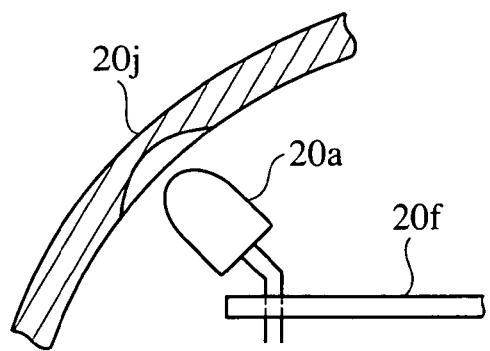

In order that light from the LED 20a housed inside the operation device 20 can be effectively radiated, as shown in FIG. 3B, the operation device 20 is formed of a transparent member or a semitransparent member, and parts of the operation device 20 corresponding to the LEDs 20a have a thickness reduced for higher transmittance. As shown in FIG. 3C, the insides surface of the parts are especially concaved as a lens, whereby the thickness is reduced, and higher transmittance can be obtained while effectively the thinned parts 20j function like lenses to radially diverge the light toward the outside.

The body of the operation device 20 is not essentially formed of a material which is transparent or semitransparent with respect to visible light and may be formed of any material as long as the material has high transmittance for light (e.g., infrared radiation or others) from the LEDs 20a.

As described above, in the present example, the whole body of the operation device 20 is formed, in one-piece, of a material having high transmittance for light emitted by the LEDs 20. The body of the operation device 20 can be fabricated in a small number of parts. Accordingly, high fabrication efficiency can be obtained, and the body can have higher strength.

(Maraca-Shaped Operation Device (Part 3))

Figure 4A:
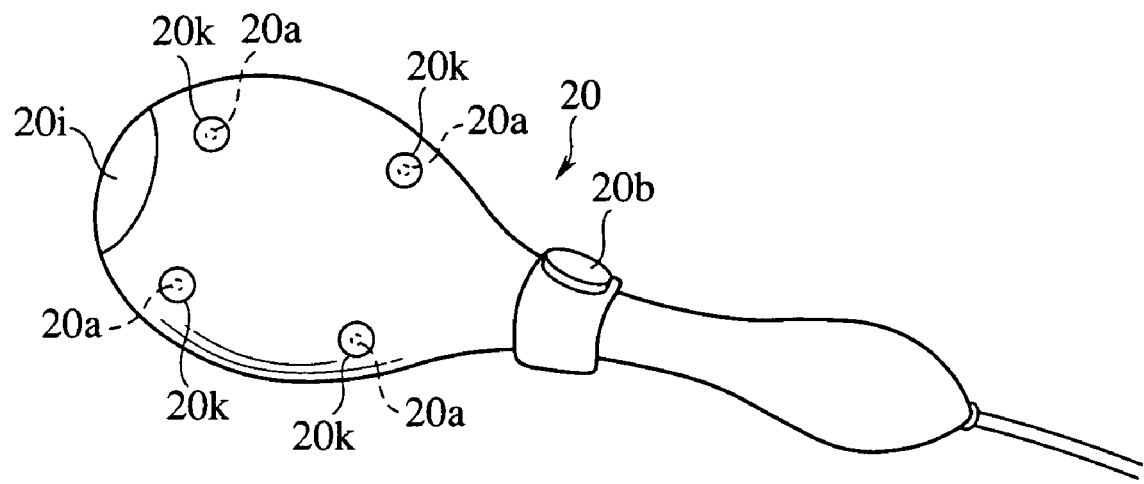
FIG. 4 is views of a third example of the operation device of the game apparatus according to the first embodiment of the present invention.

A third example of the maraca-shaped operation device 20 is shown in FIG. 4. The operation device 20 shown in FIG. 3 has the body formed of a transparent or a semitransparent material. However, in the present example, as shown in FIG. 4A, the body of the operation device 20 is formed of a non-transparent material, but only members 20k disposed in the body corresponding to LEDs 20a are formed of a transparent material for higher transmittance.

Figure 4B:
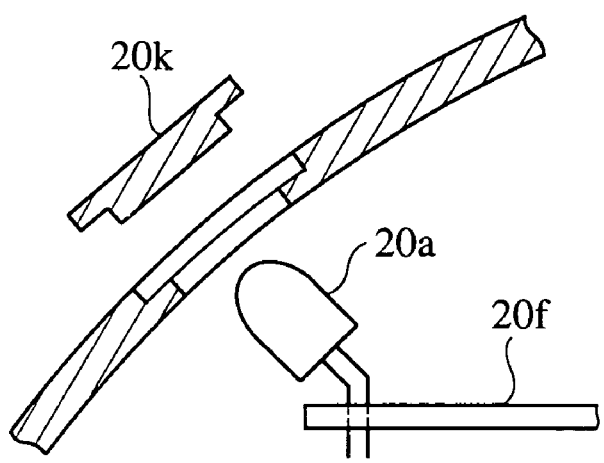

As shown in FIG. 4B, the members 20k are formed in lids which are removable. The members 20k in the form of transparent lids are removed to replace the LEDs 20a when the LEDs 20 malfunction.

(Maraca-Shaped Operation Device (Part 4))

Figure 5A:
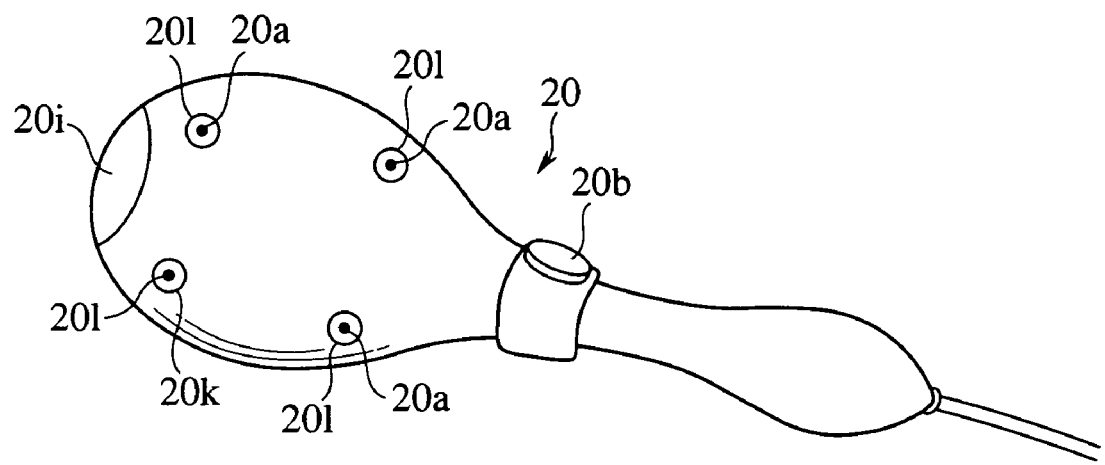
FIG. 5 is views of a fourth embodiment of the operation device of the game apparatus according to the first embodiment of the present invention.
Figure 5B:
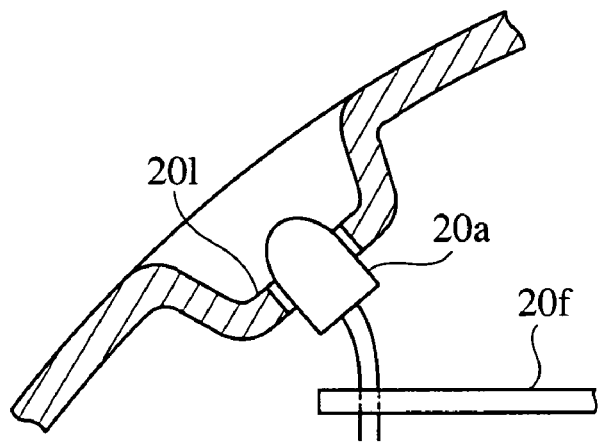

A fourth example of the maraca-shaped operation device 20 is shown in FIG. 5. In the present example, as shown in FIG. 5B, a part 201 of the body where an LED 20a is mounted is formed in a cavity, and a hole is formed in the center of the cavity. The LED 20a mounted on a circuit substrate 20f is inserted in the hole, exposed outside. The LED 20a may be secured in direct contact with the body but may be secured indirectly without contacting the body.

An intensity of the light of the LED 20a thus exposed outside does not decrease. In addition, the LED 20a thus disposed in the cavity is not broken when the operation device 20 is accidentally dropped, or discourages intentional damages.

(Method for Detecting a Position of the Operation Device)

Figure 6A:
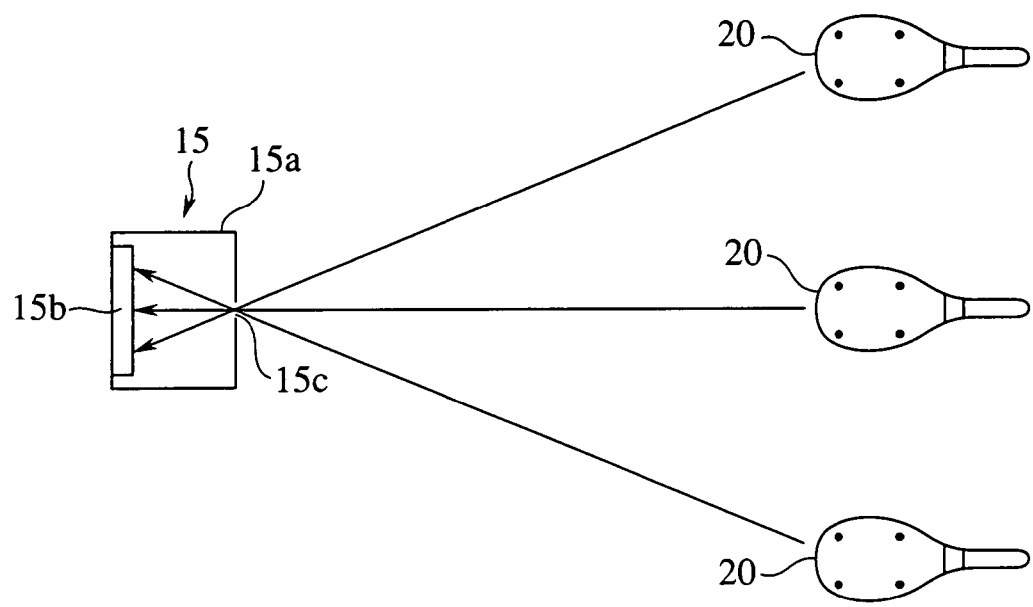
FIG. 6 is views explaining a position detecting method for the game apparatus according to the first embodiment of the present invention.

The method for detecting a position of the operation device 20 by the light detection units 15 is shown in FIG. 6. As shown in FIG. 6A, each light detection unit 15 comprises a light detecting portion 15b disposed on the inside surface of a light detection box 15a, a small aperture 15b is opened in the side of the light detection box 15a opposed to the light detection unit 15. The light detecting portion 15b can detect a spacial position of the operation device 20 with respect to the light detection unit 15. As exemplified in FIG. 6A, upper positions, middle positions and lower positions of the operation device 20 with respect to the light detection portion 15 can be judged based on detected positions of the light from the LED 20a. The light detection portion 15 can detect positions of the operation device 20 based on the same principle for detecting left and right positions.

Figure 6B:
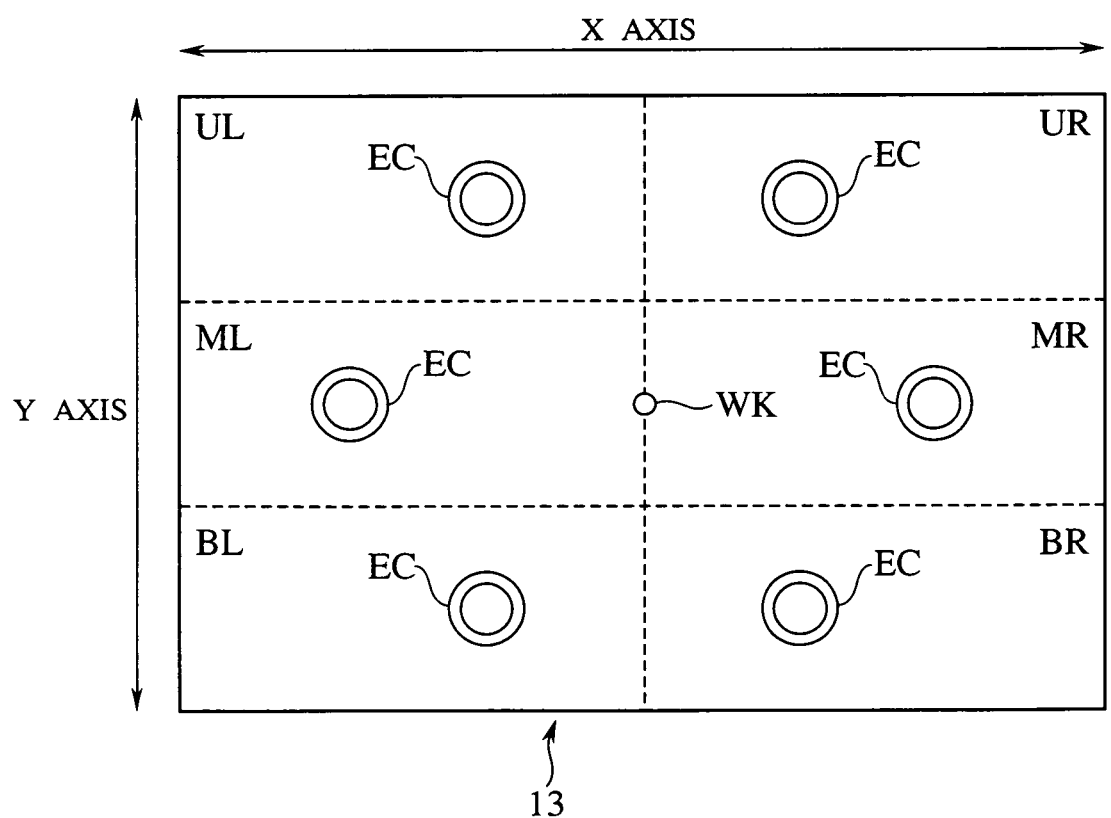

In the present embodiment, a spacial position corresponding to the video monitor 13 is divided in six regions, an upper left region and an upper right region, a middle left and a middle right region, and a lower left region and a lower right region as shown in FIG. 6B to detect in which region the operation device 20 is positioned. A prescribed region of the screen of the video monitor 13 is divided in an upper left region UL, an upper right region UR, a middle left region ML, a middle right region MR, a lower left region BL and a lower right region BR to detect which of the 6 divided region, the upper left and right, the middle left and right, and the lower left and right regions the operation device 20 indicates, and an icon EC of the indicated region is lighted. A blow-out opening WK through which an indication which will be described later is blown out is formed at the center of the 6 divided regions.

A game player grips the operation device 20 to bring the operation device 20 to a desired upper left or right, middle left or right, or lower left or right position while operating the operation device 20 by pressing the button 20b or shaking the whole operation device. By the use of the operation device 20, a game player can (a) command a upper left or right, middle left or right or lower left or right spatial position, (b) make an operational command by using the button 20b, or (c) make an operational command by a shake state. A command can be made by combinations of these commands a), b), c).

As shown in FIG. 1, a game player grips the operation device 20 each in both hands to operate the operation device 20. Light from the operation device 20 operated by the same game player is detected by the same light detection means 15, and positions of the operation device are detected. In order to discriminate one operation device gripped in one hand from the other operation device gripped in the other hand the LEDs 20a of the former have a light emitting timing different from that of the LEDs 20a of the other. The LEDs 20a of the operation device 20 emit light in a pulse. The LEDs 20a of the two operation device 20 alternately emit light, whereby the light detection units 15 can separately detect positions of the two operation device 20.

When two game players plays, each game player operates two operation device 20. Spacial positions of the totally 4 operation device 20 must be detected. In the present embodiment, the operation device 20 of the game player on the left side are detected by the light detection unit 15 on the left side, and the operation device 20 of the game player on the right side are detected by the light detection unit 15 on the right side. The operation device of the game player on the left side and that of the game player on the right side are discriminated by making an on/off cycle of light emitting (e.g., 50 Hz) of the LED 20a of the former different from an on/off cycle of light emitting (e.g., 100 Hz) of the LED 20a of the latter. The operation device 20 operated by one game player are discriminated from each other by making light emitting cycles of the LEDs 20a of both operation device 20 equal to each other but making light emitting timings of those different from each other.

A position of one of the operation device 20 is detected by the two light detection units 15, whereby the position can be detected not only in plane parallel with the video monitor 13 (a position in the X-Y plane) but also in a depth with respect to the video monitor 13 (in the Z-axis direction). Thus, a position can be detected in three dimensions, and a position can be freely indicated by the operation device 20 in 3D games.

As described above, according to the present embodiment, the maraca-shaped operation device may be operated like a musical instrument, which enables a game player to enjoy a music game in natural motions to music.

(Structure of the Game Apparatus)

Figure 7:
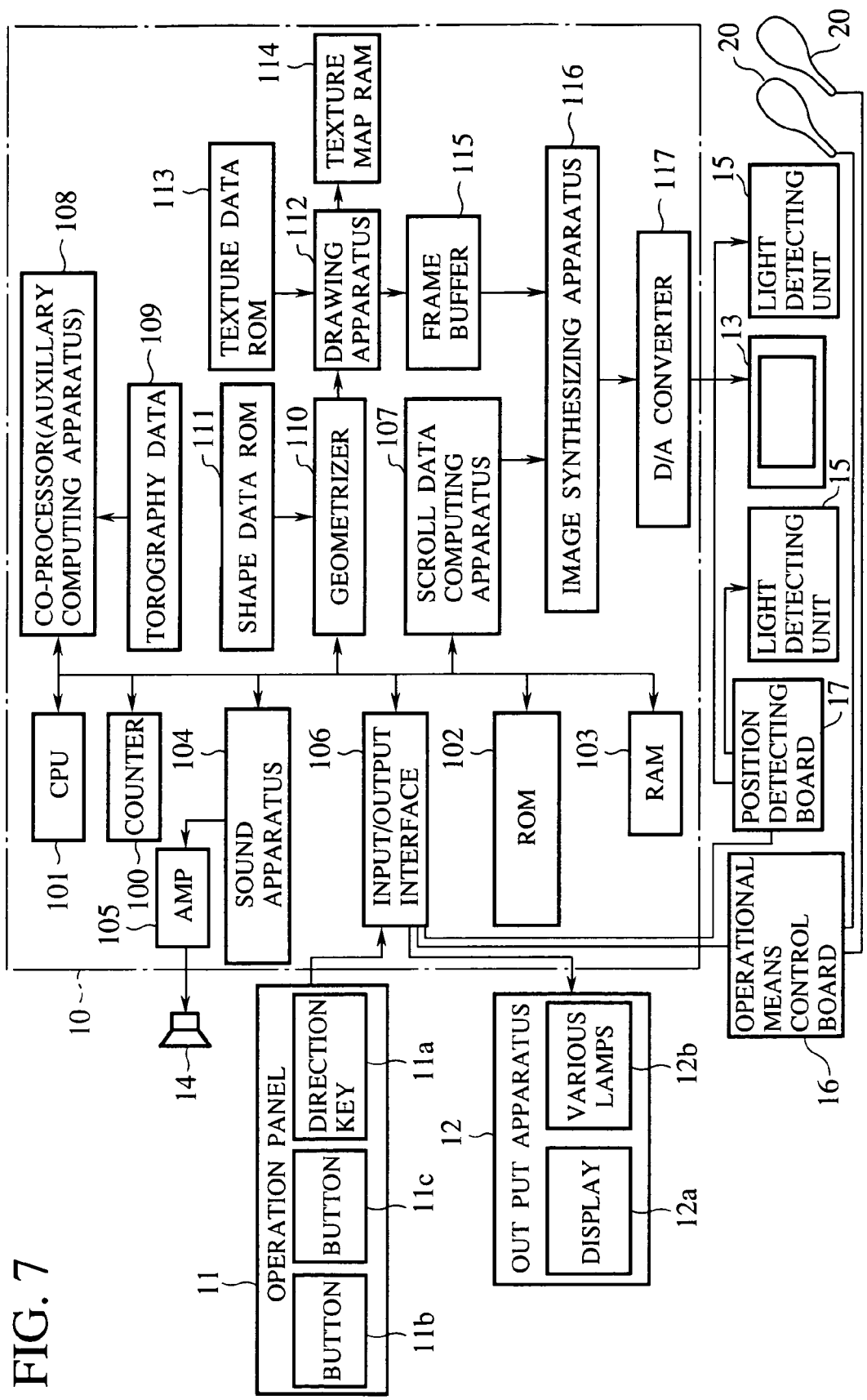
FIG. 7 is a block diagram of the game apparatus according to the first embodiment of the present invention.

The structure of the game apparatus according to the present embodiment will be explained with reference to FIG. 7. As shown in FIG. 7, the game apparatus according to the present embodiment comprises a game processing board 10, an operation panel 11 for inputting operations by a game player, output means 12 for making various notices to the game player, the video monitor 13 for displaying game images, and a speaker 14 for outputting game sounds and voices.

The operation panel 11 includes a direction key 11a, and buttons 11b, 11c for commanding operations. The output means 12 includes a display 12a for presenting displays related with a game, and various lamps 12b.

The game processing board 10 includes a counter 100, a CPU 101 which generally controls the apparatus, and a co-processor 108 which is an sub-computing means. The game processing board 10 further includes a ROM 102 storing programs, etc. and a RAM 103 as a buffer memory. The game processing board 10 further includes sound means 104 for making sounds, and an AMP 105 for amplifying sounds and voices. The AMP 105 is connected to the speaker 14. An input/output interface 106 is provided to connect the input means 11, the operation panel, to the output means 12.

The game processing board 10 further includes a geometry data ROM 109 storing geometry data, a shape data ROM 111 storing three-dimensional data of characters, etc., and texture data ROM 113 storing texture data.

The game processing board 10 further includes a geometalizer 110 and drawing means 112. The geometalizer 110 subjects polygonal shape data to perspective transformation by transformation matrix to thereby obtain data which has been transformed three a coordinate system in a three-dimensional phantom space to a field coordinate system.

The drawing means 112 add a texture to shape data of the transformed field coordinate system and outputs the same to a texture map RAM 114 and also to a frame buffer 115. Scroll data computing means 107 computes data of letters, etc. for a scroll screen.

An image synthesizing means 116 synthesizes data of the scroll screen containing letter information supplied by the scroll data computing means 107, and data of a polygon screen supplied by the frame buffer 115. Synthesized frame image data is converted to analog signals by a D/A converter 117 to be outputted to the vide monitor 13 to be presented as game displays.

The game apparatus according to the present embodiment further comprises an operation device control board 16 and a position detection board 17, and is connected to the input/output interface 106. The operation device control board 16 is connected to the maraca-shaped operation device 20. The position detection board 17 is connected to the light detection units 15.

(Summary of Music Game)

Figure 8A:
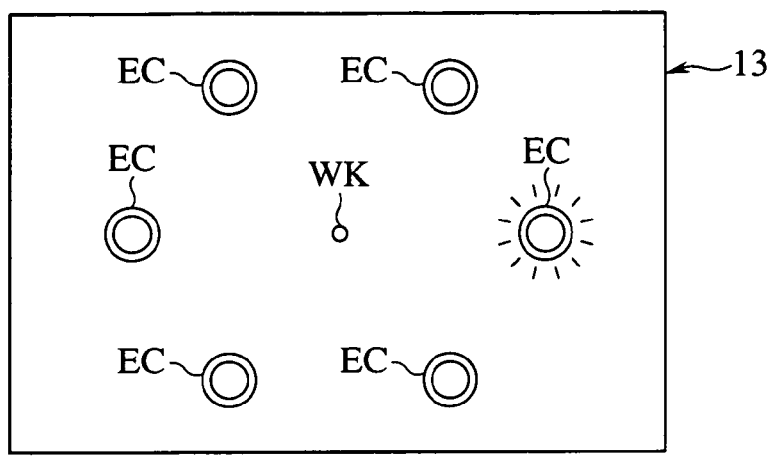
FIG. 8 is views of displays of a music game played on the game apparatus according to the first embodiment of the present invention.
Figure 8B:
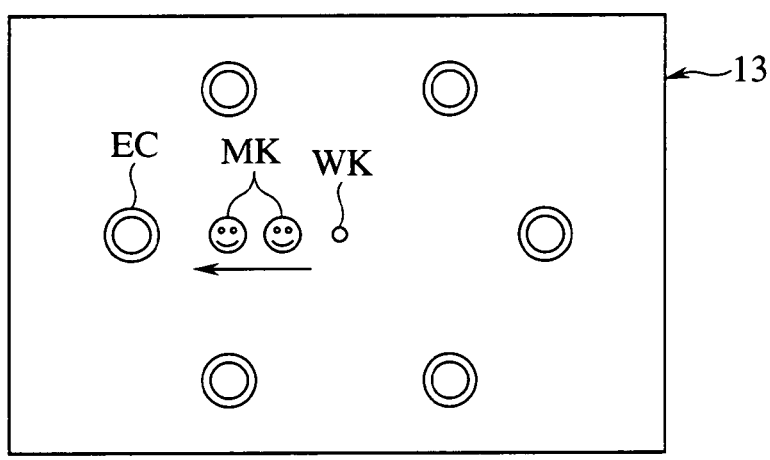

A music game played on the game apparatus according to the present embodiment will be summarized with reference to FIGS. 8 to 11. FIG. 8 is images of the music game played on the game apparatus according to the present embodiment. FIG. 8A shows a basic layout of the game display. Six icons EC are arranged around the blowout opening WK at the center of the screen of the video monitor 13. The screen of the video monitor 13 is divided in regions, upper left and right region, middle left and right regions and lower left and right regions. Icons EC are laid out in the respective regions, and the 6 icons form a hexagon. An icon EC of a region indicated by the operation device 20, e.g., the icon EC in the middle right region, is lighted to thereby enable a game player to confirm his indicating position.

When the music game is started, command marks MK, rhythm balls are successively generated to music through the blowout opening WK and are moved to one of the 6 icons EC. For example, in FIG. 8B, the round command marks MK are being moved to the icon EC in the middle left region. The game player brings the operation device 20 to the middle position of the upper, the middle and the lower positions while watching the display, and shakes the operation device 20 to vibrate a command mark MK at a timing that the command mark MK is drawn into the icon EC.

Figure 8C:
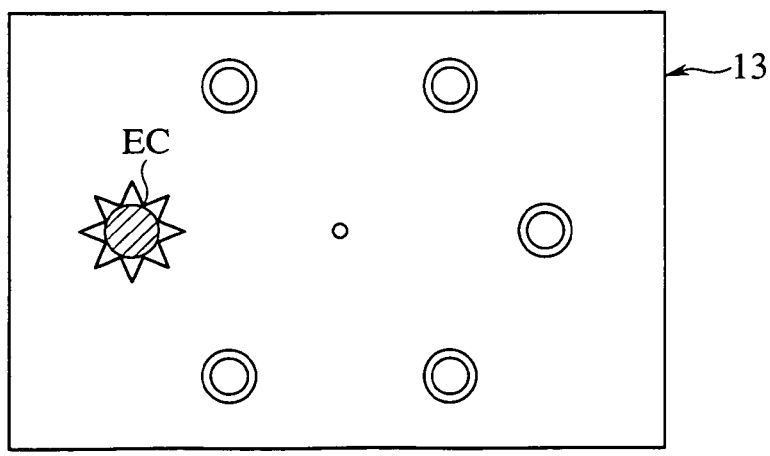

When a command mark MK arrives at the icon EC, and the game player succeeds in shaking the operation device 20 at the timing that the command mark MK is drawn into the icon EC, as shown in FIG. 8C, a display that the icon EC of the middle left region explodes is presented to indicate that his operation is successful. If the game player fails to shake the operation device at the timing, or the game player indicates another region, the command mark MK is simply drawn and extinguished.

As command marks MK come out one after another to music through the blowout opening WK, the game player operates the operation device 20 in the left and the right hands corresponding to a command mark MK to indicate a position of an icon EC to which the command mark MK is moving, and shakes the operation device 20 at a timing that the command mark MK arrives at the icon EC.

Command marks MK contain one-hand balls which command one of the operation device 20, both-hand balls which command both operation device 20, continuous-shake balls which command continuous shake of the operation device, pause balls which command a certain period of time of pause, etc. The command mark MK can have thus various functions. A game player, while judging kinds of command marks MK which are blown out, must make motions commanded by the command marks MK at good timings.

Figure 9A:
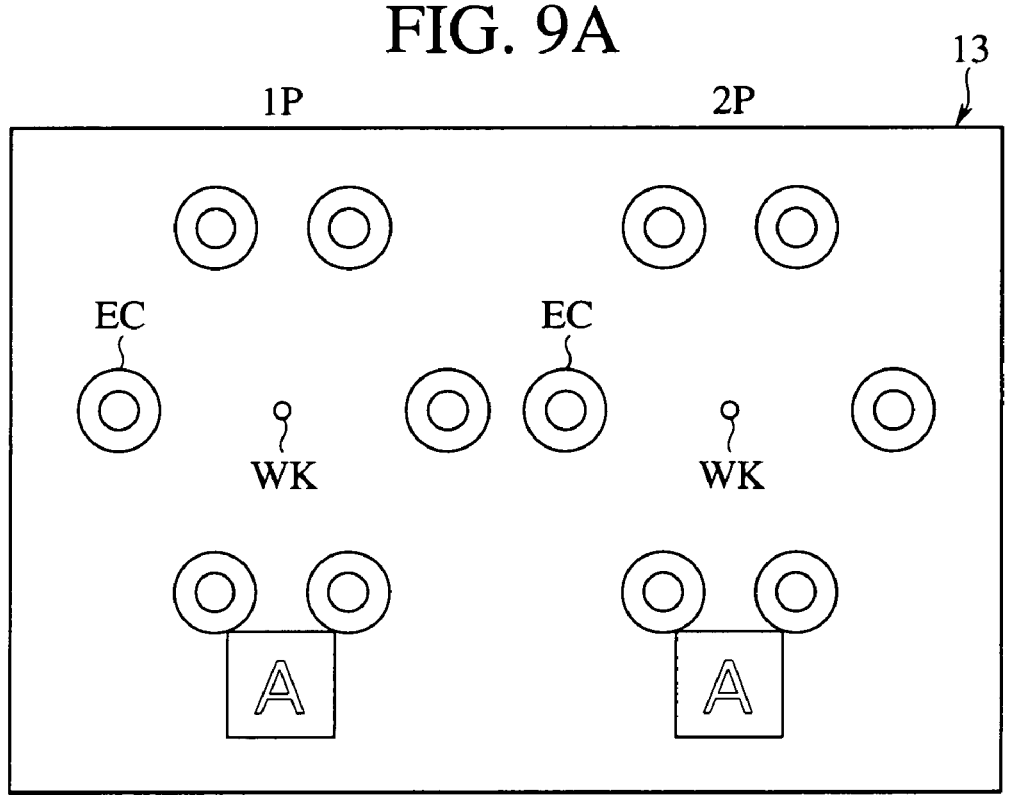
FIG. 9 is views of the music game played by two game players on the game apparatus according to the first embodiment of the present invention.

FIG. 9 shows displays of the music game which is played by two game players. As shown in FIG. 9A, the video monitor screen of the video monitor 13 is divided in two regions, a left and a right regions. The left region for a game screen for a first game player (1P), and the right region is for a game screen for a second game player (2P). Each game screen is divided in 6 regions, upper left and right region, middle left and right regions and lower left and right regions. Icons EC are laid out respectively in the regions. A blowout opening WK is laid out at the center. The first and the second game players operate the operation device 20 while watching their own screens to compete in the music game.

Figure 9B:
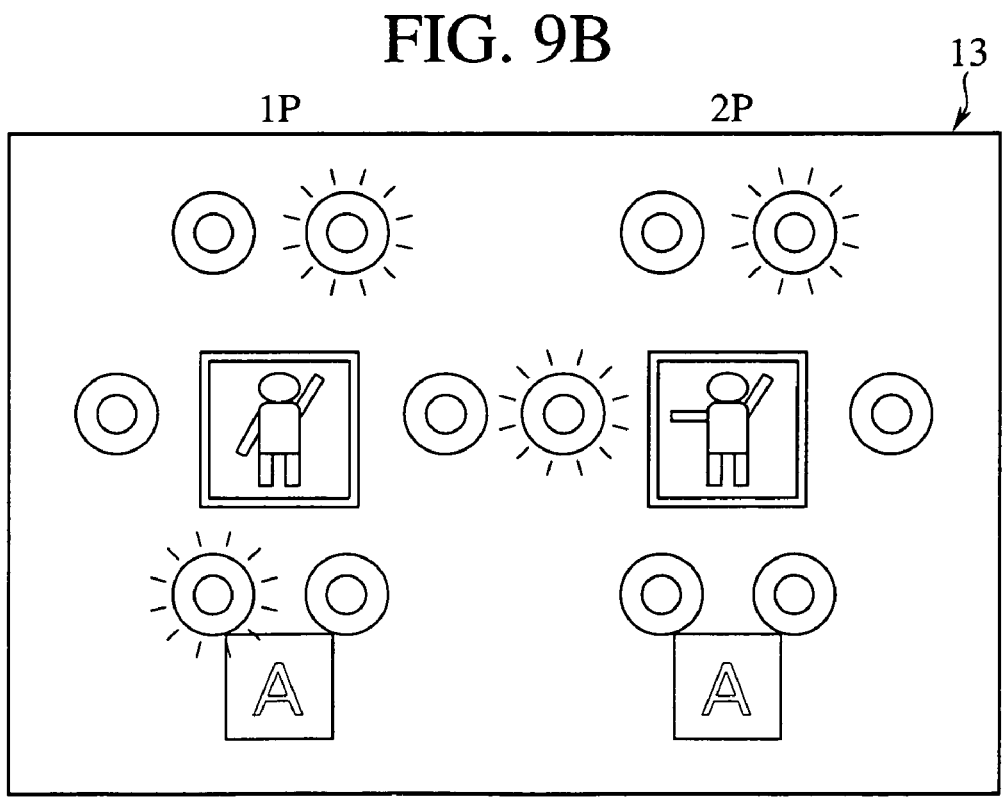

FIG. 9B is a game display which, in the music game played by two game players, commands a pose to the game players. Pose balls as command marks are generated. As shown in FIG. 9B, the pose balls indicate at the centers poses the game player should take, the instant pose balls arrive at one icon EC. For example, the game players take the commanded pose within one second. Whether or not the game players have taken the pose is judged based on whether the game players have indicated icons at positions corresponding to the operation device 20.

In the poses shown in FIG. 9B, the first game player (1P) on the left side must raise upward the right hand and drop downward the left arm, and the second game player (2P) on the right side must raise upward the right hand and raise the left hand horizontally. In FIG. 9B, the icons at the positions corresponding to their poses light. It is judged that the game players have the correct poses.

(Setting Parameters of Heights and Ages of Game Players)

In the music game according to the present embodiment, the screen of the video monitor 13 is divided in 6 regions, upper left and right, middle left and right, and lower left and right regions, and coordinate values of indicative positions which can be indicated by the operation device 20 are pre-set. Based on positions of the operation device detected by the light detection units 15 reach the preset coordinate values of the indicative positions, it is judged whether or not the operations of the music game are correct.

However, heights of adult game players and those of child game players are different from each other, and it is preferable to change coordinate values of indicative positions.

Figure 10A:
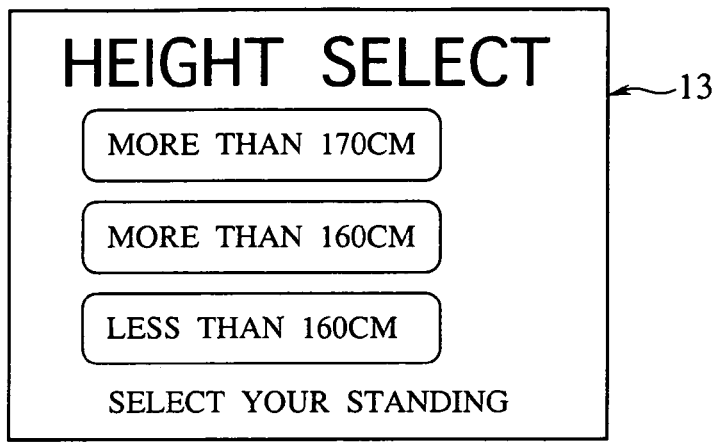
FIG. 10 is views of displays for setting parameters of the game apparatus according to the first embodiment of the present invention.

Then, in the present embodiment, before the music game is started, a height of a game player is inputted, and coordinate values of indicative positions are changed corresponding to the height. When the music game is started, as shown in FIG. 10A, a height input display as shown in FIG. 10A is presented. A game player selects one of a height above 170 cm. Above 160 cm and below 160 cm, and based on a selection, set coordinate values of indicative positions are changed.

Figure 10B:
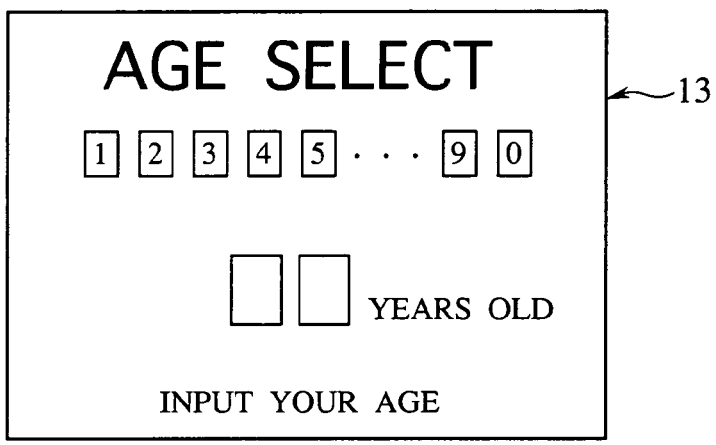
Figure 10C:
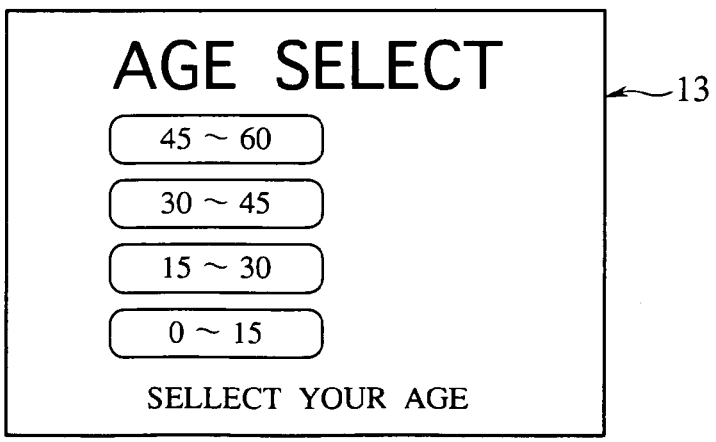

In the present embodiment, the age of a game player is inputted before the start of the music game. An age may be inputted in figures as shown in FIG. 10B or may be inputted by selecting a plurality of brackets of ages as shown in FIG. 10C. Based on the age input, music used in the music game is changed, or difficulty of the music game is change. The music game is played, using music corresponding to an age bracket, and difficulty of the music game is changed corresponding to a selected age bracket.

It is possible that other parameter, such as sex, etc., in addition to heights, ages, etc. are inputted to thereby change parameters of the music game.

(Modifications of Command Marks)

FIG. 11 shows modifications of the command marks MK. In addition to the above-described one-hand balls, both-hand balls, continuous hit balls, pose balls, etc., the command marks MK can contain various operational commands.

FIGS. 11A and 11B show command marks MK which command times of shaking the operation device 20. Times of shaking the operation device 20 are indicated on the command marks MK. The command mark shown in FIG. 11A commands shaking once the operation device 20. The command mark shown in FIG. 11B commands shaking five times the operation device 20.

FIGS. 11C and 11D show command marks which command directions of shaking the operation device 20. Shaking directions are indicated on the command marks MK. The command mark shown in FIG. 11C commands shaking the operation device 20 in the right hand. The command mark shown in FIG. 11D commands shaking the operation device 20 in the left hand.

FIGS. 11E and 11F show command marks indicating parts of the body to be operated in another music game in which light emitting units are put on the hands and feet. Parts of the body to be shaken are indicated on the command marks MK. The command mark shown in FIG. 11E commands operating the light emitting units on the hands. The command mark shown in FIG. 11D commands operating the light emitting units on the feet.

FIGS. 11G and 11H show command marks indicating operational contents in further another music game in which musical instruments, such as guitar, piano, etc. are operated. Operational contents are indicated on the command marks MK. The command mark shown in FIG. 11G command operating the button "1". The command mark MK commands operating the button "C".

FIGS. 11I and 11J show command marks which command operational directions of the operation device 20. Operational directions are shown by arrows on the command marks MK. The command mark MK shown in FIG. 11I commands directing upright the maracas, the operation device 20. The command mark MK in FIG. 11J commands directing downward the maracas, the operation device 20.

FIG. 11K and 11L show command marks which command operating method of the operation device 20. Operating methods are indicated by arrows on the command marks MK. The command mark shown in FIG. 11K commands rotating the maracas, the operation device by one round. The command mark shown in FIG. 11L commands operating zigzag the maracas, the operation device 20.

FIG. 11M shows a command mark which commands a pose which a game player should take. A pose is indicated on the command mark MK. The command mark MK shown in FIG. 11M command a game player taking the Y-shaped pose.

FIG. 11N shows a command mark which commands a score. A score at a time of success is indicated on the command mark MK. The command mark shown in FIG. 11N indicates that 1000 points can be got for a success.

A SECOND EMBODIMENT

The game apparatus according to a second embodiment of the present invention will be explained with reference to FIG. 12. The music game played on the game apparatus according to the present embodiment is the same as the music game used in the first embodiment in that the maraca-shaped operation device are used but is quite different from the first embodiment in game displays which give commands to a game player.

Figure 12:
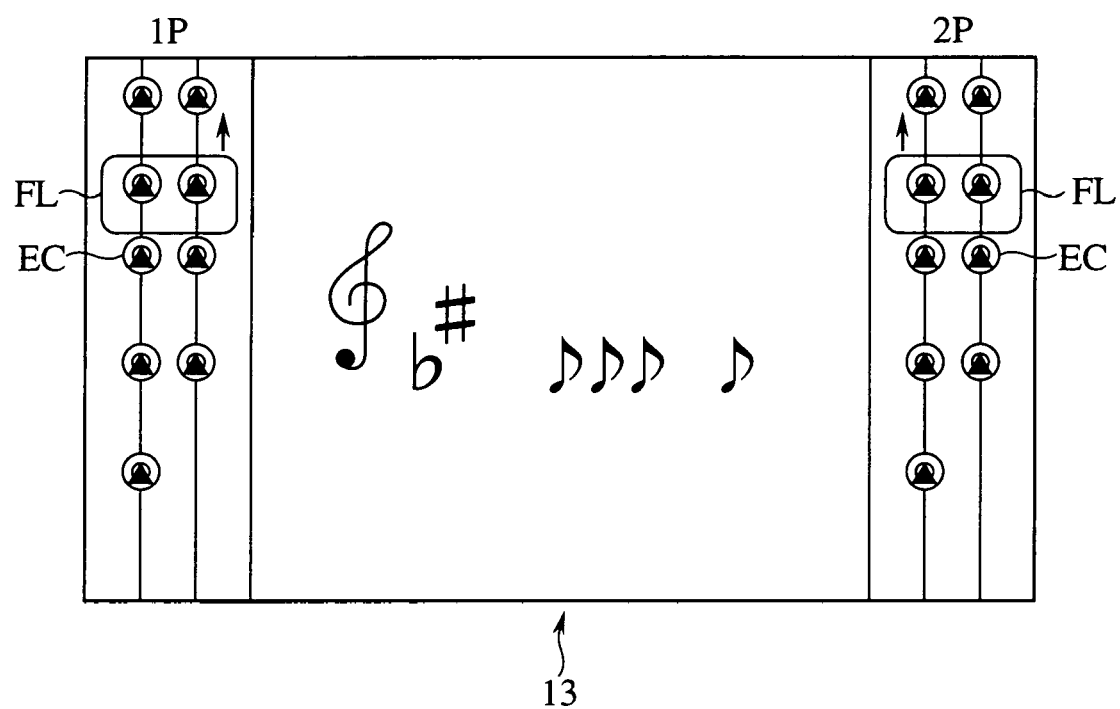
FIG. 12 is a view of a display of a music game played on the game apparatus according to a second embodiment of the present invention.

FIG. 12 shows a display of the music game which is played by two game players. A command for a first game player (1P) is displayed on the left side of the video monitor 13. A command for a second game player (2P) is displayed on the right side of the video monitor 13. When the music game is played by one game player, only one of both sides is displayed.

In the present embodiment, rhythm data indicating timings of shaking the left and the right operation device are indicated by icons EC in strips each on both sides of the screen of the video monitor 13. Frames FL which indicate timings of shaking the operation device 20 move respectively along the strips upward from below. Game players shake their operation device 20 at a timing that icons come in the respective frames FL. When the frames FL reach an upper part of the screen, next strips of rhythm data appear from the side, and the frames FL appear at the lowermost end of the screen and move upward.

As described above, according to the present embodiment, the maraca-shaped operation device are used to thereby realize simple music games.

On the game screen shown in FIG. 12, a spatial position of the operation device 20 when shaken is not indicated, but when a spatial position is indicated, the upward, downward, left, right and slant arrows are indicated on the icons EC.

A THIRD EMBODIMENT

The game apparatus according to a third embodiment of the present invention will be explained with reference to FIGS. 13 to 20. In the game apparatus according to the above-described embodiments, the light emitting units are provided in the maraca-shaped operation device to be operated by being gripped by game players in the hands. However, in the present embodiment, the light emitting units are provided on operation device of different kinds or on parts of the body of a game player. Various unique games can be realized by making use of the thus-provided light emitting units. Examples of such games will be explained with reference to FIGS. 13 to 20.

(3D Action Game)

Figure 13:
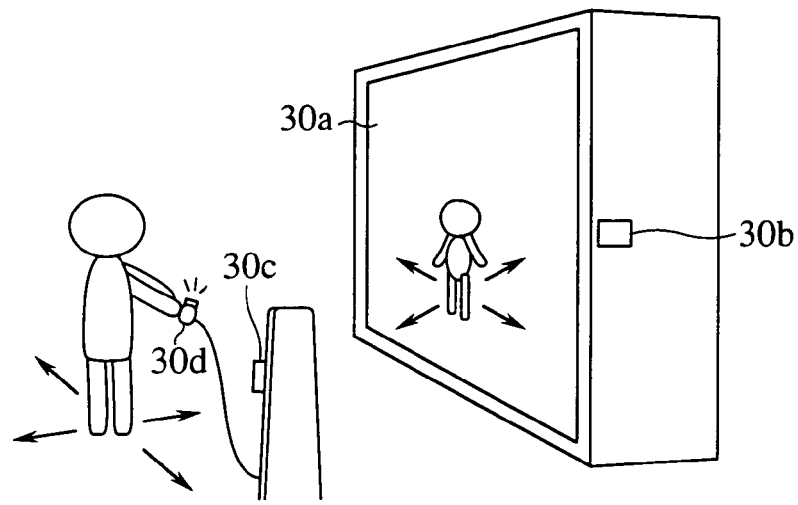
FIG. 13 is a view explaining a 3D action game played on the game apparatus according to a thirst embodiment of the present invention.

FIG. 13 shows a 3D action game. In the above-described embodiments, a three-dimensional position is detected by the two light detection units disposed on the video monitor. However, as shown in FIG. 13, a light detection unit 30b is disposed on a video monitor 30a to detect a position in X-Y plane. A light detection unit 30c is disposed on a side surface of a region where a game player moves to detect a position in Y-Z plane. Thus, motions of the game player are detected in three dimensions. The game player displaces the light emitting unit 30d forward or backward, or left or right, whereby a character on the video monitor 30a can be operated forward or backward, or left or right.

(Position Selecting Game)

Figure 14:
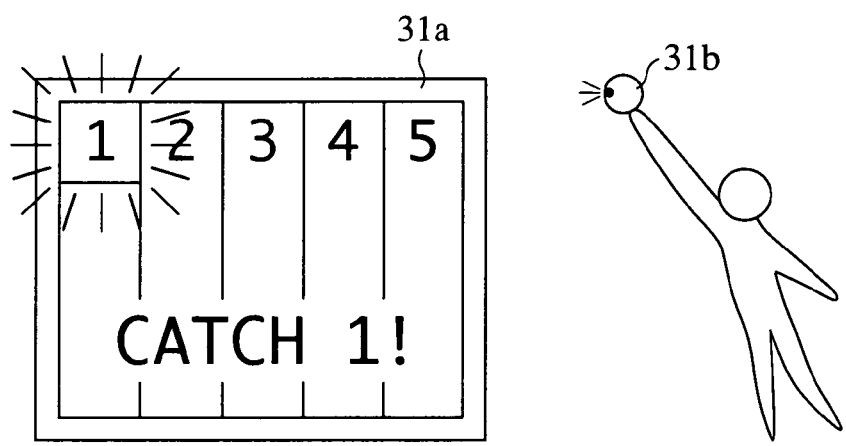
FIG. 14 is a view explaining a position selecting game played on the game apparatus according to the third embodiment of the present invention.

FIG. 14 shows a position selecting game. A panel is displayed on a video monitor 31a, and a game player holds a light emitting unit 31b in the hand to indicate an arbitrary position. When a command is made to point a specific position, e.g., the position of 1, on the panel displayed on the video monitor 31a, a game player moves for the light emitting unit 31b to indicate the position. The game player competes in how many times he can correctly indicate positions.

(Sports Game)

Figure 15:
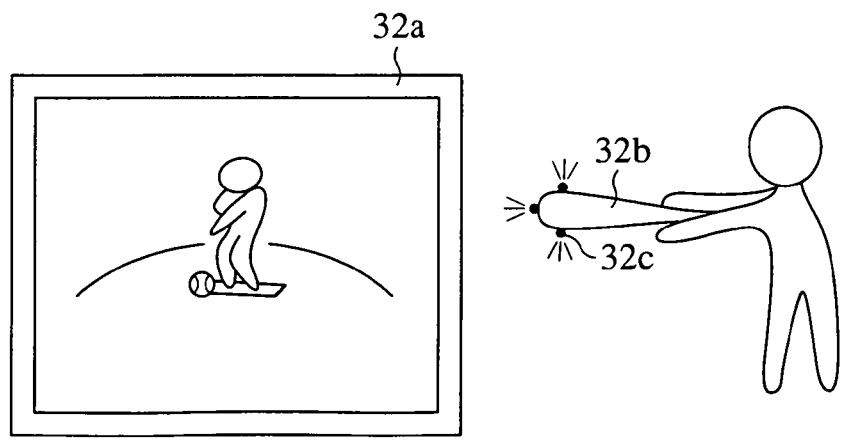
FIG. 15 is a view explaining a sports game played on the game apparatus according to the third embodiment of the present invention.

FIG. 15 shows a sports game. In a baseball game, a display that a batter hits is presented on a video monitor 32a, and a bat 32b with a plurality of light emitting units 32c mounted on is prepared. When a game player actually swings the bat, a spatial trace of the bat 32b is detected, and a batter in the baseball game hits based on the spatial trace. If it is difficult to detect a spatial trace of the bat 32b, a start and an end of the bat 32b are detected, and the start and the end of the bat 32b may be reflected in the game.

As one of other sports games, in a fighting game using a fighting implement, such as a sword or the like, a plurality of light emitting units are mounted on the fighting implement, and the fighting game is played based on a trace of the fighting implement operated by a game player.

(Pose Game)

Figure 16:
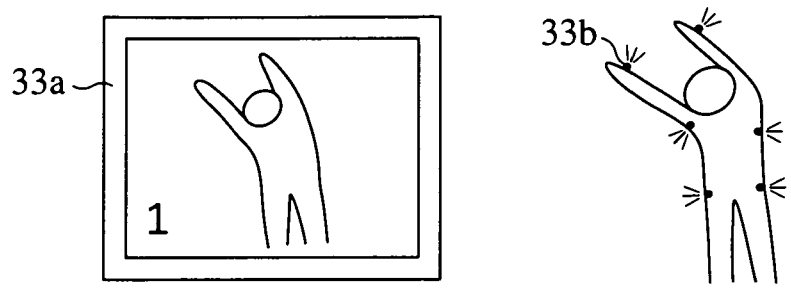
FIG. 16 is views explaining a dancing posture designing game played on the game apparatus according to the third embodiment of the present invention.

FIG. 16 shows a pose game. A plurality of light emitting units 33b are mounted on the arms, the legs and the body of a game player, and positions of the light emitting units 33b are detected to judge a motion and a pose of the game player. A pose to be commanded to a game player is displayed on a video monitor 33a. The game player makes in a prescribed period of time a motion or a pose which agrees with the commanded pose. Various poses are sequentially indicated to the game player. Game players compete in whether the game players can correctly make motions and poses corresponding to the various poses.

(Fighting-Type Games)

Figure 17:
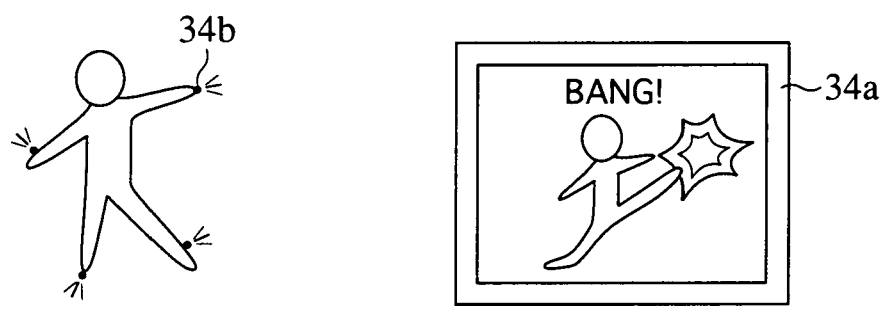
FIG. 17 is views of a fighting game played on the game apparatus according to the third embodiment of the present invention.

FIG. 17 shows a fighting-type game. Light emitting units 34b are mounted on the arms and legs of a game player.

Positions of the light emitting units 34*b* are detected to judge a motion and a pose of the game player. When the game player makes a motion of hit with the arm or the leg, a character on a video monitor 34*a* makes the hitting motion to fight an opponent character. The game player competes in whether the character can hit the opponent character.

(Motion Game)

Figure 18:
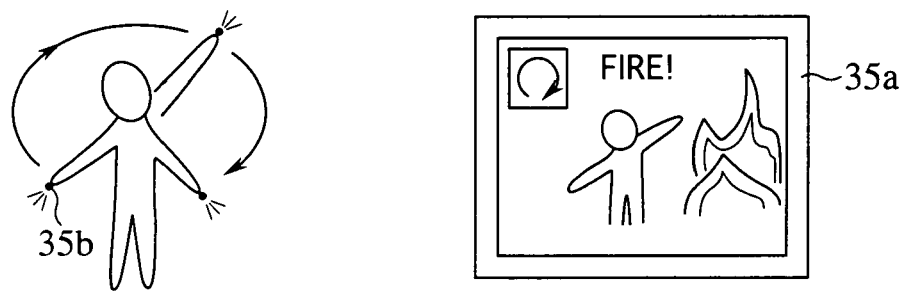
FIG. 18 is views explaining a magic game played on the game apparatus according to the third embodiment of the present invention.

FIG. 18 shows a motion game. Light emitting units 35*b* are mounted on the hands of a game player. A motion commanding a game player to make a magic is indicated on the video monitor 35*a*. The game player makes the indicated motion. When the game player can make the motion well, the command by the motion is effective. For example, as shown in FIG. 18, when a command to rotate the hands is indicated at an upper left part of the video monitor 35*a*, the game player sees the indication and makes a motion of rotating the hands. When his motion is correct, the command becomes effective.

(Drawing Game)

Figure 19:
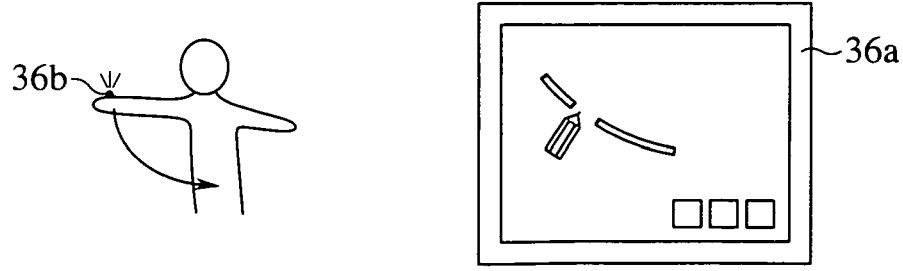
FIG. 19 is a view explaining a drawing game played on the game apparatus according to the third embodiment of the present invention.

FIG. 19 shows a drawing game. A light emitting unit 36*b* is mounted on the hand of a game player. When the game player moves the hand, a trace of the light emitting unit 36*b* is detected, and a line corresponding to the trace is drawn on a canvas of the video monitor 35*a*. A drawing implements and colors are selected by commanding pallets indicated at a lower right part of the video monitor 35*a*. The game player can draw pictures on a space.

(Zenigata Heiji Game)

Figure 20C:
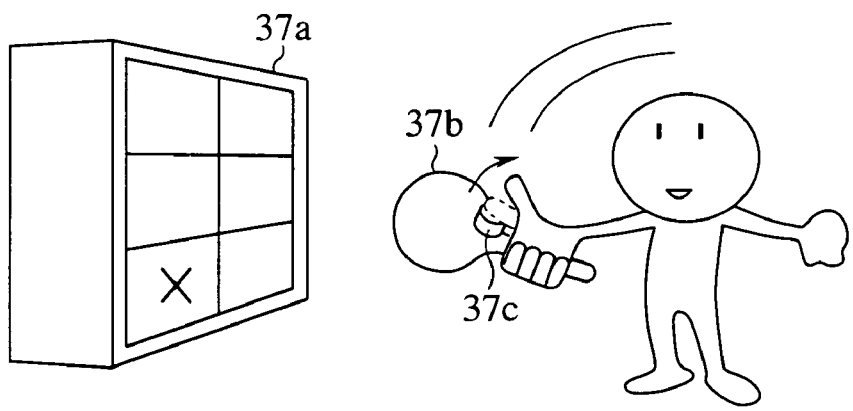

FIG. 20 shows Zenigata Heiji game. A game player holds operation device 37*b* in the hand, and swings and stops the operation device 37, whereby a coin is thrown in the direction where the operation device 37 has been stopped. The game player first stand with the operation device 37*b* in the hand, opposing the video monitor 37*a* (FIG. 20A). Then, the game player swings the operation device 37*b* to above the head and presses button 37*c* (FIG. 20C). Next, the game player swings down the operation device 37*b* from above the head and releases the button 37*c* (FIG. 20C). Speed and a direction of a thrown coin are determined based on speed of the down swing, a direction of the down swing, a timing of pressing and releasing the button 37*c*, etc. The game player competes in whether a target displayed on the video monitor is hit.

A FOURTH EMBODIMENT

The game apparatus according to a fourth embodiment of the present invention will be explained with reference to FIGS. 21 to 30. In the present embodiment, the music games played on the game apparatus according to the first to the third embodiments, which are for commercial uses, are applied to the game apparatus for domestic uses. The contents of the games are applicable as they are, but the method for detecting positions of the maraca-shaped operation device must consider that the game apparatus according to the present embodiment is for domestic uses. The present embodiment provides various examples of the system for detecting positions of the operation device which are made applicable to the game apparatus for domestic uses. The systems for detecting positions of the operation device used in the present embodiment are not essentially limited to the game apparatus for domestic uses but are applicable to the game apparatus for commercial uses.

(Photodetection System (Part 1))

Figure 21:
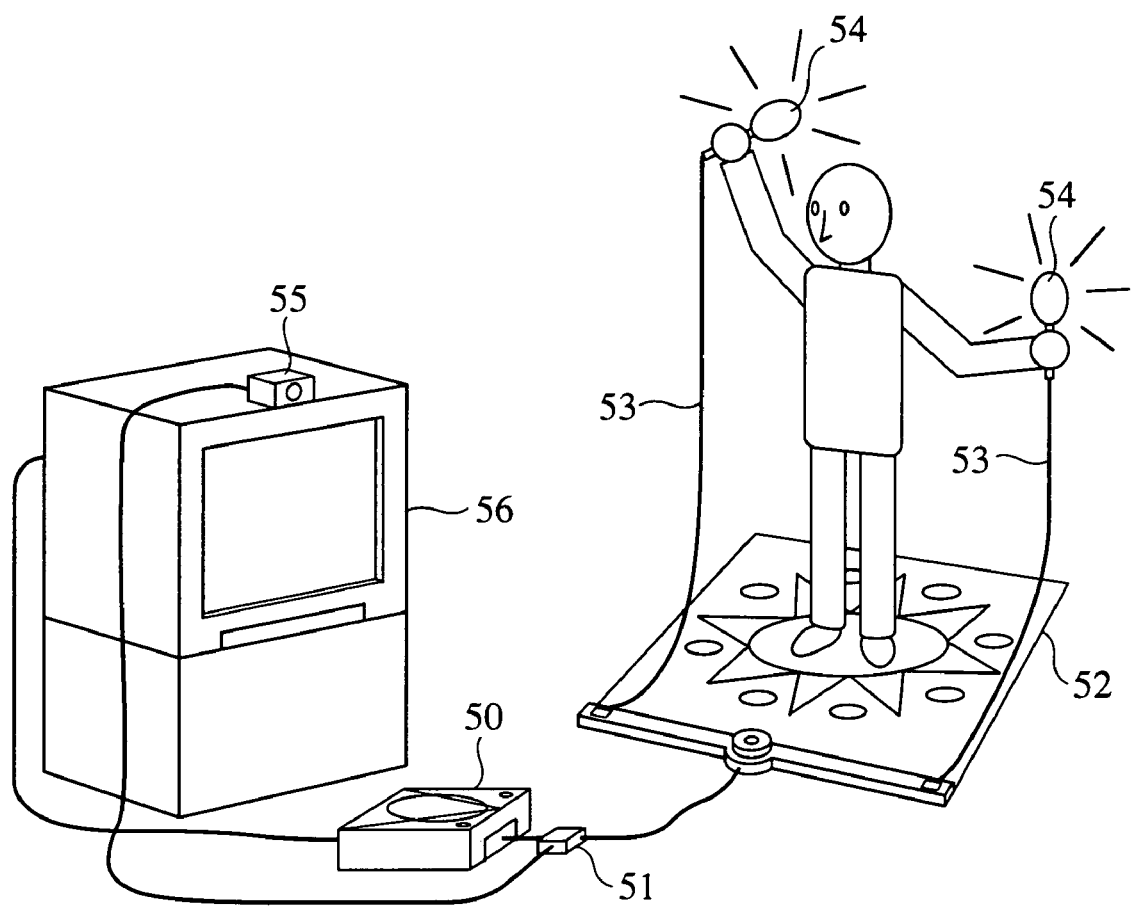
FIG. 21 is a schematic view of a first example (photodetection system (Part 1)) of the game apparatus according to a fourth embodiment of the present invention.

A first example of the game apparatus according to the present embodiment will be explained with reference to FIG. 21. As shown in FIG. 21, in the game apparatus in which the present example is used, a peripheral box 31 is connected to a game apparatus body 50. The peripheral box 31 is connected to an operation mat 52, and to maraca-shaped operation device 54 through cables 53 extended from the operation mat 52. The peripheral box 51 is connected to a light detection unit 55. The game apparatus body 50 is connected to a television monitor 56 for domestic use. The light detection unit 55 is fixed to the top of the television monitor 56.

The maraca-shaped operation device 54 have the same structure as the maraca-shaped operation device of the above-described first embodiment. The operation device 54 is a pair and are operated by a game player on the operation mat 52 holding the operation device 64 respectively in the hands. As in the structure shown in FIG. 2, the maraca-shaped operation device have a maraca-like shape, and a plurality of LEDs which are the light emitting unit are buried in the egg-shaped bodies, and buttons are provided in the grips. Round balls are in the inside cavities of the operation device 50 and make characteristic sounds of maracas when the operation device 54 are shaken. Vibrated states of the operation device 54 are detected by, e.g., a microphone. The buttons are not provided, but positions may be indicated by the operation device in place of the operation of the buttons.

The method for detecting positions of the operation device 54 by the light detection unit 55 is the same as described in the above-described first embodiment. As in the structure shown in FIG. 6, in the light detection unit 55 a light detection unit is disposed on an inside surface of the light detection box, and an aperture is opened in the surface of the light detection box opposed to the light detection unit. The light detection unit detects spatial positions of the operation device 54 with respect to the light detection unit 55. The two operation device 54 are discriminated from each other by alternately lighting the light emitting units.

When the game is played on the present game apparatus by two game players, another operation mat 52, operation device 54 and light detection unit 55 are prepared, and the operation mat 52 is placed at a location where the operation mats 52 do not interfere with each other.

Figure 22:
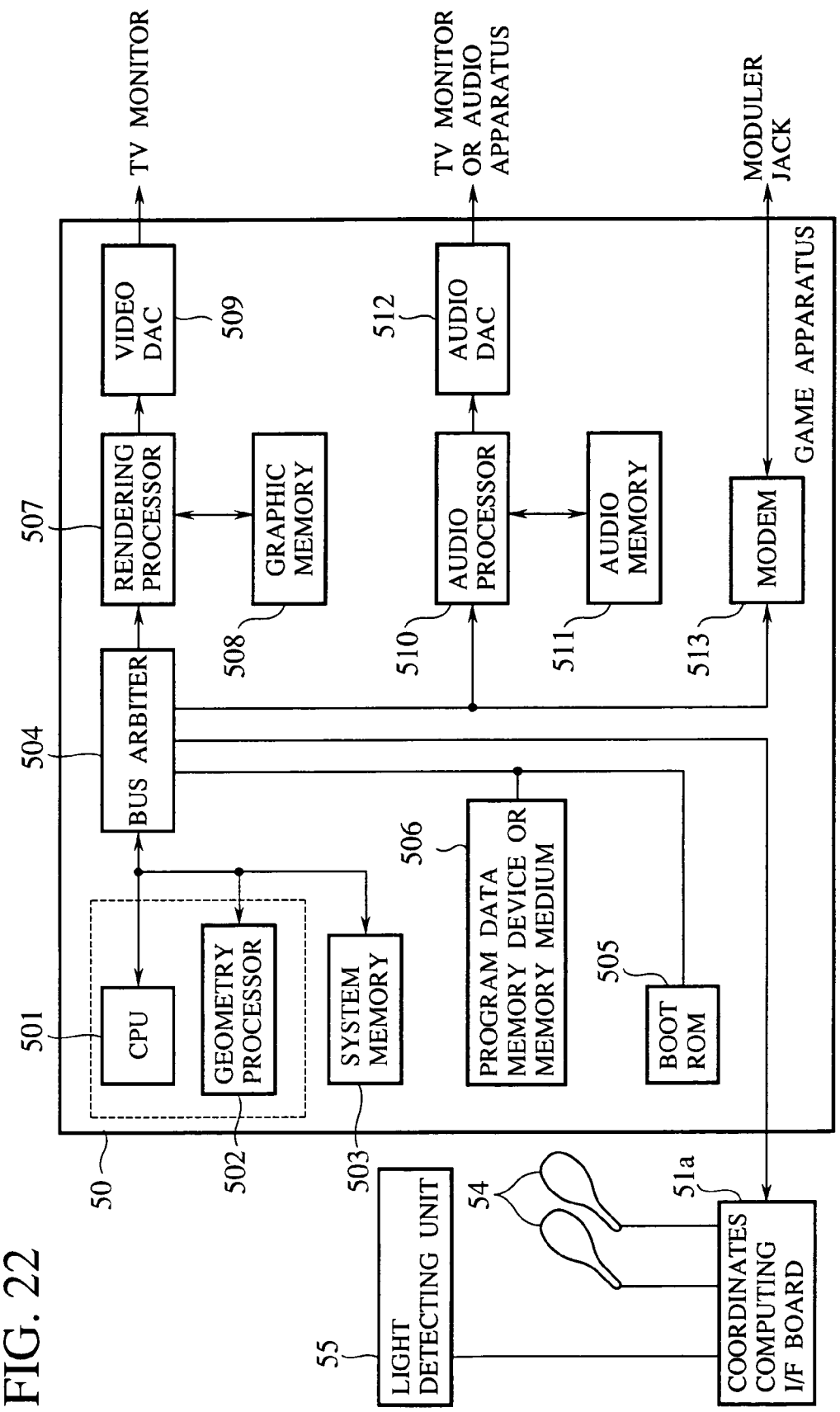
FIG. 22 is a block diagram of the game apparatus according to the fourth embodiment of the present invention.

The structure of the game apparatus will be explained with reference to FIG. 22. The game apparatus body 50 includes a CPU 501 which generally controls execution of programs and the game apparatus, a geometry processor 502 which performs geometry computation, and a system memory 503 as a buffer memory which stores programs and data necessary for the CPU 501 and the geometry processor 502 to perform the processing. They are connected to a bus arbiter 504 which controls buses. The bus arbiter 504 controls flows of the programs and data among the game apparatus body 50, the respective blocks and outside connected machines.

The bus arbiter 504 is connected to a BOOT ROM 505 storing a program for actuating a game, and program/data storage means storing game programs and data or a storage medium 506 through a bus line.

The bus arbiter 504 is connected to a rendering processor 507 which reproduces movie data read from the program data storage means or the storage medium 506, and generates images to be displayed in accordance with operations of a game player and proceedings of a game. The rendering processor 507 includes a graphic memory 504 which stores graphic data, etc. necessary to generate images. An output of the rendering processor 507 is outputted to an outside television monitor 56 through a video DAC 509 which performs digital/analog conversion of graphic data.

The bus arbiter 504 is connected to an audio-processor 510 which reproduces music read from the program data storage means or a storage medium 506 and reproducing effective sounds and voices in accordance with operations of a game player and proceedings of a game. The audio-processor 510 includes an audio-memory 511 which stores sound data, etc. for generating effective sounds and voices. An output of the audio-processor 510 is supplied to the outside television monitor 56 or outside audio means through an audio DAC 512 which performs digital/analog conversion of audio data.

The bus arbiter 504 also functions as an interface. A modem 513 is connected to the arbiter 504, and the whole game apparatus body 50 is connected to an outside communication circuit through a modular cable.

The arbiter 504 is connected to a coordinates computing I/F board 51a which is incorporated as a peripheral in the peripheral device box 51. The coordinate computing I/F board 51a is connected to the maraca-shaped operation device 54 and the light detection unit 55.

As described above, according to the present embodiment, by using the same system as that of the commercial game apparatus, music games using the maraca-shaped operation device can be played on the domestic game apparatus.

(Photodetection System (Part 2))

Figure 23:
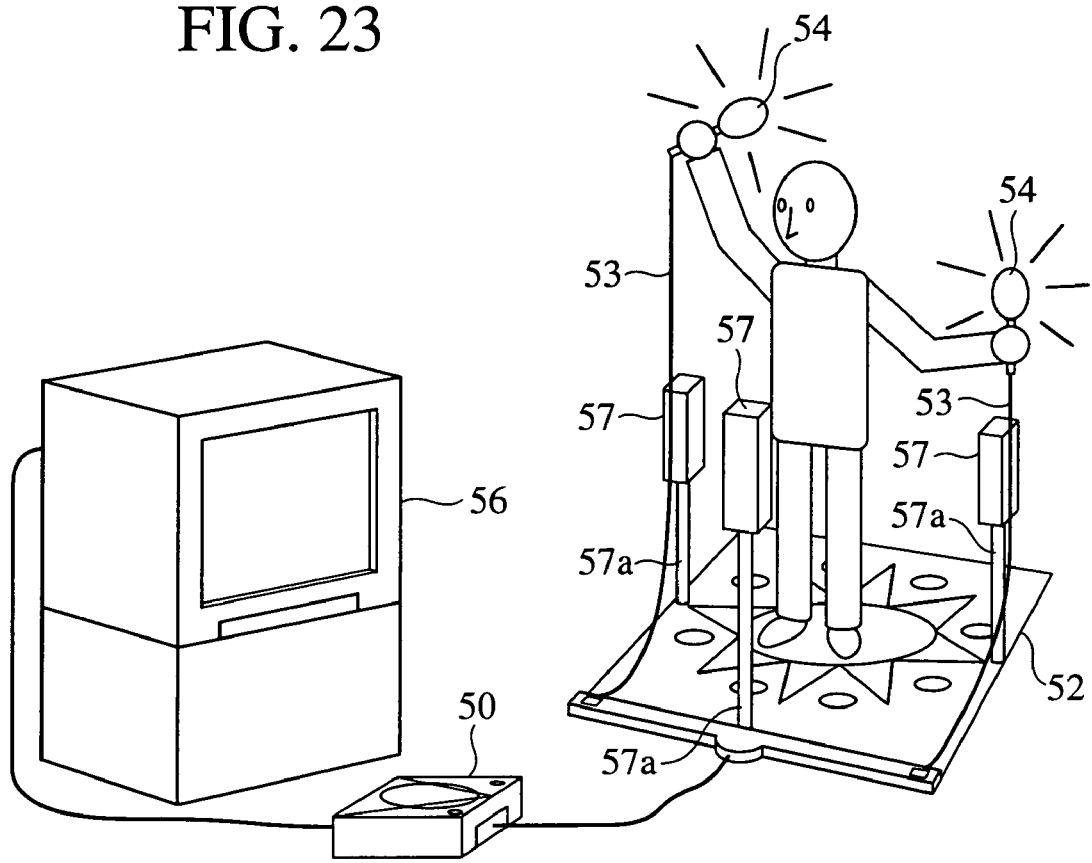
FIG. 23 is a schematic view of a second example (photodetection system (Part 2)) of the game apparatus according to the fourth embodiment of the present invention.
Figure 24A:
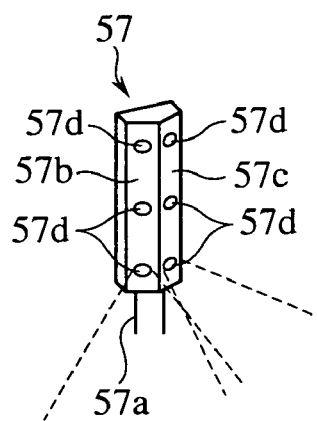
FIG. 24 is views of a light detection unit of the second example (photodetection system (Part 2)) of the game apparatus according to the fourth embodiment of the present invention.

A second example of the game apparatus according to the present embodiment will be summarized with reference to FIGS. 23 and 24. As shown in FIG. 23, in the game apparatus according to the present example, three light detection units 57 are provided on the front edge and the left and the right edges of an operation mat 52. As shown in FIG. 24A, each light detection unit 57 includes light detection surfaces 57b, 57c on a pole 57a, which form a prescribed angel to each other, and three light detection elements 57d disposed on each of the light detection surface 57b, 57c vertically at a prescribed pitch.

The three light detection elements 57d on each of the light detection surface 57b, 57c detect a vertical position, and the three light detection units 57 detect spatial positions of the maraca-shaped operation device 54 above the operation mats 52.

When a game is played on the present game apparatus by two game players, another operation mat 52 with the light detection unit 57 provided, another set of the operation device 54 are prepared, and the operation mats 52 are placed at locations where they do not interfere with each other.

The light detection unit 57 shown in FIG. 24A is not provided on all of the front edge and the left and the right side edges but may be provided on two or one of these edges.

Figure 24B:
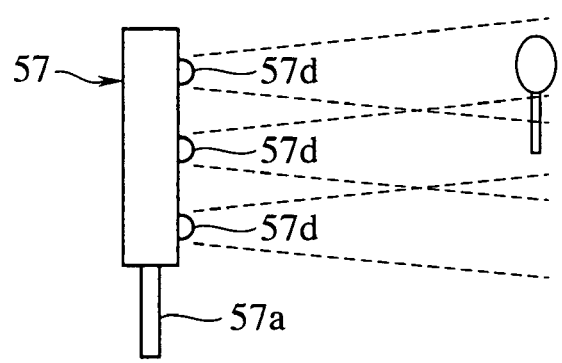

As shown in FIG. 24B, it is possible that three light detection elements 57d are disposed vertically at a prescribed pitch on the light detection unit 57. In this case, the light detection unit 57 may not be provided on all the front edge and the left and the right side edges but may be provided on two or one of these edges.

Light detection/emitting elements incorporating a light emitting element for emitting light and a light detection element for detecting reflected light are provided, in place of the light detection elements 57d, on the light detection units 57 provided on the operation mat 52, and reflected light from the maraca-shaped operation device 54 is detected to thereby detect spatial position of the operation device.

According to the present example, the light detection elements or the light detection/light emitting elements are provided on the operation mat, whereby it is not necessary to adjust relationships between a game player and outputs of the light emitting elements, whereby the game player can immediately start a game.

It is possible that, oppositely to the present example, the light emitting elements are provided on the operation mat, and the light detection elements or the light detection/light emitting elements are provided on the maraca-shaped operation device.

(Photodetection System (Part 3))

Figure 25:
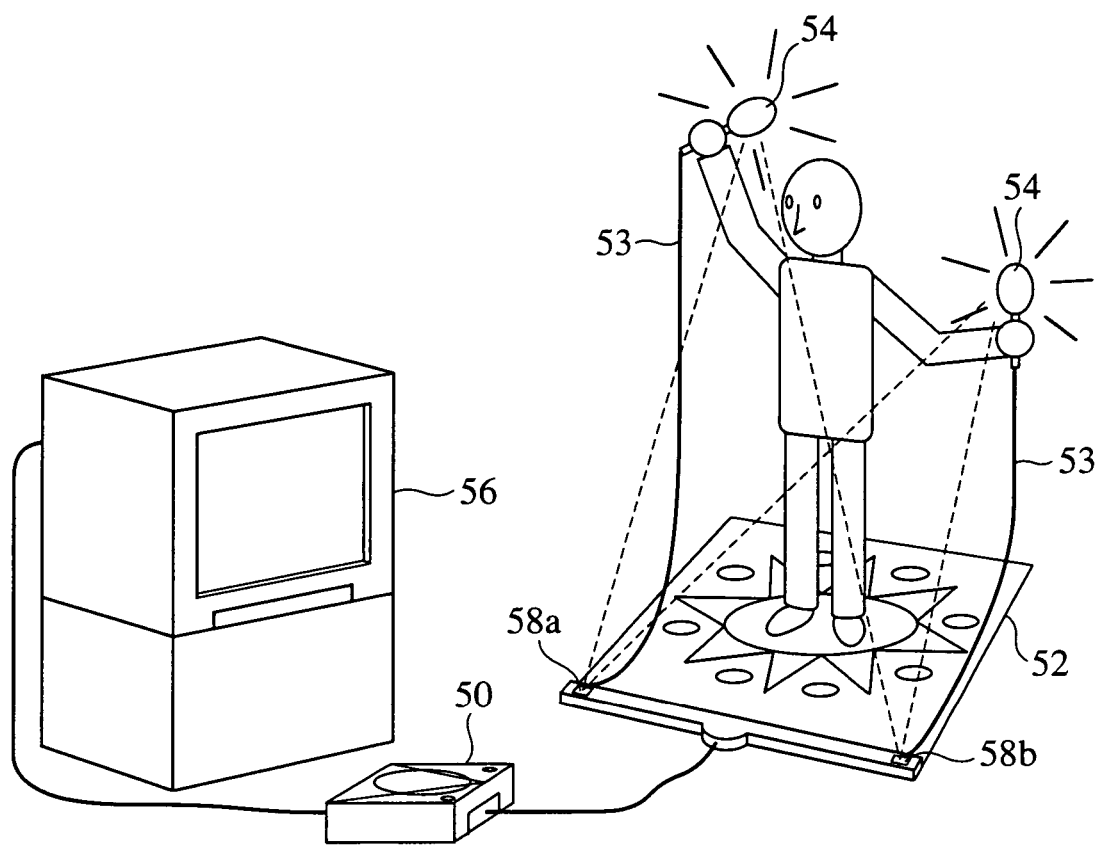
FIG. 25 is a schematic view of a third example (photodetection system (Part 3)) of the game apparatus according to the fourth embodiment of the present invention.

A third example of the game apparatus according to the present embodiment will be summarized with reference to FIG. 25. As shown in FIG. 25, Light detection units 58a, 58b are provided at corners of an operation mat 52. Light from maraca-shaped operation device 54 is detected by the two left and right light detection units 58a, 58b to detect spatial positions of the operation device 54. Heights of the operation device 54 are detected based on absolute values of detected light amounts of the two light detection units 58a, 58b, and lateral positions of the operation device 54 are detected based on a difference between the detected light amount of the two light detection units 58a, 58b.

When a game is played on the present game apparatus by two game players, another operation mat 52 with the light detection units 58a, 58b provided and another sets of operation device 54 are prepared. The operation mats 52 are placed at locations where they do not interfere with each other.

According to the present example, the light detection elements are provided on the operation mat, whereby it is not necessary to adjust relationships between a game player and outputs of the light emitting elements, whereby the game player can immediately start a game.

It is possible that, oppositely to the present example, the light emitting elements are provided on the operation mat, and the light detection elements are provided on the maraca-shaped operation device.

(Supersonic System)

Figure 26:
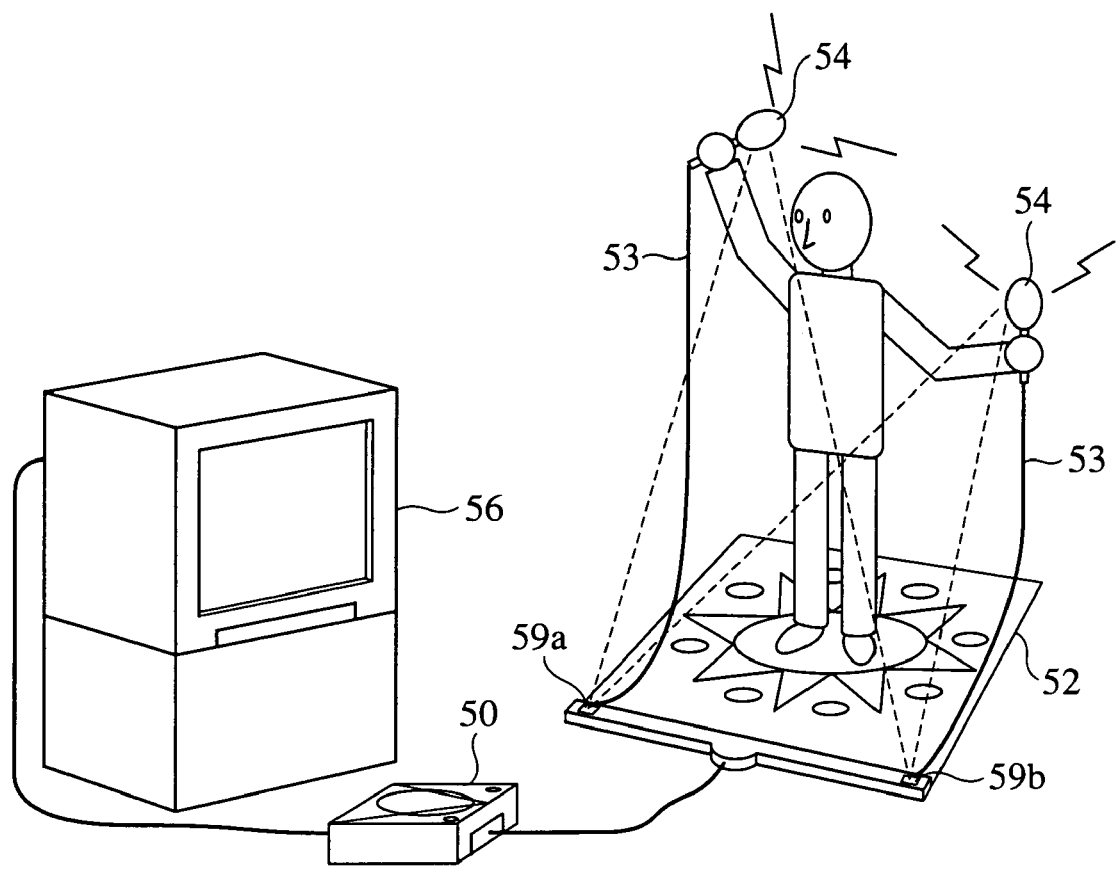
FIG. 26 is a schematic view of a fourth example (supersonic system) of the game apparatus according to the fourth embodiment of the present invention.

A fourth example of the game apparatus according to the present embodiment will be summarized with reference to FIG. 26. In the game apparatus according to the present example, as shown in FIG. 26, pulsed supersonic wave in place of light is emitted, and supersonic wave receiver units 59a, 59b are provided on corners of an operation mat 52. Supersonic wave emitted from maraca-shaped operation device 54 is received by the two left and right supersonic wave receiver units 59a, 59b to detect spatial positions of the operation device 54. Periods of time from the oscillation of supersonic wave by the operation device 54 to the receipt of the supersonic wave by the two supersonic wave receiver units 59a, 59b are measured to detect heights of the operation device 54, based on absolute value of measured periods of time, and lateral positions of the operation device 54 are detected based on a difference between the measured periods of time given by the two supersonic wave receiver units 59a, 59b.

When a game is played on the present game apparatus by two game players, another operation mat 52 with the supersonic wave receiver units 59a, 59b and another set of the operation device 54 are prepared. The operation mats are placed at locations where they do not interfere with each other.

According to the present example, the supersonic wave receiver units are provided on the operation mat, whereby relationships between a position of a game player and output of the supersonic receiver units must not be adjusted in advance. The game player can immediately start a game.

It is possible that, oppositely to the present example, supersonic wave is emitted from the operation mat, and the supersonic wave is received by the supersonic wave receiver units provided on the operation device.

(Image Recognition System)

Figure 27:
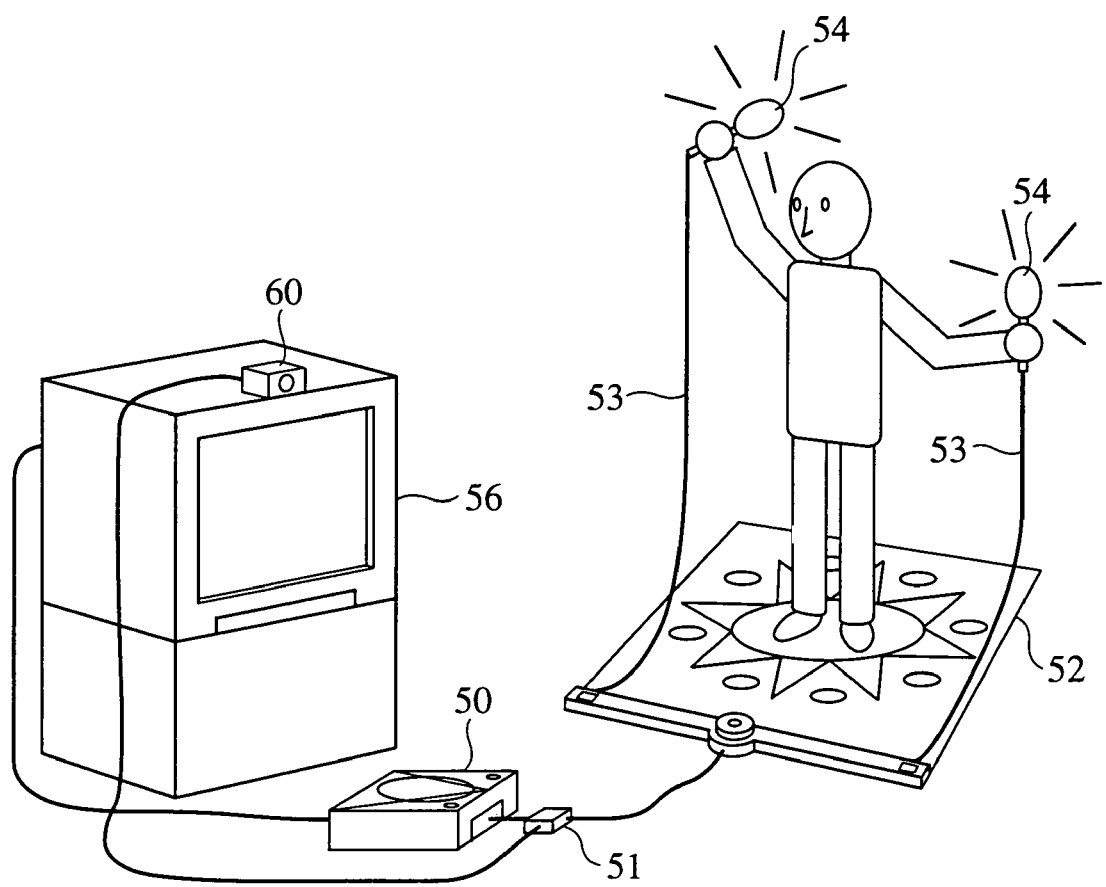
FIG. 27 is a schematic view of a fifth example (image recognition system) of the game apparatus according to the fourth embodiment of the present invention.

A fifth example of the game apparatus according to the present embodiment will be summarized with reference to FIG. 27. In the game apparatus according to the present example, as shown in FIG. 27, image recognition means 60 which recognizes an image is provided on a television monitor 56 in place of the light detection unit 55. Maraca shaped operation device 54 may emit infrared radiation as in the first example, so that the image recognition means 60 can easily discriminate the infrared radiation. Otherwise, the maraca-shaped operation device may be colored in a specific color.

The image recognition means 60 can be provided by, for example, an artificial retina, CMOS image sensor, CCD sensor or others, and recognizes the images of the maraca-shaped operation device to compute their spatial positions, based on recognized images.

When a game is played on the present game apparatus by two game players, another operation mat 52, another set of the operation device 54 and another image recognition means 60 are prepared, and the operation mats are placed at locations where they do not interfere with each other.

According to the present example, as in the commercial game apparatus, music games using the maraca-shaped operation device can be played.

(Reel System (Part 1))

Figure 28:
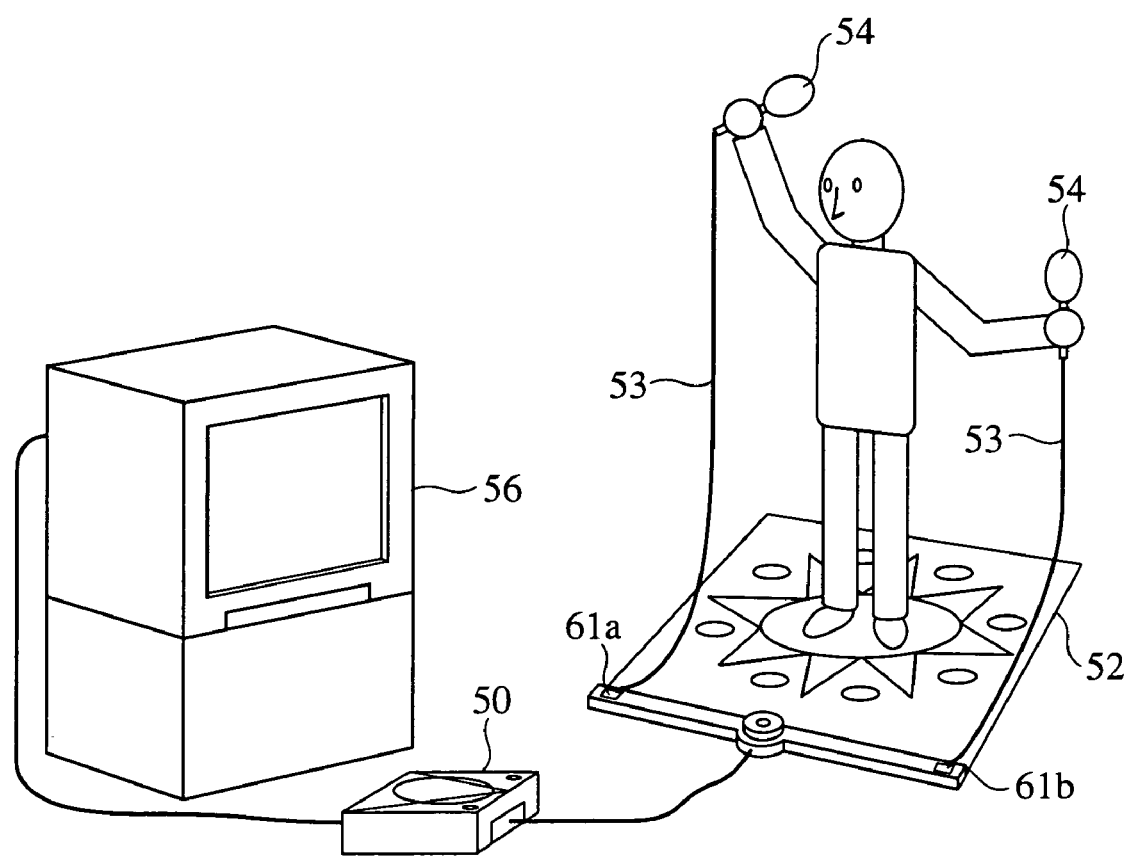
FIG. 28 is a schematic view of a sixth example (reel system (Part 1)) of the game apparatus according to the fourth embodiment of the present invention.

A sixth example of the game apparatus according to the present embodiment will be summarized with reference to FIG. 28. In the game apparatus according to the present example, as shown in FIG. 28, cable reeling mechanisms 61a. 61b which wind cables 53 connected to maraca-shaped operation device 54 are provided on corners of an operation mat 52. The cable reeling mechanisms 61a, 61b wind the cables 53 of the maraca-shaped operation device 54 to thereby count wound length of the cables 53 by an encoder to thereby measure distances of the operation device 54 to the operation mat 52. Based on measured distances, positions of the maraca-shaped operation device 54 can be detected.

When a game is played on the present game apparatus by two game players, another operation mat 53 with the cable reeling mechanisms 61a, 61b provided, and another sets of the operation device 54 are prepared. Because distances are measured by lengths of the cables 53, it is not necessary to consider especially that the game players may interfere with each other.

According to the present example, because the cable reeling mechanisms are provided on the operation mat, it is not necessary to adjust in advance relationships between positions of a game player and a count number of the encoder in advance. The game player can start a game immediately after the game apparatus is installed.

It is possible that, oppositely to the present example, the cable reeling mechanisms are provided on the maraca-shaped operation device to measure lengths of reeled cables.

(Reel System (Part 2))

Figure 29:
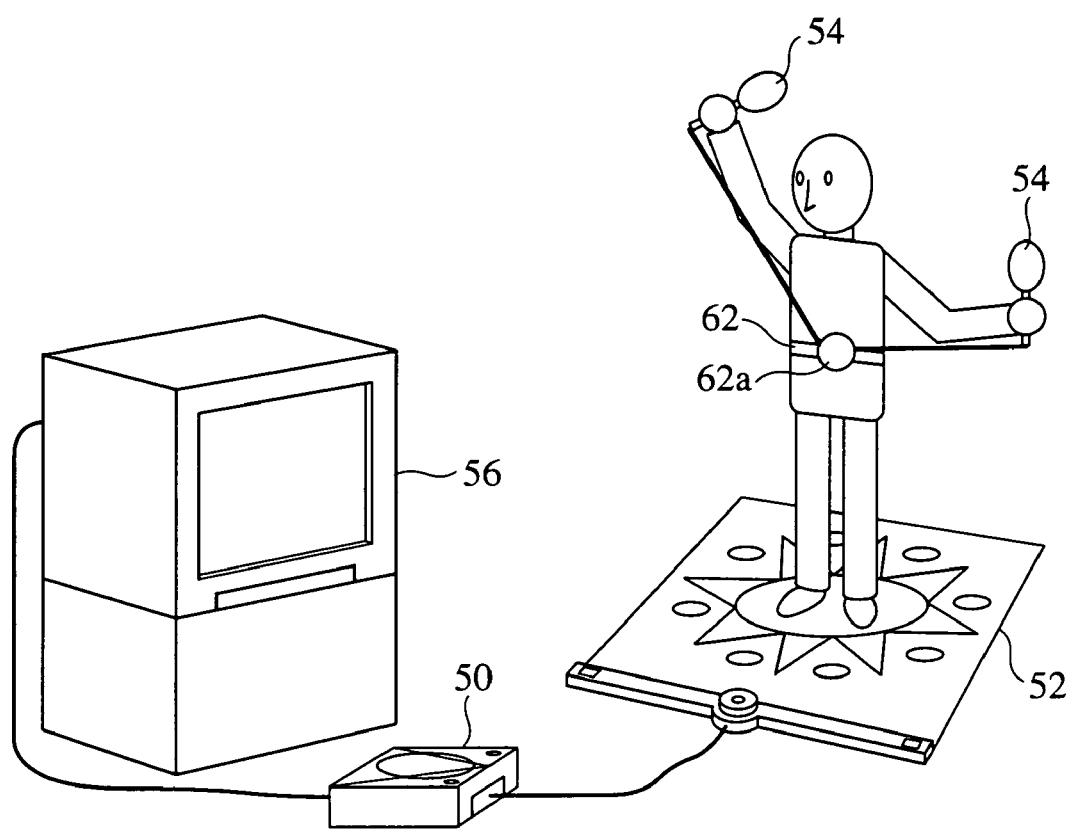
FIG. 29 is a schematic view of a seventh example (reel system (Part 2)) of the game apparatus according to the fourth embodiment of the present invention.

A seventh example of the game apparatus according to the present embodiment will be summarized with reference to FIG. 29. In the game apparatus according to the present example, as shown in FIG. 29, a belt 62 to be worn by a game player on the waist is prepared. A cable reeling mechanism 62a for reeling cables 53 connected to maraca-shaped operation device 54 is disposed on the belt 62. When a game player plays a game, he wears the belt 62 on the waist.

The cable reeling mechanism 62a disposed on the belt 62 winds the cables 53 of the maraca-shaped operation device 54 to count wound lengths of the cables 53 by an encoder so as to measure distances from the center of the body of the game player to the operation device 54. Based on the measured distances, positions of the maraca-shaped operation device 54 are detected. The operation mat 52 is not essential.

When a game is played on the present game apparatus by two game players, another belt 62 with the cable reeling mechanism 62 provided, and another set of the operation device 54 are prepared. Because distances are measured based lengths of the cables 53, it is not necessary to consider especially that the game players may interfere with each other.

According to the present example, because the cable reeling mechanism is provided on the belt to be worn on the waist, an area where a game player play a game is not limited to the operation mat and can play music games anywhere in more free actions.

It is possible that, oppositely to the present example, the cable reeling mechanism is provided on the side of the maraca-shaped operation device to thereby measure lengths of wound cables.

(Pressure System)

Figure 30:
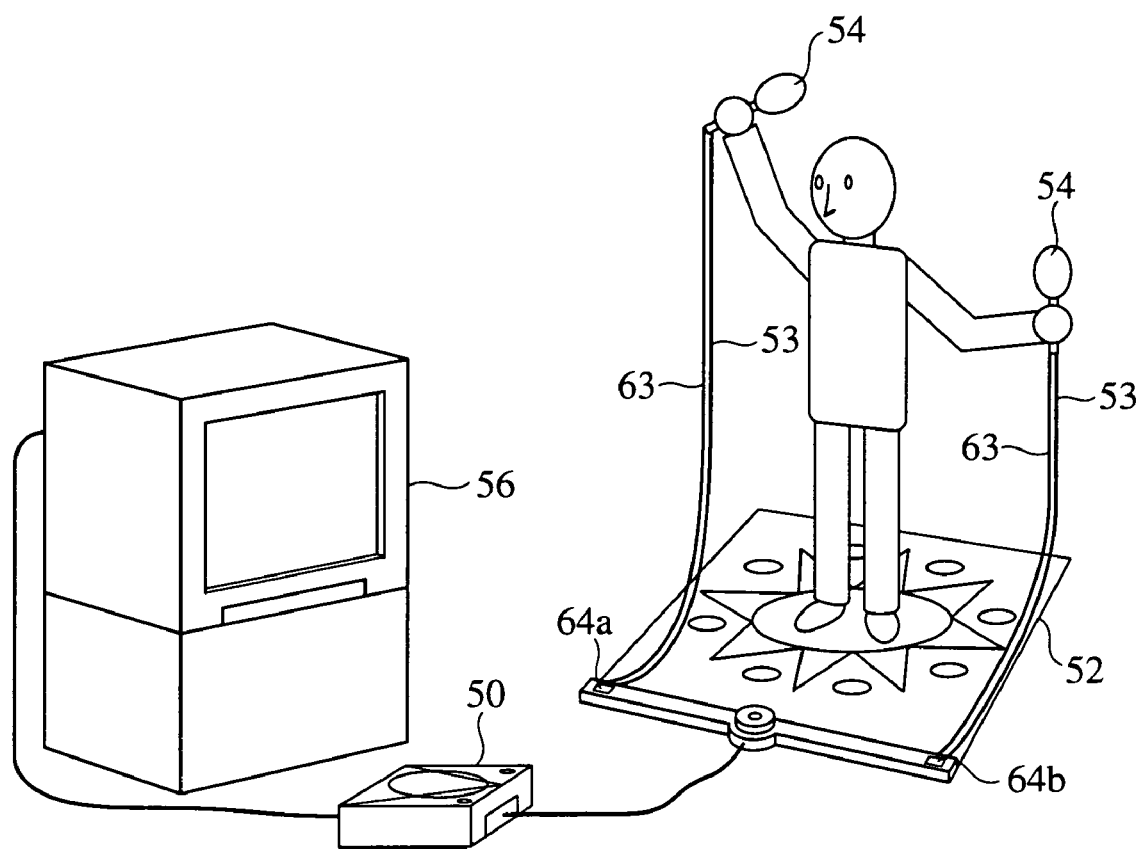
FIG. 30 is a schematic view of an eighth example (pressure system) of the game apparatus according to the fourth embodiment of the present invention.

An eighth example of the game apparatus according to the present embodiment will be summarized with reference to FIG. 30. In the game apparatus according to the present example, as shown in FIG. 30, tubes 63 in which liquid, e.g., water is passed are provided in parallel with cables 53 connected to maraca-shaped operation device 54, and pressure gauging means 64a, 64b for gauging pressures in the tubes 63 are provided on corners of an operation mat 52. The pressure gauging means 64a, 64b gauge pressures in the tubes 63 to measure distances from the operation mat 52 to the operation device 54. Positions of the maraca-shaped operation device 54 are detected based on measured distances.

When a game is played on the present game apparatus by two game players, another operation mat with the pressure gauging means 64a, 64b provided, and another set of the operation device 54 are prepared. Because distances from the operation mat 52 to the operation device 54 are measured based on gauged pressures in the tubes 53, it is not necessary to consider especially that the game players may interfere with each other.

According to the present example, the tubes with liquid passed through are provided in parallel with the cables, and the pressure gauging means are provided on the operation mat, whereby positions of the operation device can be measured without failure.

(Cable Resistance System)

Figure 31:
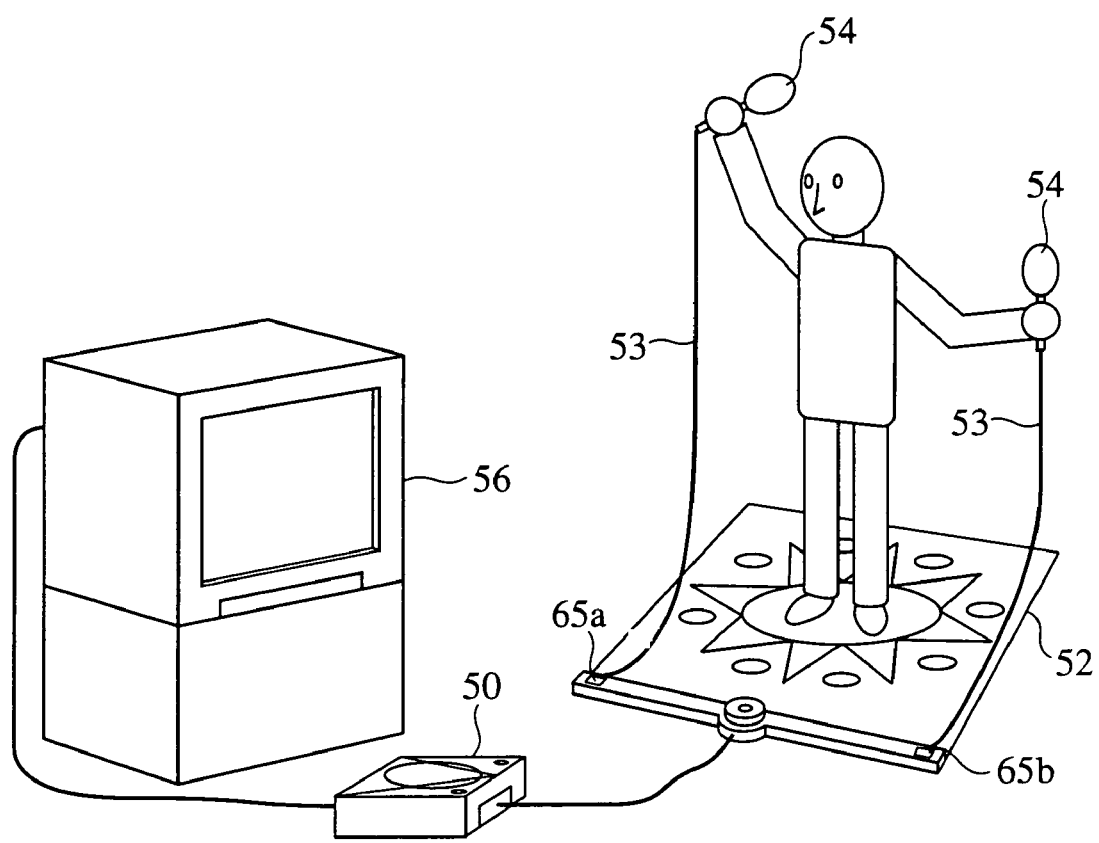
FIG. 31 is a schematic view of a ninth example (cable resistance system) of the game apparatus according to the fourth embodiment of the present invention.

A ninth example of the game apparatus according to the present embodiment will be summarized with reference to FIG. 31. In the game apparatus according to the present example, as shown in FIG. 31, a resistance film is formed on the surface of cables connected to maraca-shaped operation device 54, and resistance measuring means 65a, 65b for measuring resistance values of the cables 53 are provided on corners of an operation mat. The resistance measuring means 65a, 65b measure resistance values of the surfaces of the cables 53 to measure distances form the operation mat 52 and the operation device 54. Based on measured distances, positions of the maraca-shaped operation device 54 are detected.

When a game is played on the present game apparatus by two game players, another operation mat with the resistance measuring means 65a, 65b provided, and another set of operation device 54 are prepared. Because distances are measured based on resistance values of the surfaces of the cables 53, it is not necessary to consider especially that the game players may interfere with each other.

In place of resistance values of the cables, capacitances of the cables may be measured.

According to the present example, because of the resistance film formed on the surface of the cables, and the resistance measuring means provided on the operation mat, positions of the operation device can be measured without failure.

It is possible that, oppositely to the present example, the resistance measuring means are provided on the side of the maraca-shaped operation device, whereby distances from the operation mat to the operation device are measured.

(Other Systems)

The game apparatus according to the present embodiment may use systems other than the above-described examples to detect positions of the operation device.

For example, infrared radiation is applied from the operation mat to above positions of the operation device, and amounts of light reflected on the maraca-shaped operation device are measured, and based on the measured light amounts, positions of the operation device may be detected.

A screen in the form of a transparent acrylic board with a plurality of switches provided is positioned between a television monitor and the operation device. A game player strikes the switches on the acrylic board with the operation device he is holding in the hands to play a music game.

A pendant with light detection elements for detecting infrared radiation is prepared. A game player suspends the pendant on the neck. The light detection elements on the pendant detect the infrared radiation emitted by the operation device to thereby detect positions of the operation device. Light detection/emitting elements in place of the light detection elements are provided on the pendant, and infrared radiation is emitted from the pendant, and that of the infrared radiation reflected on the operation device is detected to detect positions of the operation device.

A wing-shaped accessory to be worn on the back of a game player is prepared. Light detection elements are buried in the wings. Infrared radiation emitted from the operation device is detected by the light detection elements to detect positions of the operation device. Light detection/emitting elements in place of the light detection elements are provided on the accessory. Infrared radiation is emitted from the wings of the accessory, and that of the infra-red radiation reflected on the operation device is detected to detect positions of the operation device.

A cap to be worn on the head of a game player is prepared. A sensor, such as light detection elements, light detection/emitting elements, image recognition means, supersonic detection element or the like is buried in the brim. Positions of the operation device are detected by the sensor provided in the bin of the hat.

The maraca-shaped operation device are suspended from a rail. The rail is provided in a range where a game player can cover. The game player operates the operation device suspended from the rail, and positions of the operation device are measured by an encoder or position switches provided on the rail.

A FIFTH EMBODIMENT

The game apparatus according to a fifth embodiment of the present invention will be explained with reference to FIGS. 32 to 39. As in the above-described fourth example of the fourth embodiment, the game apparatus according to the present embodiment is formed as a maraca controller which is a peripheral device for the game apparatus which is for domestic uses. Supersonic wave is emitted from maraca-shaped operation device, and the supersonic wave is detected by corners of an operation mat to detect positions of the operation device. The position detection system used in the present embodiment is not limited to the game apparatus for domestic uses and is applicable to the game apparatus for commercial uses.

(Summary of the Game Apparatus)

Figure 32:
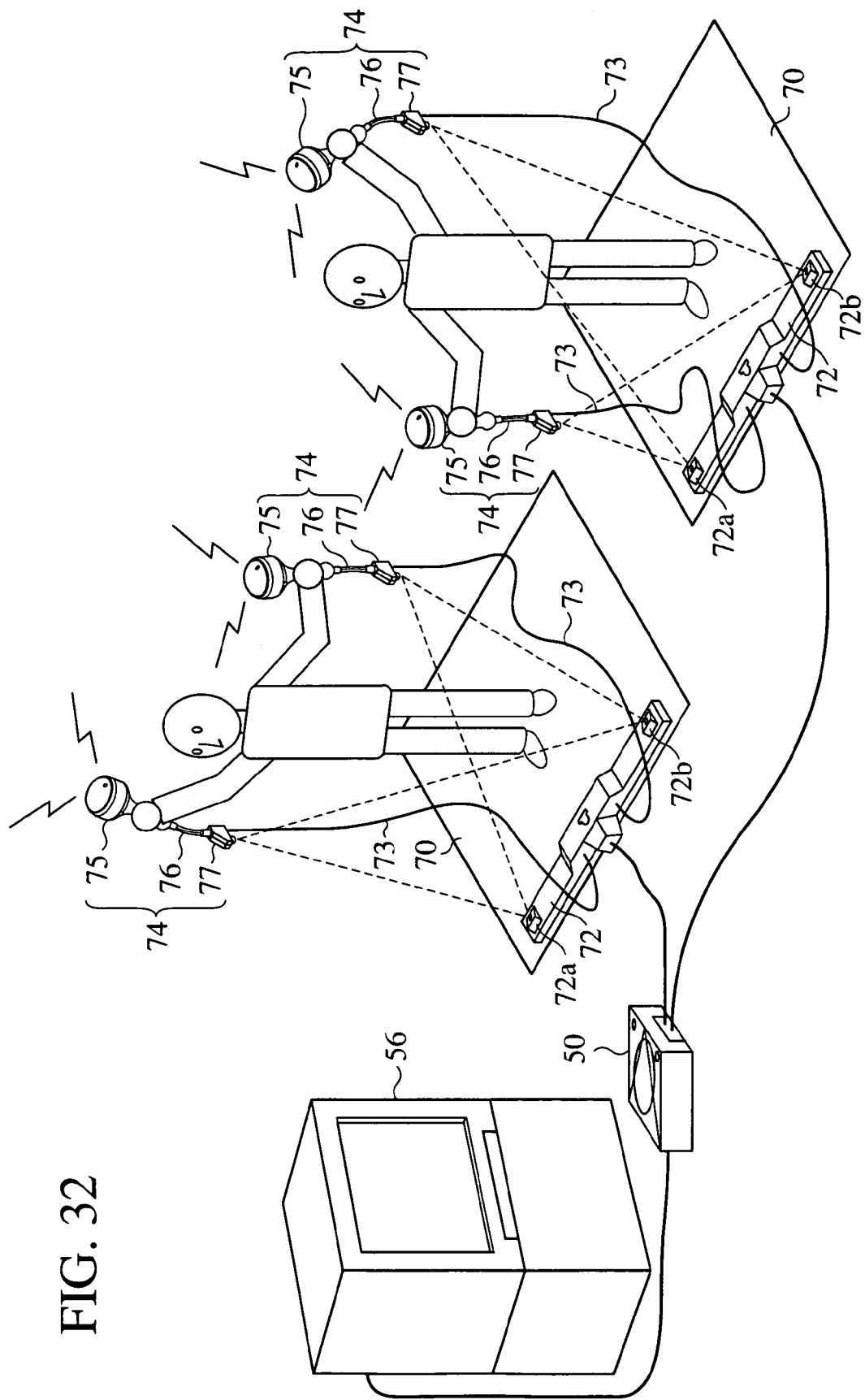
FIG. 32 is a schematic view of the game apparatus according to a fifth embodiment of the present invention.

The game apparatus according to the present embodiment will be summarized with reference to FIG. 32. In the game apparatus according to the present embodiment, pulsed supersonic wave (e.g., supersonic wave of 40 kHz) is emitted from the maraca-shaped operation device 74. A supersonic wave measuring unit 72 is provided on an operation mat 70. Supersonic wave emitted from the maraca-shaped operation device 74 is received by supersonic receiver units 72a. 72b of the supersonic wave measuring unit 72 to measure spatial positions of the operation device 74.

The game apparatus 50 is connected to the supersonic wave measuring unit 72. The supersonic wave measuring unit 72 is connected to the left and the right operation device 74 through respective cables 73. Each operation device 74 includes a maraca portion 75, a connection cable 76 and a supersonic wave emitting unit 77. A game player holds the maraca portions 75 to operate the operation device 74.

Figure 33:
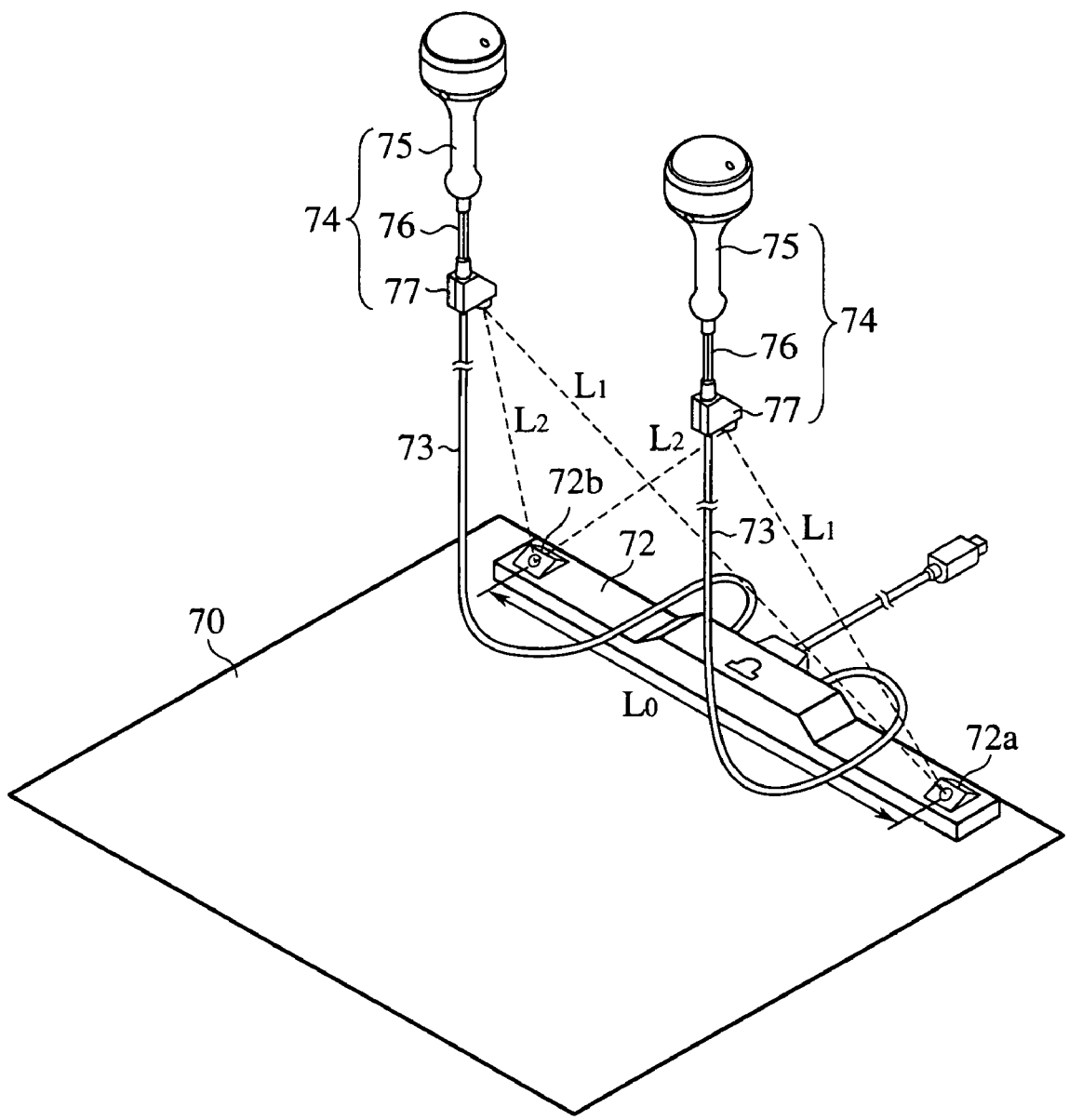
FIG. 33 is a view of an appearance of a maraca-shaped controller of the fifth embodiment of the present invention.

The supersonic wave measuring unit 72 is disposed on en edge of the operation mat 70. A connection cable for the game apparatus body 50 and the connection cables 73 for the operation device 74 are projected from the supersonic wave measuring unit 72 outward of the operation mat 70. Although the operation device 74 are operated by game player on the operation mat 70, as shown in FIG. 33, the connection cables 73 for the operation device 74 are projected outward of the operation mat 70 and then are located inner and upper of the operation mat 70. This arrangement is for preventing parts of the connection cables 73 are scattered on the operation mat 70 to bother a game player on the operation mat 70.

As shown in FIG. 33, periods of time from emission of supersonic wave by the supersonic wave emitting units 77 of the operation device 74 to detection are measured by the left and the right supersonic wave receiver units 72a, 72b disposed in the supersonic measuring unit 72, and based on absolute values of measured periods of time, distances L1, L2 to the supersonic wave emitting unit 72 are computed. A distance L0 between the left supersonic wave receiver unit 72a of the supersonic measuring unit 72 and the right supersonic receiver unit 72b thereof is already known. Accordingly, based on the distances L1, L2, triangles having as the summits, the supersonic wave emitting units 77, the supersonic wave receiver unit 72a and the supersonic wave receiver unit 72b are determined. Spatial coordinate values of the supersonic wave emitting units 77 can be determined.

Lean angles of the triangles change spatial coordinate values of the supersonic wave emitting units 77. However, in the present embodiment, spatial coordinate values of the supersonic wave emitting units 77 are determined on the assumption that the triangles are upright to the operation mat 70 or lean by a prescribed angle.

When a game is played on the present game apparatus by two game players, as shown in FIG. 32, another operation mat 70, another supersonic wave measuring unit 72 and another set of the operation device 74 are prepared, and the operation mats 70 are placed at locations where they do not interfere with each other.

In the present embodiment, supersonic wave from a speaker 77a is received by the supersonic wave receiver units 72a, 72b on both longitudinal ends of the supersonic wave measuring unit 72 disposed on one edge of the operation mat 70 to measure distances between the speaker 77a, and the supersonic wave receiver units 72a, 72b. However, positional relationships between the supersonic wave emitting unit and the supersonic wave receiver units are not limited to the above. For example, the supersonic wave receiver units 72a, 72b may be disposed on the left and the right ends of the edge of the operation mat 70 behind a game player, or may be disposed on corners of the operation mat 70 diagonally opposed to each other. Three or more supersonic wave receiver units may be provided for the measurement. In short, as long as a distance between two or more supersonic wave receiver units is constant, the supersonic wave receiver units may have any positional relationship with one another.

(Supersonic Wave Measuring Unit)

An appearance of the supersonic wave measuring unit 72 is shown in FIG. 34. FIG. 34A is a front view of the supersonic wave measuring unit 72. FIG. 34B is a backside view of the supersonic wave measuring unit 72. FIG. 34C is a plan view of the supersonic wave measuring unit 72. FIG. 34D is an underside view of the supersonic wave measuring unit 72. FIG. 34E is a left side view of the supersonic wave measuring unit 72. FIG. 34F is a right side view of the supersonic wave measuring unit 72.

The supersonic wave measuring unit 72 has a strip-plate appearance. The central part of the supersonic wave measuring unit 72 is thicker. A connection cable 72d for a game apparatus body 50 is provided on a side surface of the central part 72c, and connectors 72e, 72f for operation device 74 are also provided on the side surface of the central part 72c. Supersonic wave receiving elements 72a, 72b are provided on both longitudinal ends of the supersonic wave measuring unit 72. The supersonic wave receiving elements 72a, 72b are declined toward the operation mat 70, so that supersonic wave emitted form the side of the operation mat 70 can be received without failure.

(Operation Device)

Figure 35A:
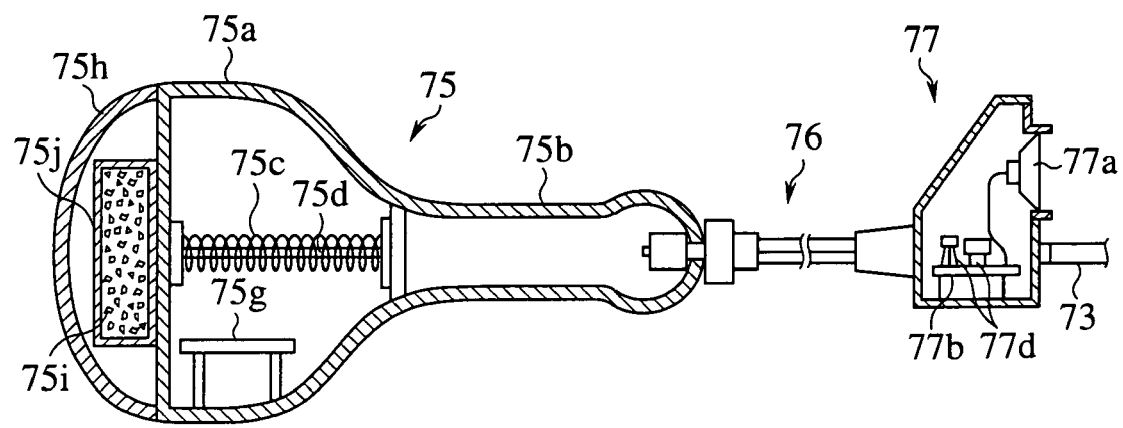
FIG. 35 is views of operation device of the fifth embodiment of the present invention.
Figure 35B:
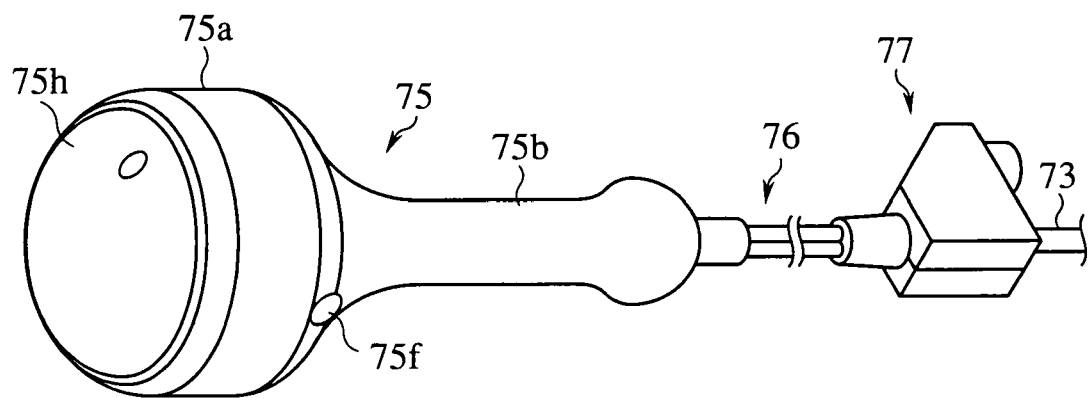

The operation device 74 is detailed in FIG. 35. FIG. 35A is a sectional view of the operation device 74. FIG. 36B is an appearance view of the operation device 74. The operation device 74 includes a maraca-shaped portion 75, a connection cable 76 and a supersonic wave emitting unit 77.

The operation device 74 are a pair. One game player holds the maraca-shaped portions 75 in the hands to operate. The maraca-shaped portion 75 has a shape like a percussion instrument, a maraca. The maraca-shaped portion 75 includes an egg-shaped body 75a and a grip 75b.

The inside of the body 75a is hollow. A spring 75c is extended at the center of the hollow inside. A metal wire is passed through the center of the spring 75. When the maraca-shaped portion 75 is shaken, the metal wire 75d contacts the spring 75 to function as vibration switch 75e which detects vibrated states of the maraca-shaped portion 75. A push button 75f is provided at boundary between the body 75a and the grip 75b. A game player can press the push button 76f while holding the grip.

As seen in FIG. 65B, the push button 76f is mounted on the side opposite to the side on which a speaker of the supersonic wave emitting unit 77 is mounted. Thus, when a game player holds the grip 75b in a manner which allows the game player to press the push button 75f, the speaker 77a of the supersonic wave emitting unit 77 is naturally positioned on the opposite side across the connection cable 76.

A circuit substrate 75g is mounted on an inner side of the body 75a and generates vibration detected signals of the vibration switch 75e and operation signals of the push button 75f. A box 75j containing a number of round balls 75i is mounted on a head portion 75h of the body 75a.

When the maraca-shaped portion 75 is shaken, the spring 75c flexes to contact the metal wire 75d, whereby a vibrated state is detected. At the same time, the round balls 75i impinge on the inside of the wall of the box 75x to make characteristic sound of the maracas.

The head portion 75h is removed to mount and dismount the box 75j as required. When the characteristic sounds of the maracas are bothering, the box 75j is removed. The box 7j is replaced to change the operation sound to enjoy other sounds. A suitable weight is put in the box 75j to facilitate handling the operation device or make the operation device useful for muscle training.

The supersonic wave emitting unit 77 is connected to the maraca-shaped portion 75 by a flexible connection cable 76. The supersonic wave emitting unit 77 is connected to a supersonic wave measuring unit 72 by a connection cable 73.

A speaker 77a for emitting supersonic wave is mounted, faced downward, on the supersonic wave emitting unit 77. A circuit substrate 77b, and circuit parts 77d of an emission amplifying circuit 77c is mounted on an inside surface of the supersonic wave emitting unit 77.

In the present embodiment, the emission amplifying circuit 77c is provided in the supersonic wave emitting unit 77 but may be provided in the maraca-shaped portion 75 together other circuit parts above the circuit substrate 75g.

The supersonic wave emitting unit 77 is made heavy to some extent. Resultantly, even when a game player directs the maraca-shaped portions 75 in any direction as shown in FIG. 32, the connection cables 76 flex to allow the speakers 77a of the supersonic wave emitting units 77 to always face downward.

As shown in FIG. 33, the supersonic wave emitting unit 77 is connected to the connection cable 76 so as to project to the side opposite to the operation mat 70 when a game player grips the maraca-shaped portions 75 in such a manner as to be able to press the push button 75f. This arrangement is for prohibiting the connection cable 73 from bothering the supersonic wave from the speakers 77a of the supersonic wave emitting units 77. This arrangement is also for preventing the supersonic wave emitting units 77 from contacting the body of a game player playing with the operation device 74 in the hands. Furthermore, this arrangement facilitates detection of the supersonic wave from the speakers 77a of the supersonic wave emitting units 77.

The above-described arrangements of the operation device that the supersonic wave emitting units 77 are connected to the maraca-shaped portions 75 by the flexible connection cables 76; the supersonic wave emitting units 77 are connected to the connection cables 76 so as to project to the side opposite to the operation mat; etc. are not limited to the present embodiment and are applicable to any other system, such as the above-described photodetection systems and the reel systems, etc.

(Structure of Peripheral Device)

Figure 36:
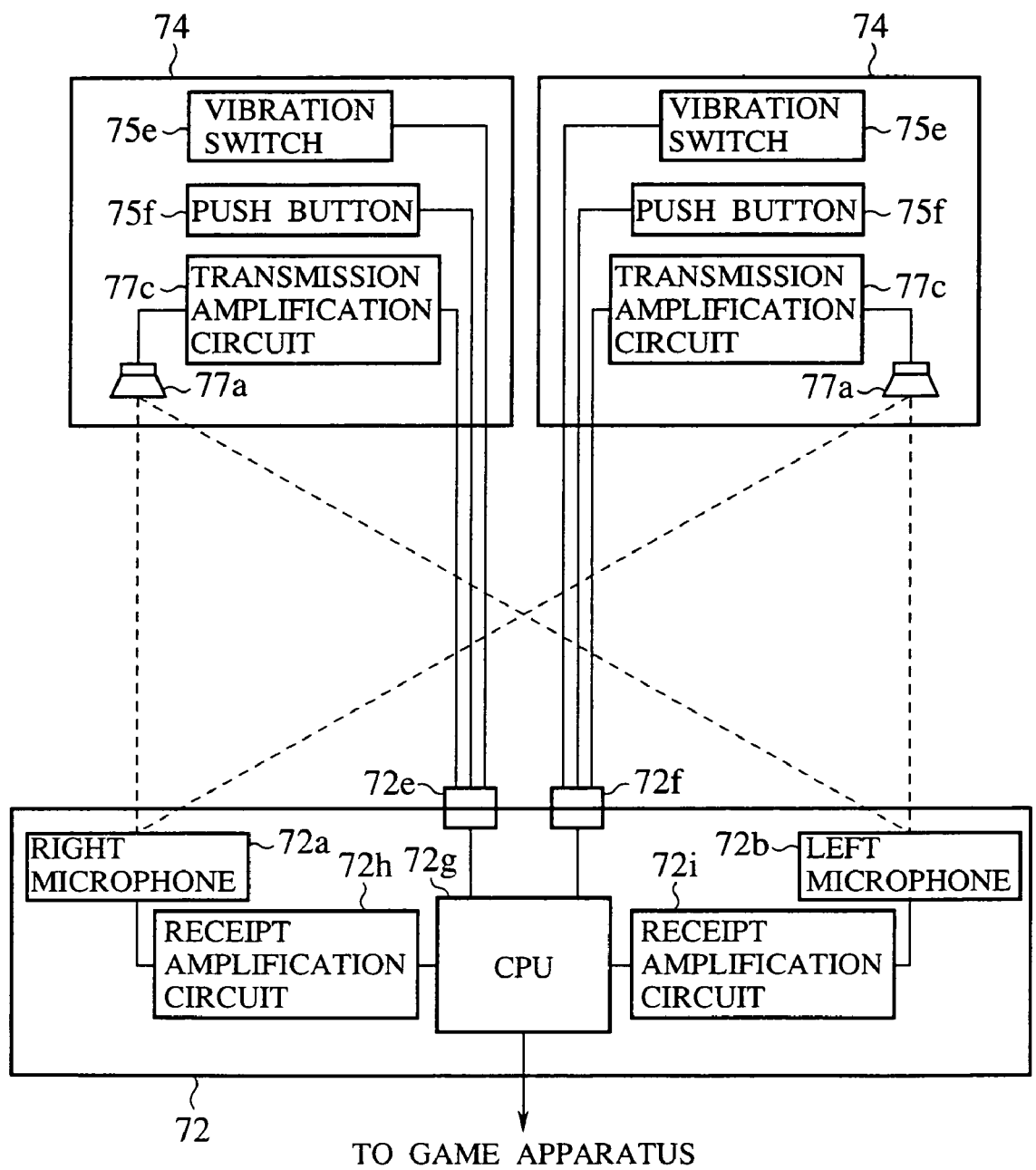
FIG. 36 is a block diagram of a maraca-shaped controller of the fifth embodiment of the present invention.

The block diagram of FIG. 36 shows a general structure of a peripheral device for the position detection used in the game apparatus according to the present embodiment. A supersonic wave measuring unit 72 includes a CPU 72g for generally controlling the whole peripheral device. The CPU 72g is connected to a supersonic wave receiver unit (a right microphone) on the right side through a receipt amplifying circuit 72h, and is connected to a supersonic wave receiver unit (a left microphone) on the left side through a receipt amplifying circuit 72i.

The left and the right operation device 74 are connected to the CPU 72g of the supersonic wave measuring unit 72 respectively through connectors 72e, 72f. The operation device 74 includes a vibration switch 75e and a push button 75f, and a speaker 77a through a transmission amplifying circuit 77c.

(Game Playing Method)

When a game is played by one game player on the game apparatus according to the present embodiment, as shown in FIGS. 37A and 37B, transmission signals are supplied by the CPU 72g of the supersonic wave measuring unit 72 at every prescribed period of time, e.g., at every two frames of television images (1/30 seconds) to emit supersonic wave from the speaker 77a, 77b of the operation device 74. Periods of time until detection of an emission sound by the right microphone 72a and the left microphone 72b are measured, and based on the measured periods of time spatial coordinate value of the supersonic wave emitting units 77 of the operation device 74 are determined. For the left and the right operation device 74, as shown in FIG. 37B, for example the measurement for the left operation device 74 is followed by that for the right operation device 74.

When a game is played by two game players on the game apparatus according to the present embodiment, as shown in FIGS. 37A, 38B and 37C, Control signals are supplied alternately to the supersonic wave measuring unit 72 of a first game player and to the supersonic wave measuring unit 72 of a second game player from the game apparatus body 50 at every prescribed period of time, e.g., every one frame (1/60 second), and supersonic wave is emitted from the speakers 77a, 77b of the operation device 77 via the CPU 72g. Periods of time until detection of the emission sounds by the right microphone 72a and the left microphone 72b of the supersonic wave measuring unit 72 are measured. Based on the measured periods of time, spatial coordinate values of the supersonic wave emitting units 77 of the operation device 74 are determined. For the left and the right operation device 74, for example the measurement of the left operation device 74 is followed by the measurement of the right operation device 74 in one frame.

(Method of Adjusting Game Play by a Plurality of Game Players)

Figure 37:
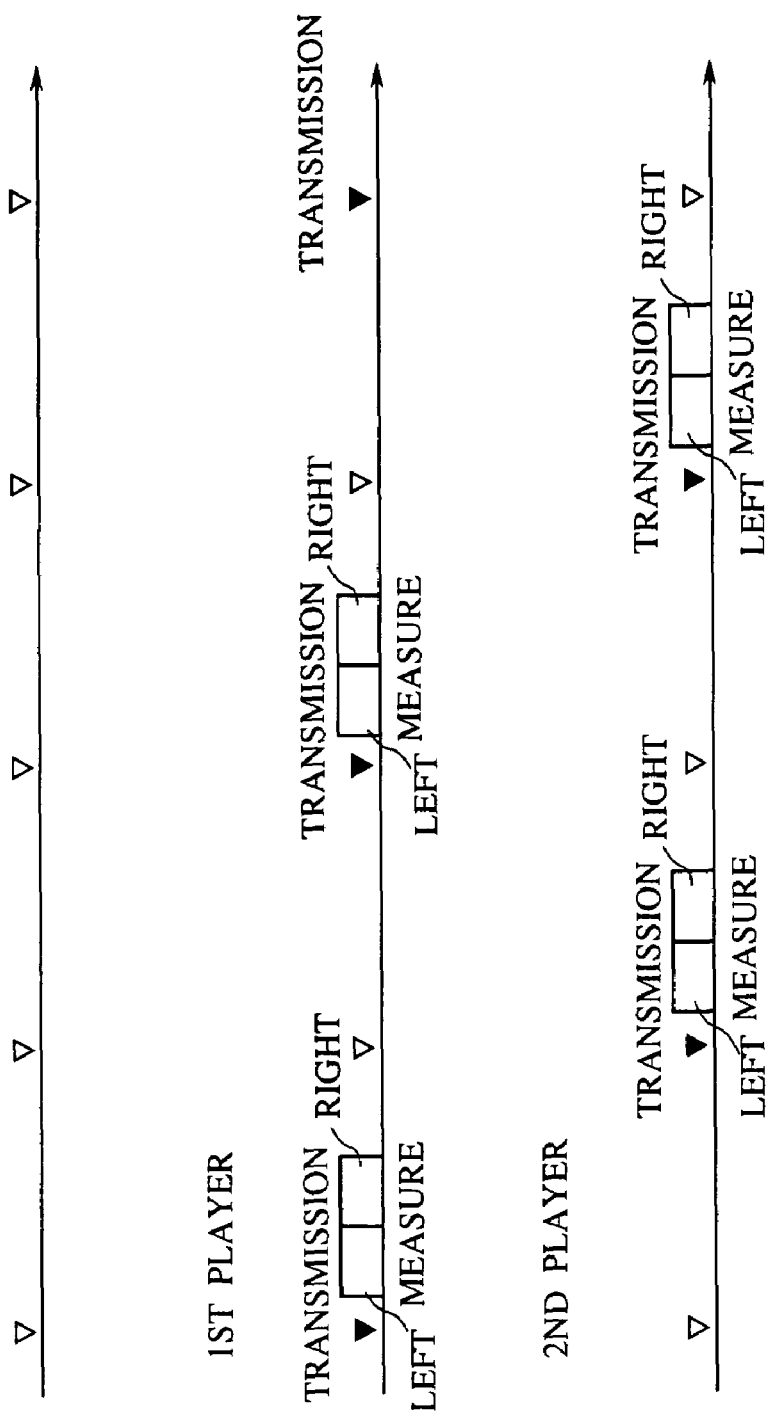
FIG. 37 is time charts explaining supersonic wave emitting timing of the maraca-shaped controller of the fifth embodiment of the present invention.

When a game is played by a plurality of game players on the game apparatus according to the present embodiment, maraca-shaped controllers for the position detection by supersonic wave are prepared for a number of the game players. The controllers are connected respectively to ports of the game apparatus body 50. While the game is being executed, it is necessary that, as shown in FIG. 37, the measurement of an operational position of each game player is performed in turn at a prescribed period of time. This is because if the measurement of an operational position of each game player is simultaneously performed, supersonic waves interfere with one another to thereby make it impossible to measure correct distances.

However, when a game is started with a plurality of maraca-shaped controllers connected to the game apparatus body 50, it cannot be ensured that the measurement of an operational position of each player is performed in turn as shown in FIG. 37. Then, in the present embodiment, hardware or software is contrived so that the measurement of an operational position of each game player is performed in turn when game is executed.

In a first adjusting method, one game player detects supersonic waves of maraca-shaped controllers simultaneously connected detect and offsets a timing of emitting supersonic wave. The first adjusting method resorts to the hardware of the maraca-shaped controller.

In a second adjusting method, a connection port of the game apparatus body 50 is detected to offset a timing of emitting supersonic wave. The second adjusting method resorts to the hardware of the maraca-shaped controller.

In a third adjusting method, a timing of emitting supersonic wave is offset based on a game program. The third adjusting method resorts to game software.

The above-described adjusting methods may be used singly, two of them may be combined, or all the adjusting methods may be used.

The above-described adjusting methods are not limited to the present embodiment and are applicable to the above-described photodetection systems, the reel systems, etc.

(Method for Adjusting Emitting Timing (Part 1))

A first example of the method for adjusting an emitting timing is a combination of the first and the second adjusting methods.

In the method for adjusting an emitting timing according to a first example, each game player detects supersonic waves of the others game players of the maraca-shaped controllers simultaneously connected and offsets a timing of emitting supersonic wave. When a plurality of game players play a game, they do not emit supersonic wave for some seconds after the maraca-shaped controllers are turned on. Each game player detects in an transmitting timing period whether or not supersonic wave is emitted from the outside. However, when supersonic waves transmitted from other maraca-shaped controllers are detected, he offsets his emitting timing.

In the method for adjusting an emitting timing according to a second example, out of a plurality of ports provided in the game apparatus body ports with maraca-shaped controllers connected to are detected to make initial transmitting timings different from one another.

Figure 38:
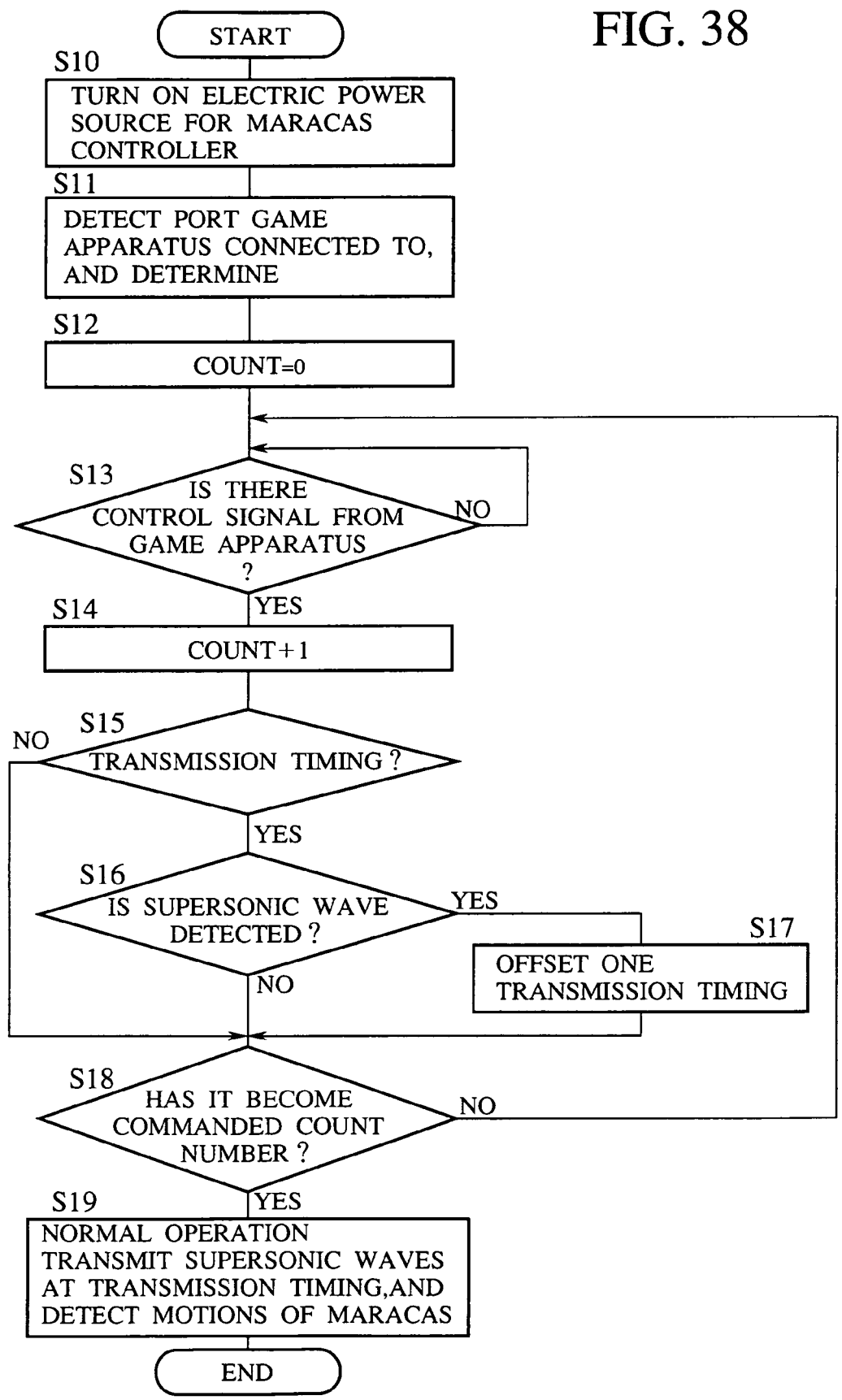
FIG. 38 is a flow chart of a method of adjusting supersonic wave emitting timing of the maraca-shaped controller of the fifth embodiment of the present invention.

The adjusting method according to the present example will be explained with reference to the flow chart of FIG. 38. First, when maraca-shaped controllers are turned on (Step S10), parts of the game apparatus body 50 with the maraca-shaped controllers connected to are detected, and initial transmitting timings are determined in accordance with the second adjusting method.

Figure 39:
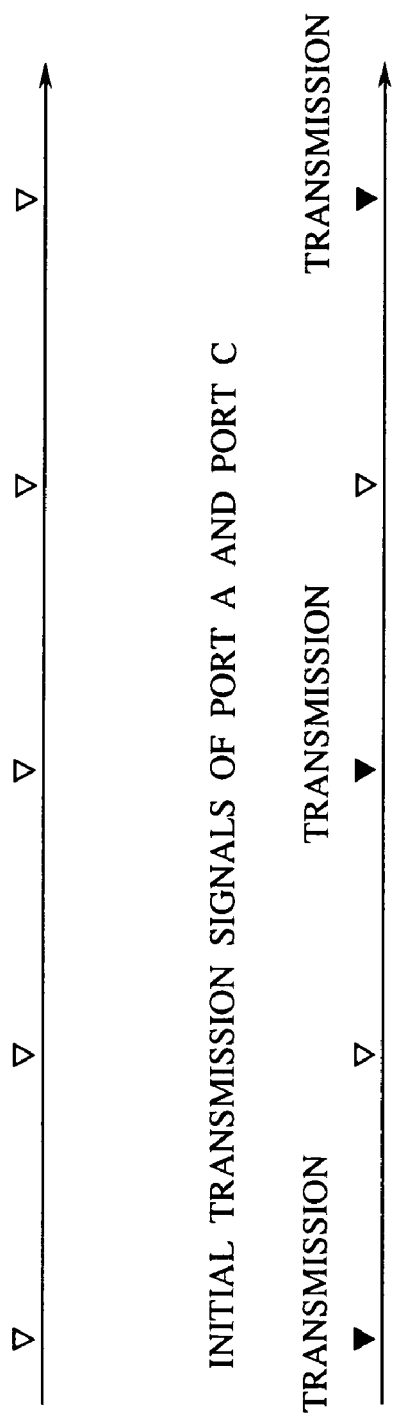
FIG. 39 is time charts explaining supersonic wave emitting timing of the maraca-shaped controller of the fifth embodiment of the present invention.

For example, in a case that the game apparatus body 50 has 4 ports, A port, B port, C port and D port, as shown in FIG. 39 a timing of initial emitting signals of A port and C port, and a timing of initial emitting signals of B port and D port are made different from each other for control signals synchronized with frames of video signals from the game apparatus body 50. Here, if a pair of the maraca-shaped controllers of a first game player is connected to A port, and the pair of the maraca-shaped controllers of a second game player is connected to B port, only this normally adjusts the emitting timings.

In FIG. 39, ports have the same timing of initial emitting signals, but for example, 4 ports may have timings of initial emitting signals, which are different from one another.

After an initial emitting timing is determined in Step S11, a counter (not shown) for counting control signals from the game apparatus 50 is reset (Step S12). The counter itself does not emit supersonic wave and counts a detection time for detecting whether or not supersonic wave is being emitted from the outside. The detection time is different for the ports, e.g., 4 seconds for A port, 5 seconds for B port, 6 seconds for C port and 7 seconds for D port.

Following Step S12, a control signal from the game apparatus body 50 is detected (Step S13), and when a control signal is detected, the counter counts up by 1 (Step S14). Then, it is judged whether or not the control signal is the initial emitting timing determined in Step S11 (Step S15). When the control signal is the initial emitting timing, the supersonic wave receiver units 72a, 72b judge whether or not supersonic wave emitted from the others at the same timing (Step S16), and when the supersonic wave from the others is detected, the initial emitting timing determined in Step S11 is offset by one for the adjustment (Step S17).

Subsequently, it is judged whether or not a timer has arrived at a prescribed count number (Step S18). When the timer has not yet arrived at the prescribed count number, Step S13 follows to repeat the processing of Step S13 to Step 18. When the timer has arrives at the prescribed count number, supersonic wave is emitted at the determined emitting timing to execute the normal operation for detecting positions of the operation device (Step S19).

As described above, because ports with the maraca-shaped controllers connected to have detection times which are different from one another, e.g., 4 seconds for A port, 5 seconds for B port, 6 second for C port and 7 seconds for D port, even if ports have the same initial emitting timing, preference is given to one of the initial emitting timing, the other initial emitting timing being offset, whereby the emitting timings can be adjusted.

(Method for Adjusting Initial Emitting Timings (Part 2))

A second example of the method for adjusting initial emitting timings is a combination of the first and the second adjusting method, and the third adjusting method.

In the third adjusting method, because it is seen in the game apparatus body how many and which ports the maraca-shaped controllers are connected, emitting timings suitable for each pair of the maraca-shaped controllers is determined by application software of the game apparatus. Emitting timings are all determined by the application software, and accordingly, the emitting timings can be suitable.

First, the connected maraca-shaped controllers are recognized by the game apparatus 50, and initial emitting timings are adjusted by the method combining the first and the second adjusting methods. Then, emitting timings of the connected maraca-shaped controllers are determined by the application software executed by the game apparatus body 50. The emitting timings are supplied to the maraca-shaped controllers.

Initial timings are adjusted by the method combining the first and the second adjusting methods, and then emitting timings are adjusted by the third adjusting method. This is because the hardware does not change emitting timings determined by the third adjusting method, based on the application software.

(Summary of Music Games)

Games played on the game apparatus according to the present embodiment will be explained with reference to FIGS. 40 to 45. In the present embodiment, in addition to the music games explained in the first embodiment, games called party mode which are suitable to be played in parties where many people gather are prepared will be explained. The party mode includes battle mode in which a game player fights with opponents, love-love mode in which affinity of a game player is guessed, mini-games in which Latin index of a game player is found, etc.

(Battle Mode)

Figure 40:
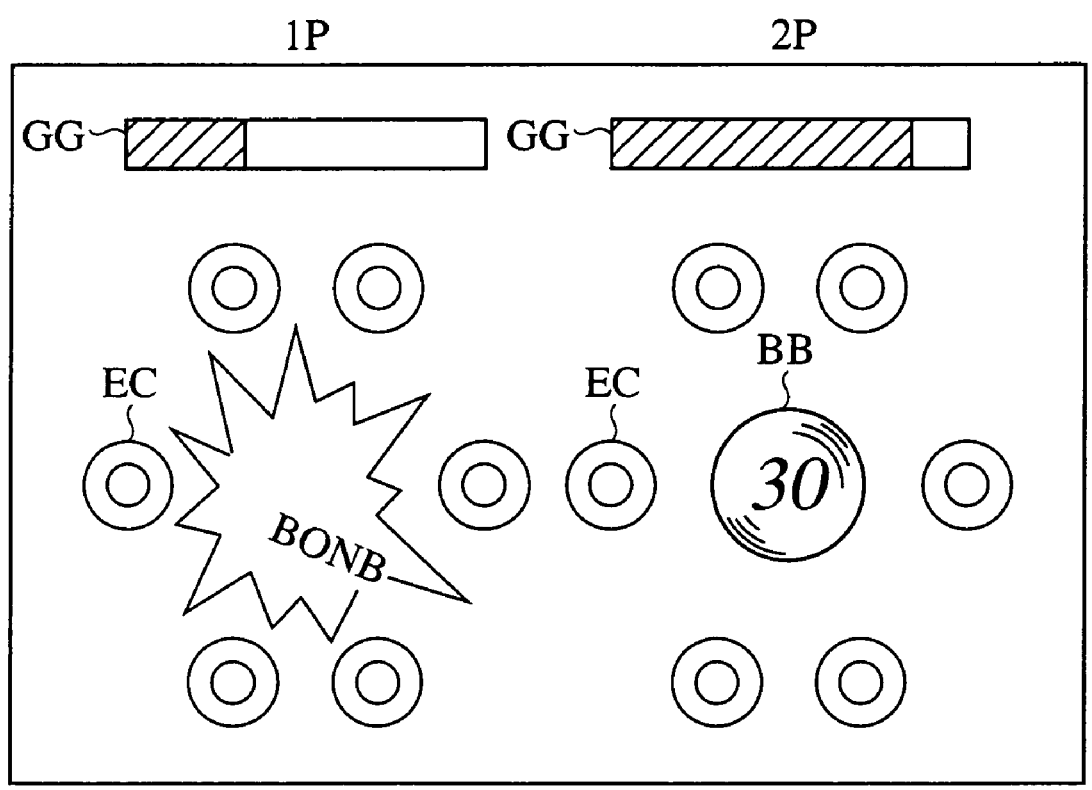
FIG. 40 is a view of a display of a game of battle mode played on the game apparatus according to the fifth embodiment of the present invention.

A game of the battle mode will be explained with reference to FIG. 40. The game of the battle mode is a competition with opponents or a fight with opponents. A game player stores more bombs more quickly than an opponent, and attacks the opponent to make the opponent's physical strength zero sooner. Then, the game player wins.

The basic rules of the game are the same as those of the music games played on the first embodiment. As shown in FIG. 40, a blowout opening WK and 6 icons for a first game player are arranged on the left side of the screen of a television monitor 50. A blowout opening WK and 6 icons for a second game player are arrange on the right side of the screen. Gauges GO which indicate lives of the respective game players are displayed at the top of the screen.

When a music game is started, rhythm balls, command marks MK are generated one after another to a rhythm of music. The command marks Mks move to one of the 6 icons. Two game players indicate positions by the maraca-shaped operation device while watching the image and shake the operation device 74 at a timing when a command mark MK arrives at an icon EC and drawn in. The game players are successful when they indicate a correct icon EC, and the command marks MK arrive at the icon EC and drawn into the icon EC. When the indicated position is wrong, or the shake is not timely, the game player is not successful.

As the game player succeed in shaking timely the maraca-shaped operation device 74, pointing the command marks MK of rhythm balls, a bomb BB at the blowout opening WK becomes gradually larger. The more timely and the more in accordance with a rhythm of music the game player shakes the maraca-shaped operation device, more rapidly the bomb BB becomes larger. A size index ("30" in FIG. 40) is indicated on the bomb BB. If the game player fails to operate the operation device 74, the bomb BB explodes, and his life is decreased.

When the bomb BB becomes larger to a maximum value (e.g., index 100), "MAX" is indicated on the bomb BB, and the bomb automatically flies to the opponent side and explodes. The opponent's life is decreased. The bomb BB on the opponent side is extinguished.

It is a point of the game to make the bomb larger more quickly, and more quickly make an opponent's life zero. When a game player is too hasty, he fails and extinguishes himself. He must be careful in operating the operation device 74.

In this game, bombs BB are displayed at the blowout openings WK, and the bombs BB become larger as the game proceeds. Otherwise, the blowout openings WK are displayed at first, and the displays are changed to bombs BB. The bombs BB become larger as the game proceeds.

In the music game played on the game apparatus according to the present embodiment, the blowout openings WK are place where command marks MK irregularly come out. The game players are always watch the blowout openings WK. A view direction must not be changed necessarily, which makes the game naturally enjoyable. Because of size indexes of the bombs BB are indicated at the center of the bombs BB, game players can play the game without moving the eyes away from the central position of the screen.

(Love-Love Mode)

Figure 41:
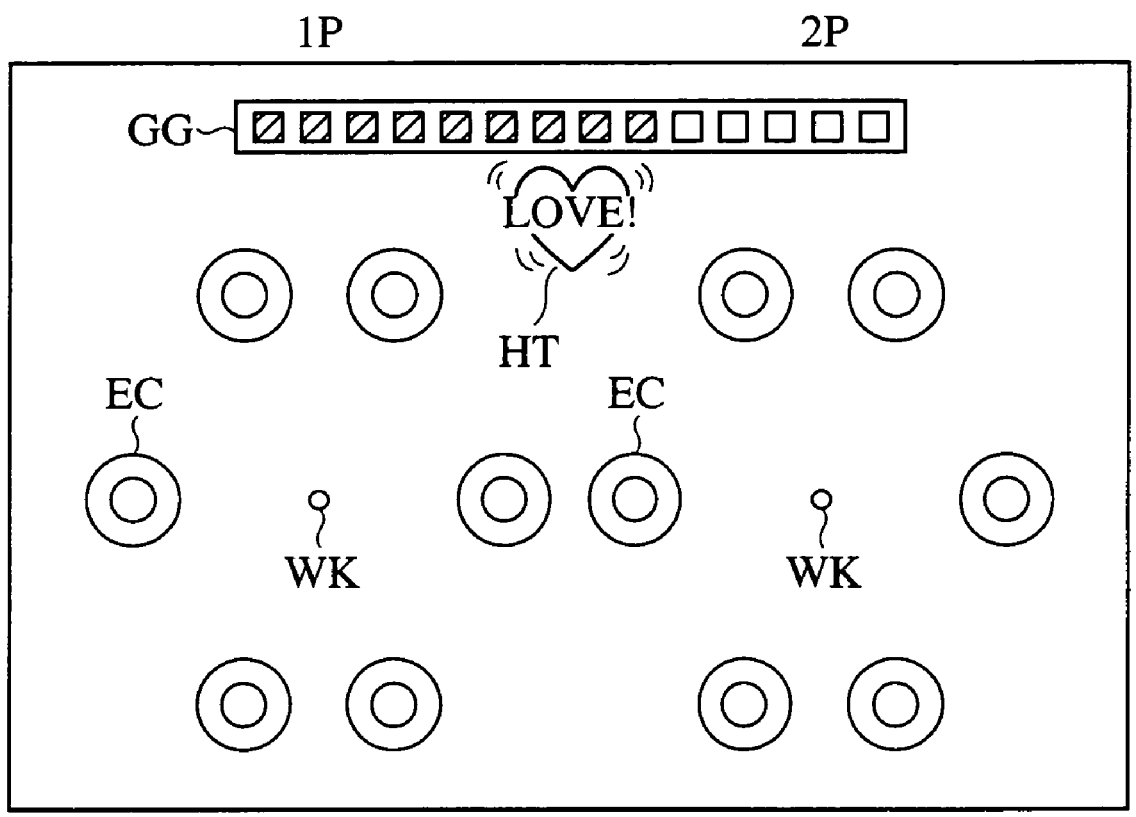
FIG. 41 is a view of a display of a game of love-love mode played on the game apparatus according to the fifth embodiment of the present invention.

A game of love-love mode will be explained with reference to FIG. 41. In the game of the love-love mode, a game player guesses a love-love degree (affinity) with another game player. A point of the game is that a game player operates the maraca-shaped operation device 74 in timing with another game player.

The basic rules of the game are the same as the music games played on the game apparatus according to the first embodiment. As shown in FIG. 41, a blowout opening WK and 6 icons for a first player are arranged on the left side of the screen of a television monitor 50, and a blowout opening WK and 6 icons for a second game player are arranged on the right side of the screen. A gauge for indicating affinity between both game players is displayed at the upper center of the screen.

When a music game is started, rhythm balls, or command marks MK are generated one after another to a rhythm of music. The command marks Mks move to one of the 6 icons. Two game players indicate positions by the maraca-shaped operation device while watching the image and shake the operation device 74 at a timing when a command mark MK arrives at an icon EC and drawn in. The game players are successful when they indicate a correct icon EC, and the command marks MK arrive at the icon EC and drawn into the icon EC. When the indicated position is wrong, or the shake is not timely, the game player is not successful.

In this game, not only success and failure of each of two game players, but also offset between timings of the two game players shaking the maraca-shaped operation device 74 is measured. Corresponding to a degree of coincidence of timings of the two game players' operation, the gauge GO indicating affinity is increased. When offset between operation timings of the two game players is within a prescribed time, as shown in FIG. 41, "LOVE!" is displayed at the upper center of the screen, and the gauge GO indicating a love-love degree increases. For example, corresponding to a degree of coincidence of operation timings, a heart mark HT is displayed behind "LOVE!". As times of the coincidence increases, the heart mark HT becomes gradually larger. The measurement of a degree of coincidence of timings is based on that both game players are successful.

In this game, two game players cooperate to make a high score. After the game is over, affinity between both game players is guessed based on a level of the score. A love-love degree is determined, and comments are made.

(Mini-Games)

Various mini-games which give Latin indexes of game players will be explained with reference to FIGS. 42 to 44.

Figure 42:
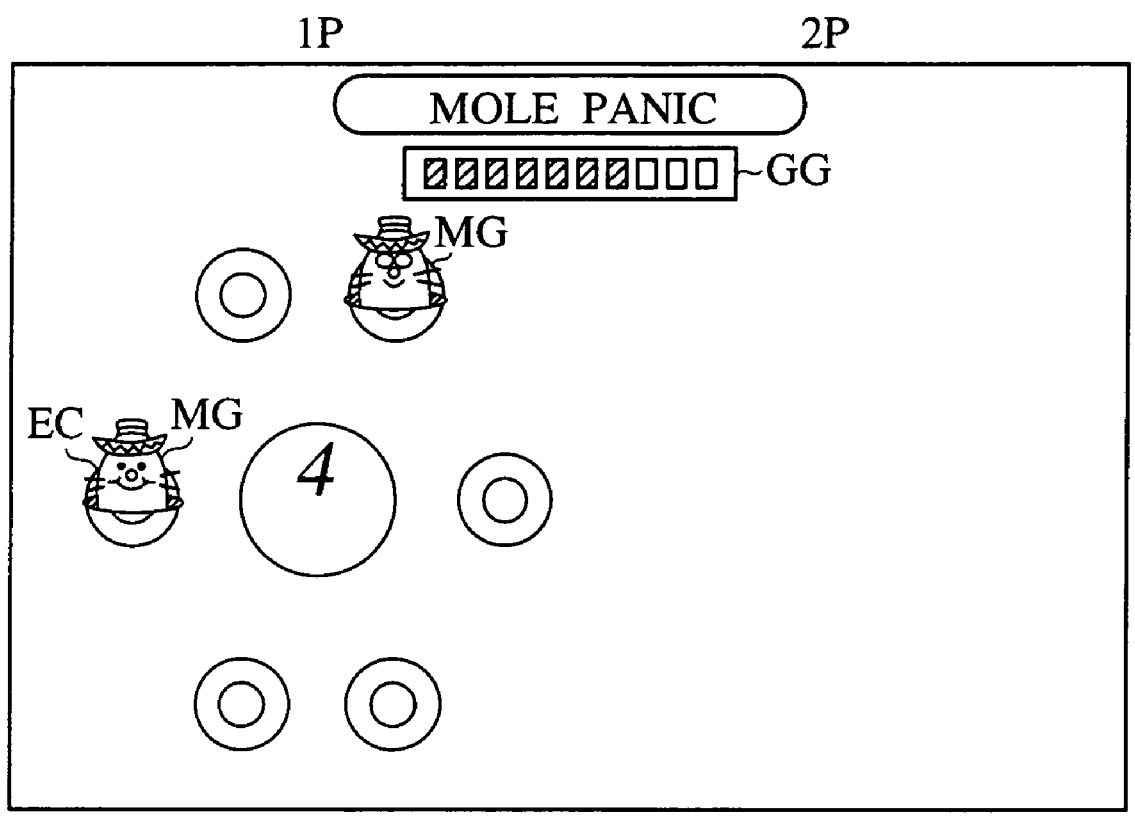
FIG. 42 is a view of a display of a mole panic game played on the game apparatus according to the fifth embodiment of the present invention.

The game shown in FIG. 42 is a mole panic. Six icons EC are arranged on the screen of a television monitor 50. The 6 icons are holes out of which moles appear. A gauge GO is displayed at the upper center of the screen.

Moles MG irregularly appear out of the 6 icons EC. A game player points the maraca-shaped operation device 74 to a position of an icon EC where a mole is to appear and shakes the maraca-shaped operation device, whereby the game player hits an appearing mole MG. If the game player strikes the mole MG timely, he succeeds. A number of moles he has successfully struck is displayed in the form of, e.g., "4 moles" at the position of the blowout opening. The game is competed as to how may moles are struck within a prescribed period of time. In this game, "agility" of a game player is measured.

Figure 43:
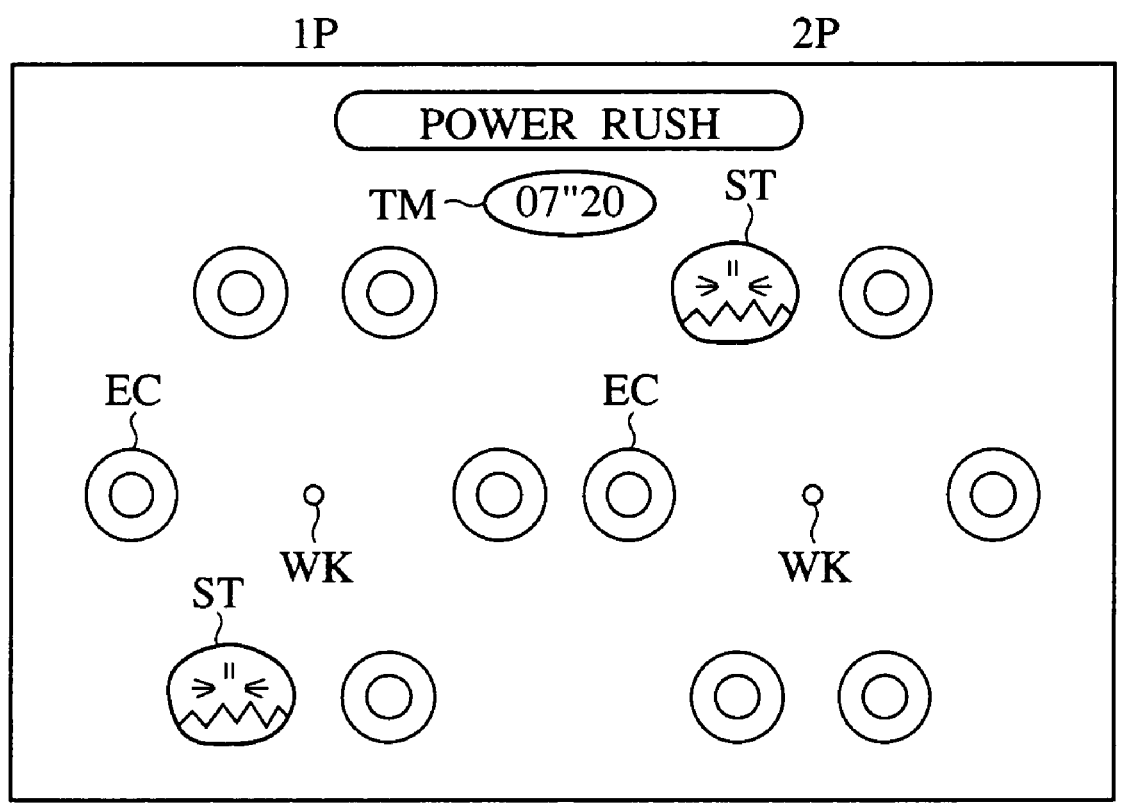
FIG. 43 is a view of a display of power rush game played on the game apparatus according to the fifth embodiment of the present invention.

The game shown in FIG. 43 is a power rush game. Six icons EC are arranged on the screen of a television monitor 50. Rocks ST appear out of the 6 icons. A timer TM indicating a transient time is displayed at the upper center of the screen.

A rock comes out of one of the 6 icons EC. A game player points the maraca-shaped operation device 74 to the position of the icon EC and strikes many times to break the rock. The game player competes in how many rocks he has broken in a prescribed period of time. In this game power of a game player is measured.

It is also possible that command marks MK, or rhythm balls are generated to music one after another through a blowout opening WK, a game player shakes the maraca-shaped operation device 74 to give vibrations at a timing of a command mark MK arriving at an icon EC and being drawn into the icon while the displays of the icons EC are at random changed into rocks ST, and the game player strikes the rock with the maraca-shaped operation device many times. That is, a display of an icon EC into which a command mark MK is drawn is changed into a display of a variety at the timing of the command mark MK being drawn into, and a prescribed operation is commanded corresponding to the change.

Figure 44:
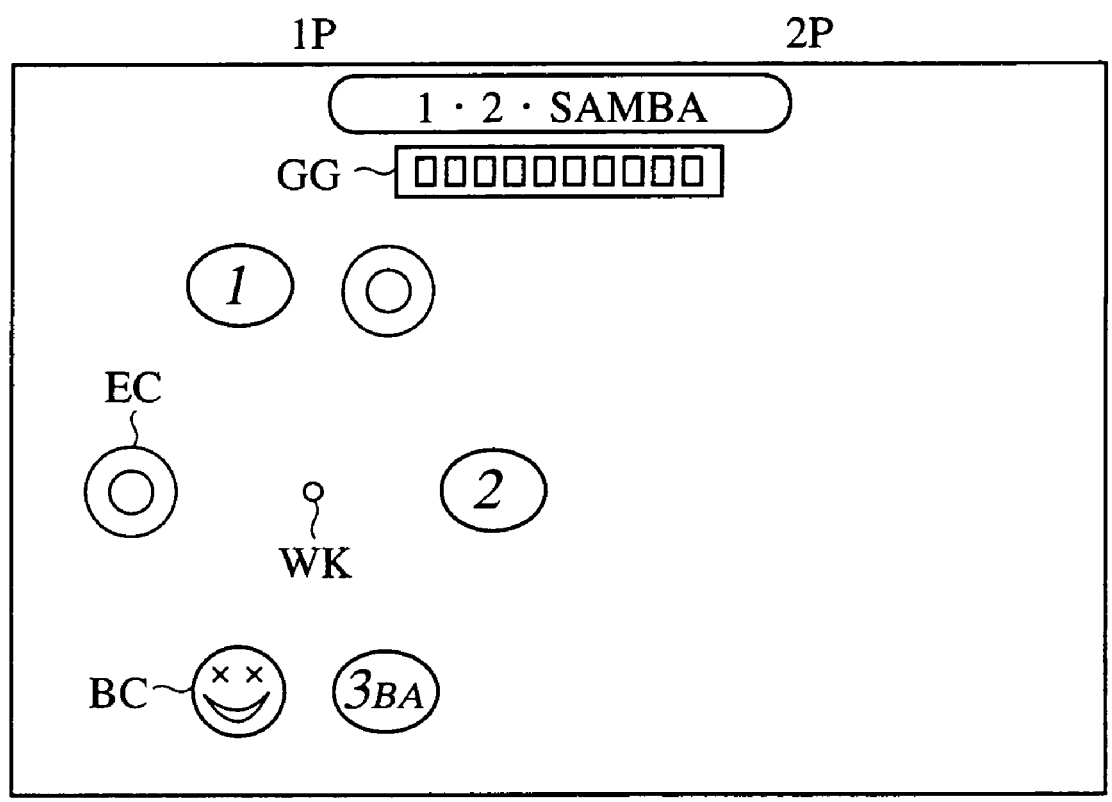
FIG. 44 is a view of a display of 1•2•Samba game played on the game apparatus according to the fifth embodiment of the present invention.

The game shown in FIG. 44 is 1•2•Samba game. Six icons EC are arranged on the screen of a television monitor 50. The 6 icons are sequentially displayed in "1", "2", "3BA". A gauge GO is displayed at the upper center of the screen.

Some of the 6 icons EC are displayed in "1", "2" and "3BA". A game player points the maraca-shaped operation device 74 to the positions of the icons in the order of "1", "2" and "3BA" and shakes the maraca-shaped operation device 74. One of the 6 icons EC is displayed in a bomb icon BC. When this icon EC is pointed, the bomb explodes. The game player loses time. A point of this game is how responsively a game player points the operation device to the displays "1", "2", and "3BA". In this game speed of a game player is measured.

Additionally, although not shown, a pose & pose game is available. As explained in the first embodiment with reference to FIG. 9B, pose balls, command marks MK are generated through the blowout opening WK. When a pose ball arrives at on icon EC, a pose to be taken by a game player is displayed on the screen. The game player takes the pose. Whether or not the game player has taken the pose is judged based on whether the operation device 74 has pointed the icon at the position. In this game, enthusiasm of a game player is measured.

Additionally, although not shown, a monkey replay game is available. In the monkey replay game, a game player operates the maraca-shaped operation device 74 to indicate positions at the same rhythm as the rhythm of an example in order to follow the example. A point of this game is how similar a game player follows the example. In this game, enthusiasm of a game player is measured.

A Latin index of a game player is computed based on a total scores of the above-described various mini-games. As a game player get higher scores in the respective mini-games, he can have a higher Latin index, and can get a voice corresponding to the raised Latin index.

Figure 45:
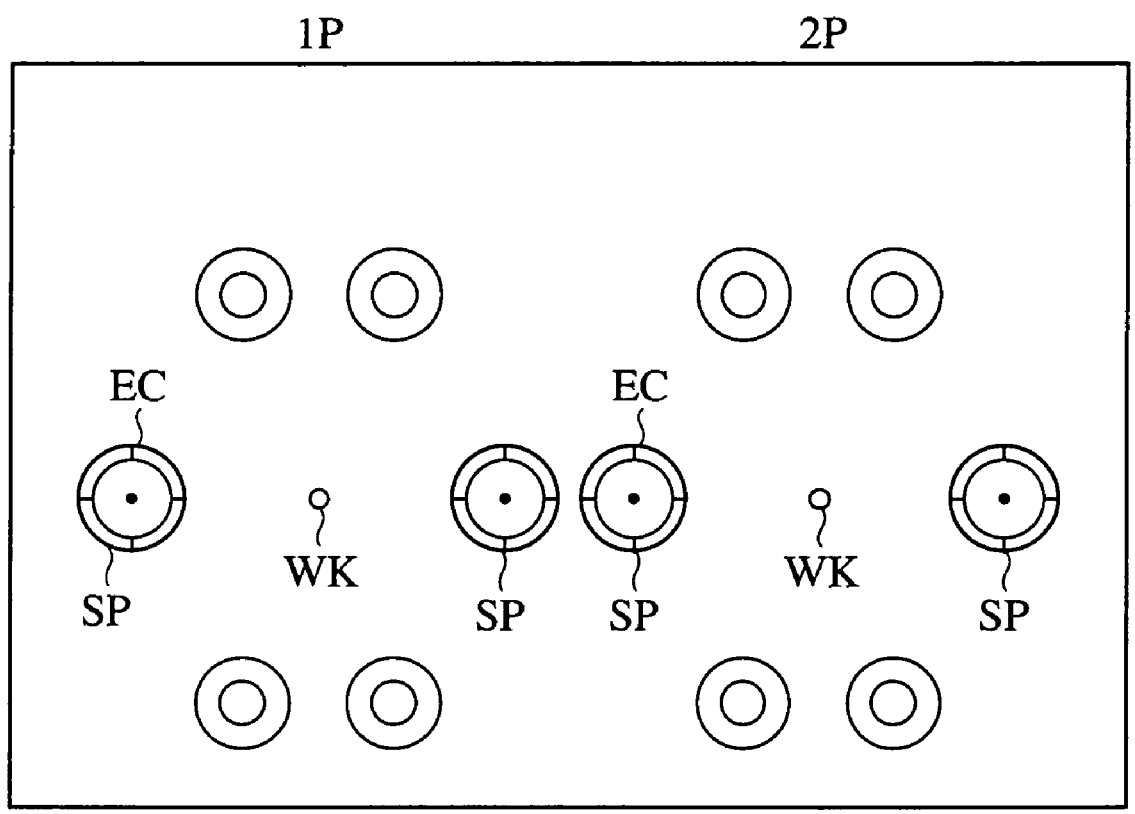
FIG. 45 is a view of a display of the game apparatus, in which voices are allocated to icons.

A voice is selected out of prepared sounds which are made when the command marks overlap the 6 icons EC and is allocated to a game player. A game player can allocate more voices selected from prepared sound to more icons EC, based on levels of Latin indexes he has got. As shown in FIG. 45, when a voice is allocated to an icon EC, some of the 6 icons EC are turned to be speaker marks SP, which produces an effect as if stereo sound come out of the icons EC.

As examples of sounds to be allocated to the icons EC, for fighting voices, a sound "Wachah!" is allocated to the upper icons EC, a sound "Yeah!" is allocated to the middle icons EC, and a sound "Twa" is allocated to the bottom icons EC. Sounds different from each other may be allocated to the respective icons EC. Music and allocated sounds made corresponding to operations of a game player make the game play amusing. A larger number of icons EC are used, and a musical scale is allocated to the icons EC, whereby simple music can be played by operations of a game players.

A SIXTH EMBODIMENT

The game apparatus according to a sixth embodiment of the present invention will be explained with reference to FIGS. 46 to 53. The same or the same kinds of members of the present embodiment as those of the first embodiment shown in FIGS. 1 to 11 are represented by the same reference numbers not to repeat or to simplify their explanation.

(Summary of the Game Apparatus)

Figure 46:
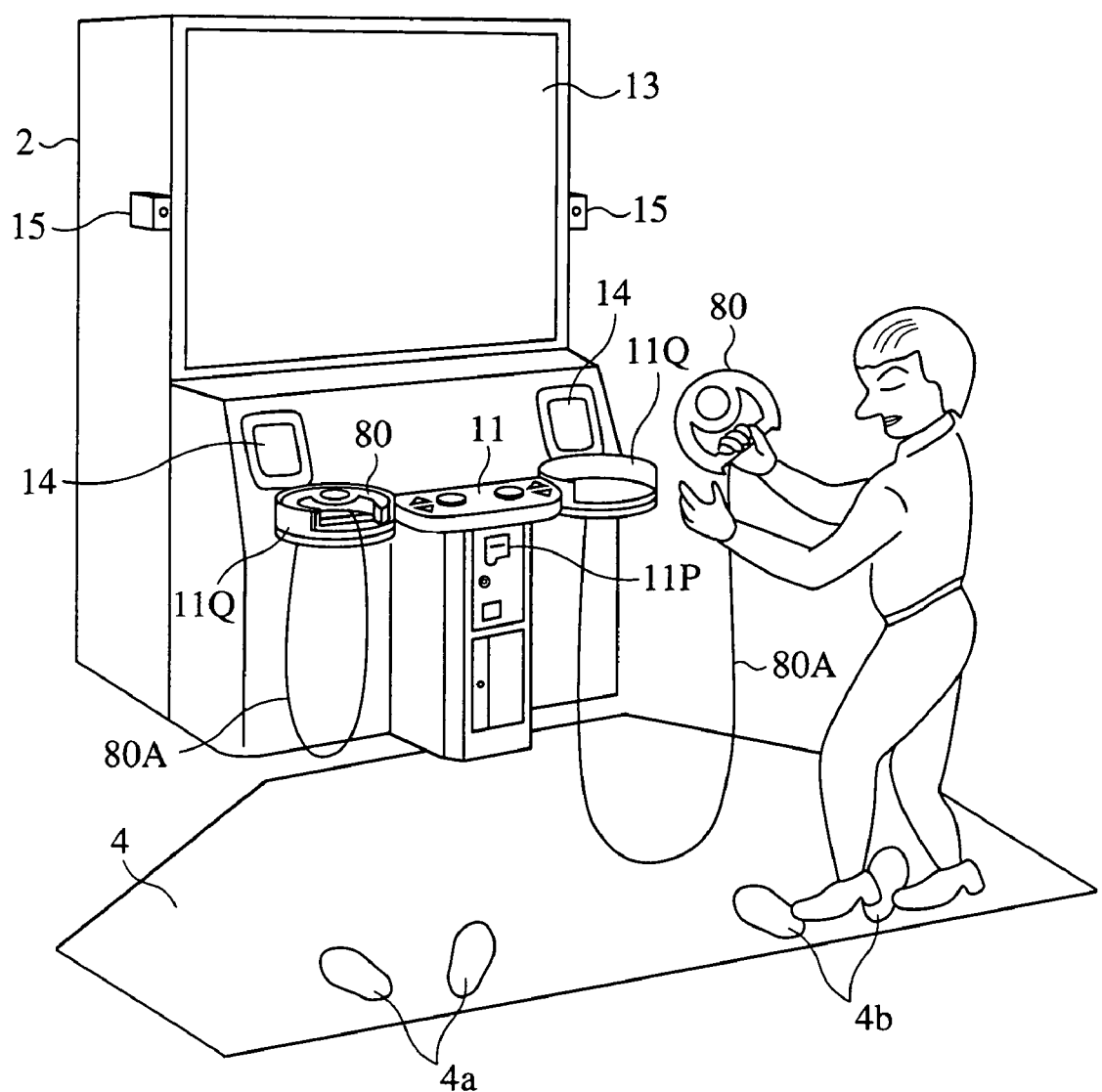
FIG. 46 is a schematic view of the game apparatus according to a sixth embodiment of the present invention.
Figure 47A:
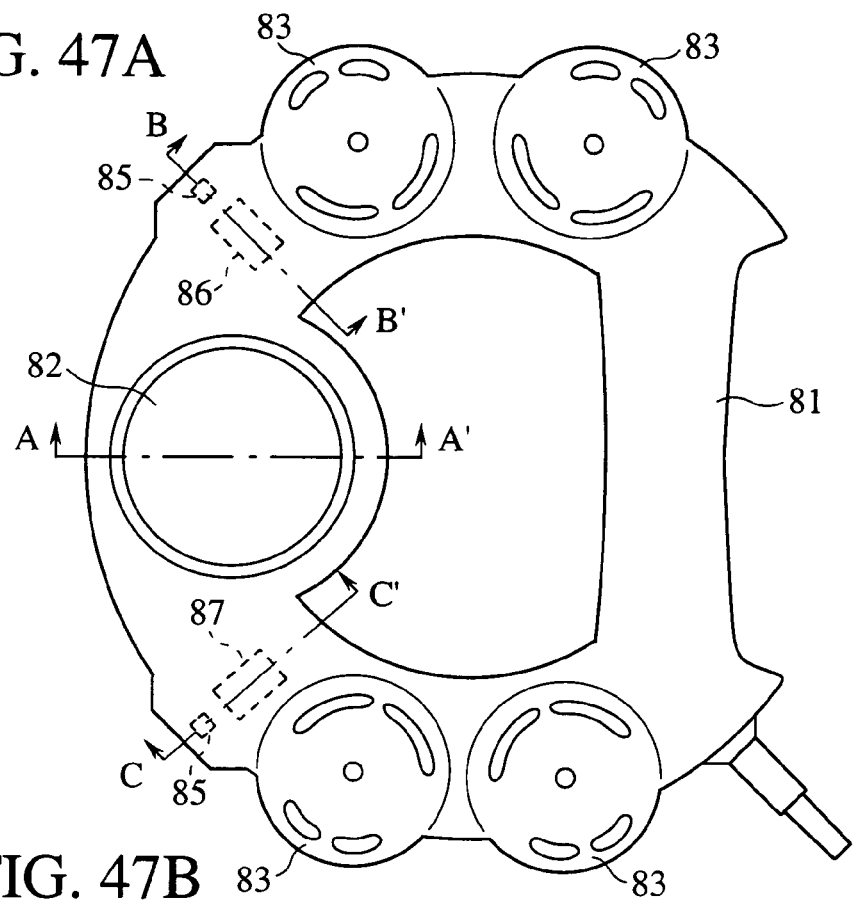
FIG. 47 is views of operation device of the game apparatus according to the sixth embodiment of the present invention.
Figure 47B:
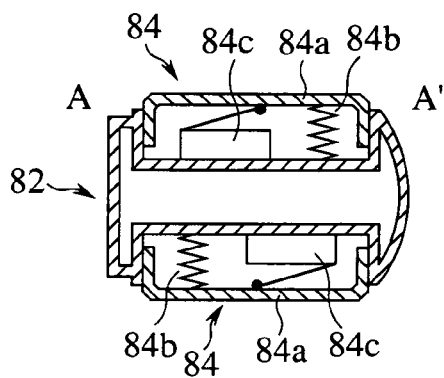
Figure 47C:
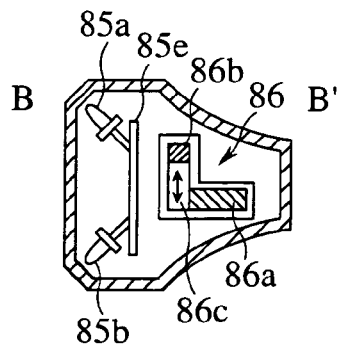
Figure 47D:
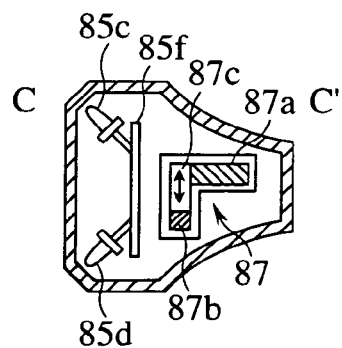
Figure 48:
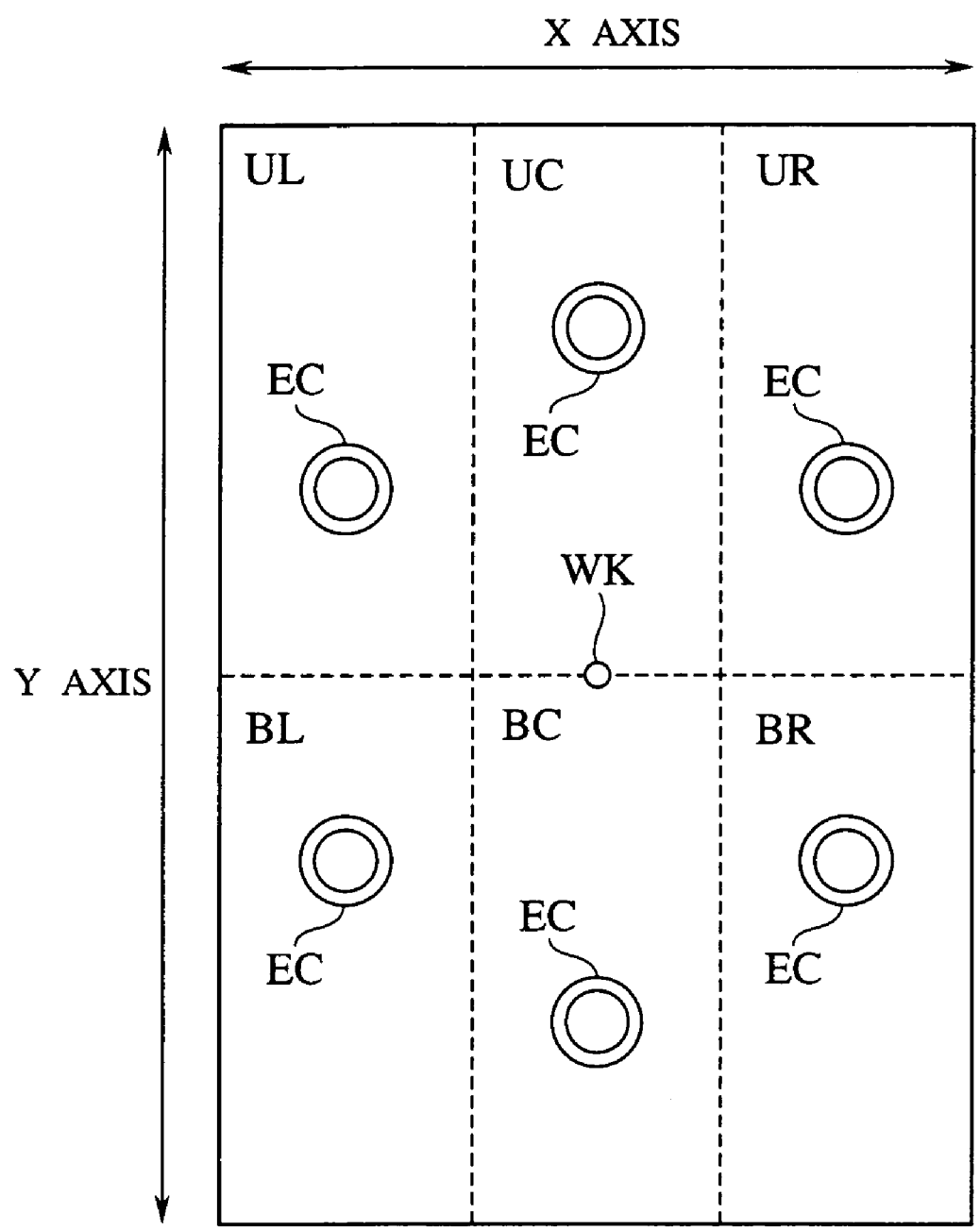
FIG. 48 is a view explaining position detection regions of the game apparatus according to the sixth embodiment of the present invention.

The game apparatus according to the present embodiment is summarized with reference to FIGS. 46 to 48. As shown in FIG. 46, the game apparatus according to the present embodiment includes a video monitor 13 on the front side of a game apparatus casing 2. Speakers 14 are provided immediately below the video monitor 13. Light detection units 15 for detecting a position are provided on both side surfaces of the video monitor 13. The light detection units 15 may be provided on both sides of the upper surface of the video monitor 13.

An operation panel 11 is provided below the video monitor 13. A coin slot 11P is provided below the operation panel 11. Mounts 11Q on which tambourine-shaped operation device 80 are provided on both left and right sides of the operation panel 11.

The tambourine-shaped operation device 80 are connected to the game apparatus casing 2 by cables 80A. The operation device 80 are mounted on the mounts 11Q when not used, and when a game player uses the operation device 80, he takes up for operation the operation device from the mounts 11Q. A game player holds the tambourine-shaped operation device 80 in the left or the right hand, and, like a musical instrument, a tambourine, shakes and hits the operation device.

The game apparatus casing 2 below the video monitor 13 accommodates a game processing board 10 (not shown) for generally controlling the game apparatus, an operation device control board 16 (not shown) for controlling the tambourine-shaped operation device 80 to be operated by a game player, and a position detection board 17 (not shown) for detecting a position of the operation device.

An operation mat 4 is laid in front of the game apparatus casing 2. The game mat 4 is for positioning a game player with respect to the game apparatus casing 2. Footprints 4a, 4b for a first game player and a second game player are drawn on the operation mat 4.

In order to effectively make the game apparatus appealing even when the game apparatus is not used, the tambourine-shaped operation device 80 are formed semi-transparent. Cathode ray tubes (not shown), for example, are disposed inside the mounts 11Q. The operation device 80 are placed on the mounts 11Q when not used and illuminated by the cathode ray tubes, indirectly glowing. Thus, the tambourine-shaped operation device 80 appear afloat the game apparatus, appealing to game players.

(Tambourine-Shaped Operation Device)

The tambourine-shaped operation device 80 is shown in FIG. 47. FIG. 47A is a plan view of the tambourine-shaped operation device 90. FIG. 47B is a sectional view of the tambourine-shaped operation device along the line A-A'. FIG. 47C is a sectional view of the tambourine-shaped operation device along the line B-B'. FIG. 47D is a sectional view of the tambourine-shaped operation device along the line C-C'.

A shown in FIG. 47A, the operation device 80 has a shape like a percussion instrument, a tambourine, and has a D-shape having a part of a ring formed straight. The straight part of the D-shape is a grip 81 for a game player. A hit portion 82 is provided at the center of the curved part of the D-shape. Two couples of cymbal portions are provided respectively on both side of the hit portion 82.

As shown in FIG. 47B, the hit portion includes two hit switches provided on both sides of the curved portion, opposed to each other. In each hit switch 84, a switch button 84a is supported by a spring 84b, and a micro switch 84c is provided below the switch button 84a. When the switch button 84a is pressed down against the spring 84b, the micro switch 84c is turned on. A hit of the switch button 84a is detected.

In each cymbal portion 83, as in a musical instrument tambourine, a pair of cymbals or a set of four cymbals (not shown) are arranged swingably near each other. When the tambourine-shaped operation device 80 is shaken, two cymbals touch each other, producing percussion sounds characteristic of the tambourines.

As shown in FIGS. 47A and 47D, light emitting units 85, LEDs 85a, 85b, 85c, 85d are buried in the curved portion between the hit portion 82 and the cymbal portions 83. The LEDs 85a, 85d are mounted on a substrate 85e, and the LEDs 85c, 85d are mounted on a substrate 85f. The portions opposed to the light emitting parts of the LEDs 85a, 85b, 85c, 85d have higher transparency or thinned for higher transmittance. The insides of these portions are cut like a lens, whereby the lens-like effect causes the light to radially spread outside.

As shown in FIG. 47C, an angle of the LEDs 85a, 85b to the substrate 85e is fixedly set to be about 45 degrees to the main surface of the tambourine shape, i.e., the sheet of FIG. 47A. Similarly, as shown in FIG. 47D, an angle of the LEDs 85c, 85d to the substrate 85f is fixedly set to be about 45 degrees with the main surface of the tambourine shape, i.e., the sheet of FIG. 47A.

This arrangement of the LEDs 85a, 85b, 85c, 85d permits the light of one of the LEDs to reach the light detection units 15 even when a game player stand with the tambourine-shaped operation device 80 in the hand, opposed to the front of the video monitor 13 or when the game player stands leftward slant or rightward slant to the video monitor 13.

As shown in FIG. 47C and FIG. 47D, swing switches 86, 87 for detecting a swing of the operation device 80 are buried in the curved portion with the LEDs 85a, 85b, 85d, 85d buried in. In the swing switch 86, as shown in FIG. 47C a hollow portion 86c through which a magnet piece 86b is displaced has one end connected to one end of a lead switch 86a. In the swing switch 87, as shown in FIG. 47D, a hollow portion 87c through which a magnet piece 87b is displaced has one end connected to one end of a lead switch 87a. The hollow portion 86c of the swing switch 86 and the hollow portion 87c of the swing switch 87 have the longitudinal directions agreed with a swing direction of the operation device 80. When the operation device 80 is swung in one direction, and the magnet pieces are displaced to one end of the hollow portions 86c, 87c, one of the lead switches 86a, 87a of the swing switch 86, 87 turns on, the other turning off. A direction of the swing can be known by this.

Similarly, the hollow portions 86c, 87c may be provided in the lead switches 86a, 87a so that when the operation device 80 is swung in one direction, and the magnet pieces 86b, 87b are displaced to one ends of the hollow portions 86c, 87c, both the lead switches 86a, 87a of the swing switches 86, 87 turn on and off. One swing switch may be provided in the operation device 80.

(Method for Detecting Position of Operation Device)

In the method for detecting a position of the operation device 80, based on the same principle as in the above-described embodiments, light from the LEDs 85a, 85b, 85c, 85d is detected by the light detection units 15 to detect a position of the operation device. Because the operation device of the present embodiment is tambourine-shaped, for a vertical position, positions of the top and the bottom are judged, and for a horizontal position, positions of the left end, the middle portion and the right end are judged.

In the present embodiment, a spatial position with respect to the video monitor 13 is divided in 6 upper left, middle and right regions and lower left, middle and right regions. It is judged where a spatial position of the operation device 80 is in the 6 divided regions. A prescribed region of the video monitor 13 is divided in an upper left region UL, an upper middle region UC, an upper right region UR, a lower let region BL, a lower middle region BC, lower right region BR. Icons EC which indicate indicative positions are displayed in the respective regions. It is detected which one of the 6 divided regions, the upper left, middle and right regions, and the lower left, middle and right regions the operation device 80 indicates, and the icon EC in the indicated region or the surrounding of the icon EC is lighted. A blowout opening WK through which command marks are blown out is provided at the center of the 6 divided regions.

A game player grips the operation device 80 in the right or the left hand, and positions the operation device 80 upper or downward, or left, middle or right with respect to himself to swing or hit the operation device. Thus, by the use of the operation device, a game player can (a) indicate a spatial position which is upper left, middle or right, and lower left, middle or right, (b) hit the hit portion 84, or (c) swing the operation device 80 to turn on and off the swing switches 86, 87. Furthermore, these indications (a), (b), (c) may be combined.

When a game is played by two game players on the game apparatus according to the present embodiment, spatial positions of two tambourine-shaped operation device 80 operated by the respective game players must be detected. In the present embodiment, the operation device 80 of a left game player is detected by the left light detection unit 15, and the operation device 80 of a right game player is detected by the right light detection unit 15. The left and the right operation device 80 are discriminated from each other by making a light emitting cycle (e.g., 50 Hz) of the LEDs 85a, 85b, 85c, 85d of the operation device of a left game player different from a light emitting cycle (e.g., 100 Hz) of the LEDs 8a, 85b, 85c, 85d of the operation device 80 of a right game player.

(Structure of the Game Apparatus)

A structure of the game apparatus according to the present embodiment will be explained with reference to FIG. 49. The same or the same kinds of members as those of the embodiment shown in FIG. 7 are represented by the same reference numbers not to repeat or to simplify their explanation.

Figure 49:
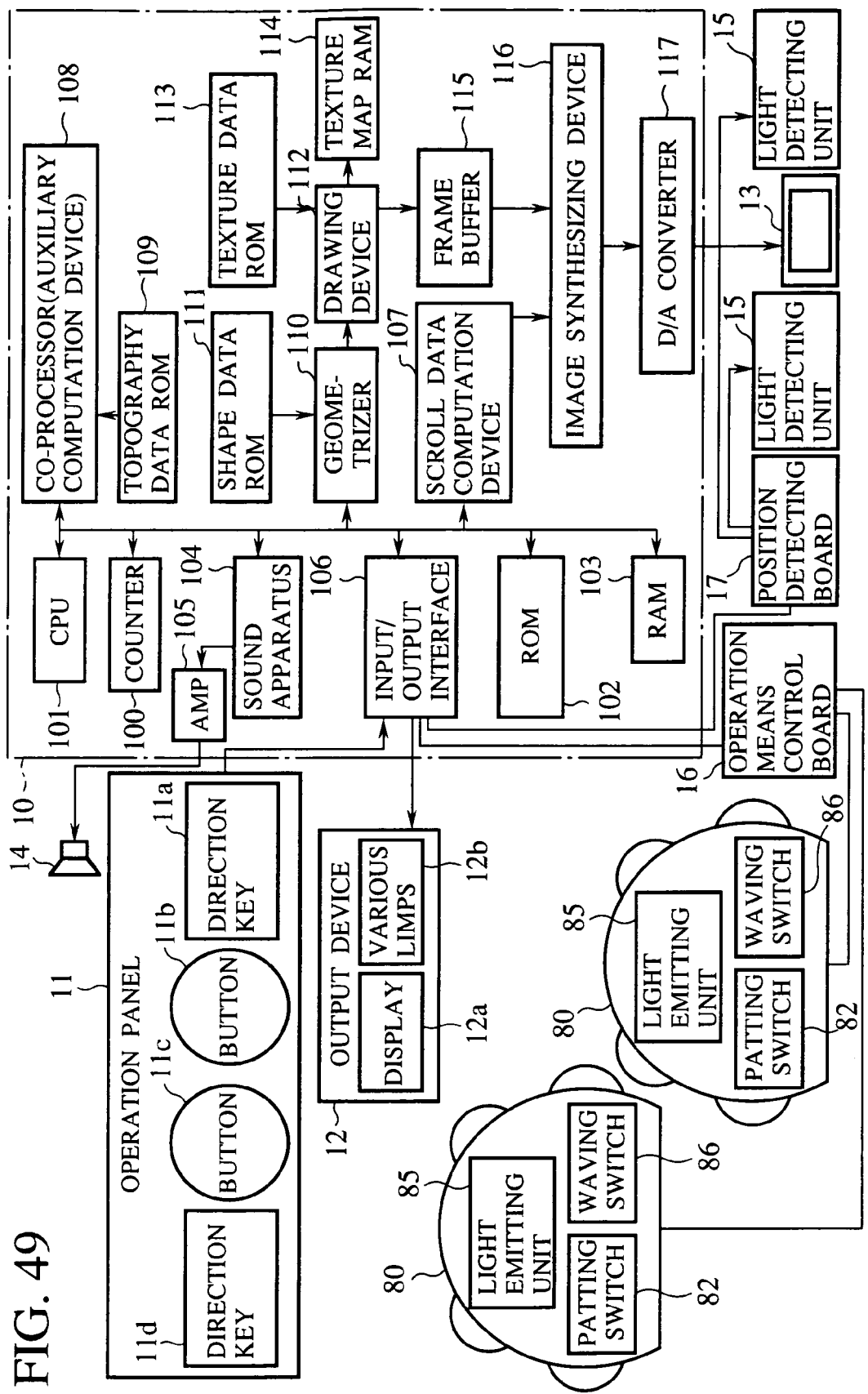
FIG. 49 is a block diagram of the game apparatus according to the sixth embodiment of the present invention.

As shown in FIG. 49, the game apparatus according to the present embodiment comprises a game processing board 10 for controlling the game apparatus, an operation panel 11 for inputting operations by a game player, output means 12 for making various notices to the game player, a video monitor 13 for displaying game images, and speakers 14 for outputting game sounds and voices.

The operation panel 11 is for two game players. Direction keys 11a, 11d for commanding directions, and buttons 11b, 11c for commanding operations are provided for the respective game players.

The game processing board 10 and the output means 12 have the same structures as in the above-described seventh embodiment shown in FIG. 7, and their explanation is omitted.

The game apparatus according to the present embodiment comprises an operation device control board 16 and a position detection board 17 which are connected to an input/output interface 106 of the game processing board 10. The tambourine-shaped operation device 80 are connected to the operation device control board 16. The light detection units 15 are connected to the position detection board 17.

(Summary of Music Game)

Figure 50A:
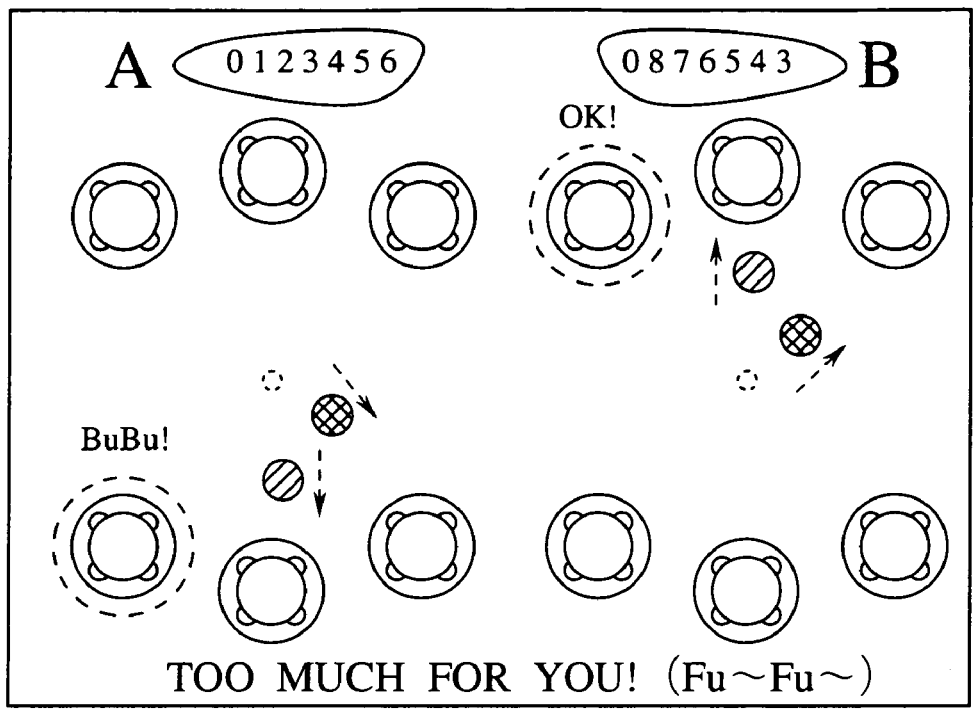
FIG. 50 is views of displays of a music game played on the game apparatus according to the sixth embodiment of the present invention.

A music game played on the game apparatus according to the present embodiment will be summarized with reference to FIGS. 50 and 51. FIGS. 50 and 51 show displays of the music game according to the present embodiment. The basic structure of the game displays will be explained with reference to FIG. 50A.

The screen of the video monitor 13 is bisected in a left and a right sides. The left side is a game screen for a first game player (1P), and the right side is a game screen for a second game player (2P). Each game screen is divided in 6 upper left, middle and right, and lower left, middle and right regions. Icons EC are provided in the respective regions. A blowout opening WK is provided at the center of the 6 regions. A text of a song is displayed at the bottom of the screen. The first and the second game players operate the operation device 80, watching their own screens to compete in the music game.

Figure 50B:
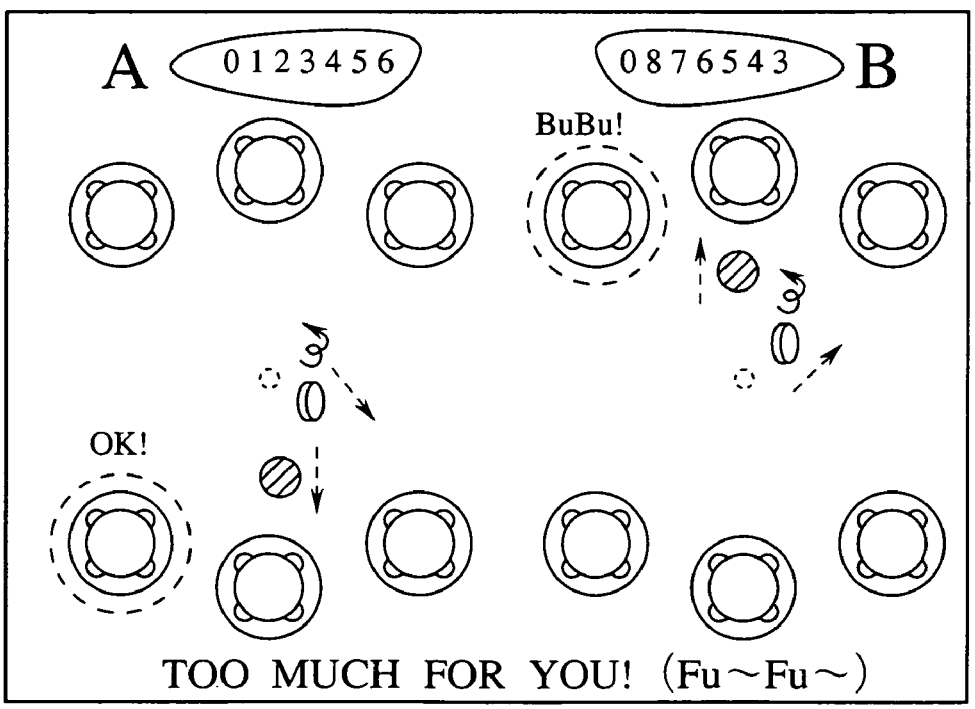

The surrounding of an icon EC indicated by the operation device 80, for example, the surrounding of the icon EC in the lower left region for the first game player on the left side of FIG. 50A and the surrounding of the icon EC in the upper left region for the second game player on the right side of the FIG. 50B, are lighted so that the respective game players can confirm the indicated positions. A text of a song changes in color and shape as in karaoke as the song proceeds.

When the music game is started, rhythm balls, command marks MK are generated to a rhythm of music through the blowout opening WK one after another. The command marks MK move to one of the icons in the 6 regions. On the left side in FIG. 50A for the first game player, a blue (hatched with slant lines) command mark MK moves to the icon EC in the lower middle region, and a red (hatched crossed lines) command mark MK moves to the icon EC in the lower right region. On the right side in FIG. 50A for the second game player, a blue command mark moves to the icon EC in the upper middle region, and a red command mark MK moves to the icon EC in the upper right region.

The game players take the operation device to the region the command marks MK are moving and operate the operation device 80 in manners which correspond to the colors of the command marks MK. That is, when the blue command mark MK is drawn into the icon EC, the game players hit the hit switches 84 of the tambourine-shaped operation device 80, and shake the tambourine-shaped operation device 80 to turn on the swing switches 86, 87.

When the game players succeed in operating the operation device 80 corresponding to the colors of the command marks MK, i.e., hitting corresponding to the blue command mark MK and shaking corresponding to the red command mark MK, "OK!" is displayed as shown on the right side of FIG. 50A. When they fail, as shown on the right side of FIG. 50A, "BOO!" is displayed. The game players can confirm correctness of their operations by this.

As red or blue command marks MK come out of the blowout opening WK one after another to a rhythm of music, game players operate the operation device 80 to point the operation device 80 to positions of icons command marks are moving to and operate the operation device 80 in manners corresponding to the command marks MK at a timing when the command marks MK arrive at the icons EC.

In the display of FIG. 50A, the hitting operation and the shaking operation of the tambourine-shaped operation device 80 are discriminated by the colors of the command marks MK. There is a risk that discriminating the hitting operation and the shaking operation from each other by colors alone may be confusing. Then, it is considered that command marks have indications which make command operations viscerally understood. As exemplified in FIG. 50B, a disc-shaped command mark MK for the shaking operation rolls or move, vibrating to an icon EC. This enables even game players who have not played the music game to correctly operate the operation device.

In the display shown in FIG. 51, a command to dynamically move the tambourine-shaped operation device 80 among a plurality of indicative positions is given. For example, a command to move the operation device 80 is displayed by a large arrow. A tambourine mark moves along the arrow. The operation device 80 is moved along the tambourine mark. Positions of the operation device 80 are incessantly detected to incessantly check whether the operation device 80 agrees with the tambourine mark moving along the arrow. It is judged whether or not the command is correctly executed.

Figure 51A:
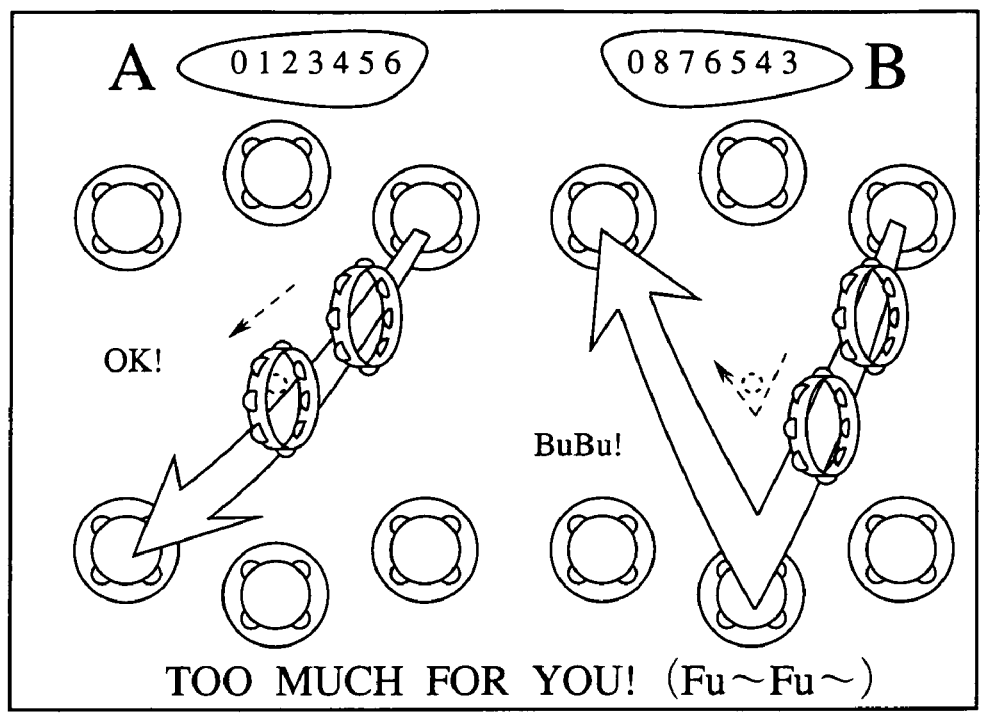
FIG. 51 is views of displays of he music game played on the game apparatus according to the sixth embodiment of the present invention.

In the display of FIG. 51A for a left game player, a large arrow is displayed from an indicative position on the upper right side to the lower left side. A tambourine mark moves along the arrow. The game player moves the tambourine-shaped operation device, shaking the same from the upper right indicative position to the lower left indicative position.

In the display of FIG. 51A for a right game player, a large Y-shaped arrow is displayed from an upper right indicative position to an upper left indicative position via a lower middle indicative position. A tambourine mark moves along the arrow. The game player moves the operation device, shaking the same from the upper right indicative position to the upper left indicative position via the lower middle indicative position.

Figure 51B:
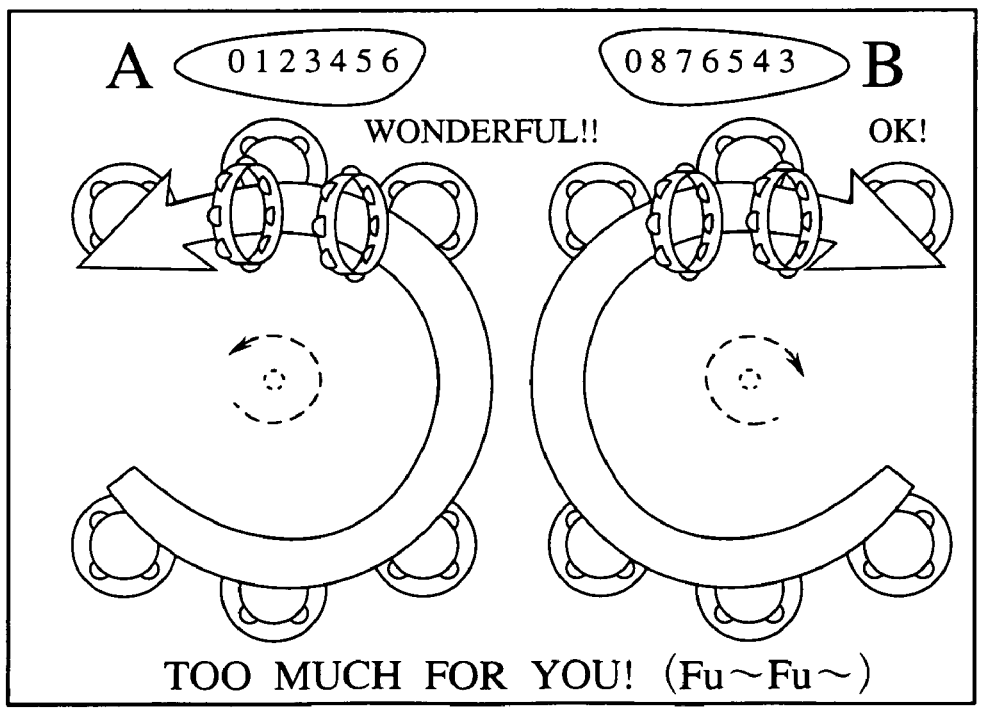

In the display of FIG. 51B for a left game player, a large arrow which starts at a lower left indicative position and makes one counter-clockwise round is displayed. A tambourine mark moves along the round arrow. The game player moves the operation device 80, shaking the same from the lower left indicative position, a lower middle indicative position, a lower right indicative position, an upper middle indicative position and to a upper left indicative position.

In the display of FIG. 51B for a right game player, a large arrow which starts at a lower right indicative position and make one clockwise round is displayed. A tambourine mark moves along the arrow. The game player moves the operation device, shaking the same from the lower right indicative position, a lower middle indicative position, an upper left indicative position, upper middle indicative position and an upper right indicative position.

For success and failure of an operation of a game player, as in the display of FIG. 51A, "OKAY!" and "BOO!" are displayed. When the operation device is operated with high precision, "WONDERFUL!" may be displayed as in the display of FIG. 51B.

In the present embodiment, as in the game shown in FIG. 51, a position of the tambourine-shaped operation mean 80 is incessantly detected. This is applicable to games in which letters, etc. on the screen are followed. For example, letters, e.g., "N", "A", "O", "I", "U", etc., are displayed, and the operation device is moved along the letters. It is judged whether the operation device has been correctly moved. Letters, e.g, "H", "B" and "E", which do not connect icons on displays, may be used. Simple Chinese letters, e.g., "月" or "火" marks, or others may be used. These letters, marks or others are displayed on the screen, and the operation device is operated to follow them. It is judged whether or not the operation device has been correctly operated.

Figure 52:
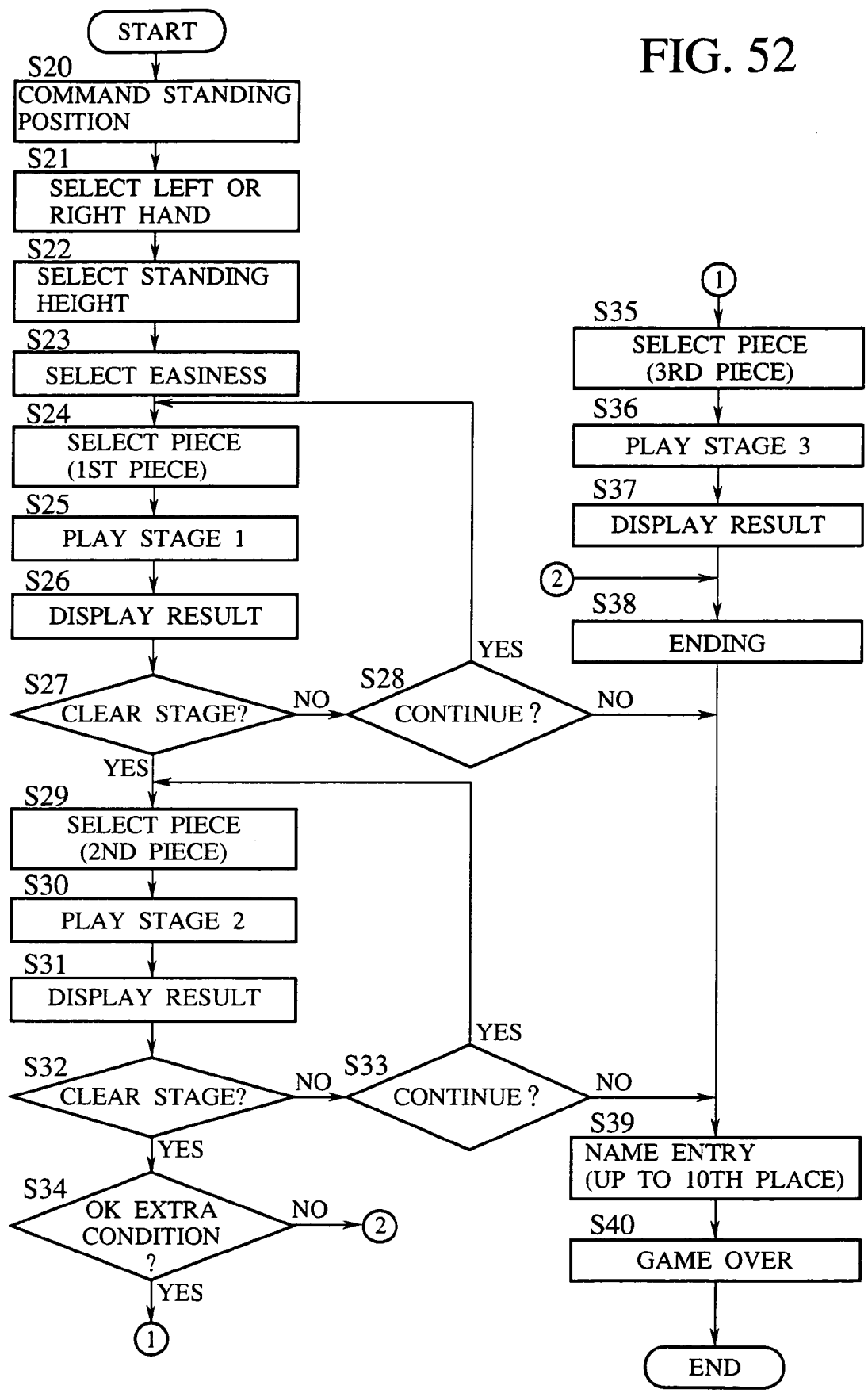
FIG. 52 is a flow chart of the music game played on the game apparatus according to the sixth embodiment of the present invention.

This technique is applicable to the name entry in Step S38 in FIG. 52 which will be described later. In the display of the name entry, a game player moves the operation device to sequentially inputs his name, and the game apparatus recognized the name.

In the name entry, it is necessary to judge letters by moving inputs supplied by a game player. Indicative positions by icons EC on the display may be less spaced from each other to increase icons. For example, 5 icons in the longitudinal direction and 5 icons in the lateral direction, totally 25 indicative positions are displayed, and a letter or a mark is recognized by indicative positions the operation device 80 has passed. No indicative position is provided, but as in recognition of handwritten letters, a letter or a mark may be recognized based on a trance of indicated positions by the operation device 80.

(Proceeding of the Music Game)

The proceeding of the music game played on the game apparatus according to the present embodiment will be explained with reference to FIGS. 52 and 53. FIG. 52 is a flow chart of the proceeding of the music game of the present embodiment. FIG. 53 is select displays of the music game of the present embodiment.

When the music game is started, positions where game players stand commanded (Step S20). The players are guided to stand at the footprints 4*a* on the mat 4.

Figure 53A:
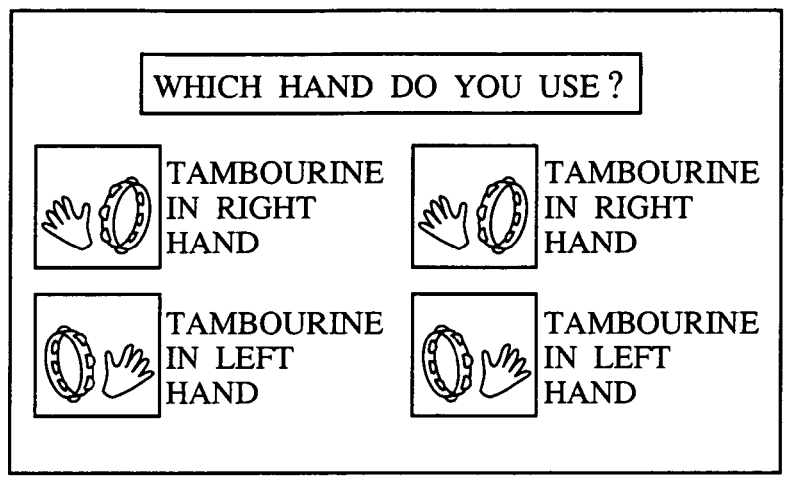
FIG. 53 is views of displays for setting parameters of the game apparatus according to the sixth embodiment of the present invention.

Next, the game players choose hand to grip the operation device 80 (Step S21). As shown in the display of FIG. 53A, "In which hand do you grip?" is displayed while the first left game player and the second right game player respectively select gripping the tambourine-shaped operation device in the right hand or in the left hand. This is because, in the present embodiment, positions of the operation device 80 with respect to game players are offset depending on whether they grip the operation device in the left hands or in the right hands, and accordingly positions for detecting the operation device 80 are corrected in advance.

Figure 53B:
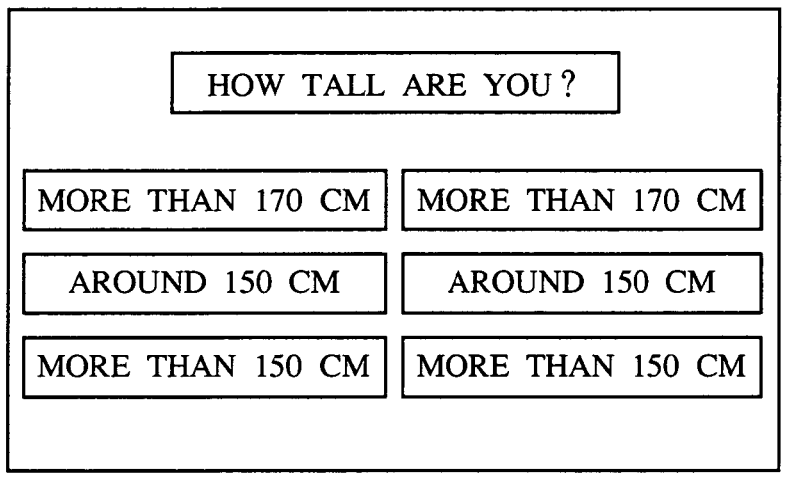
Figure 53C:
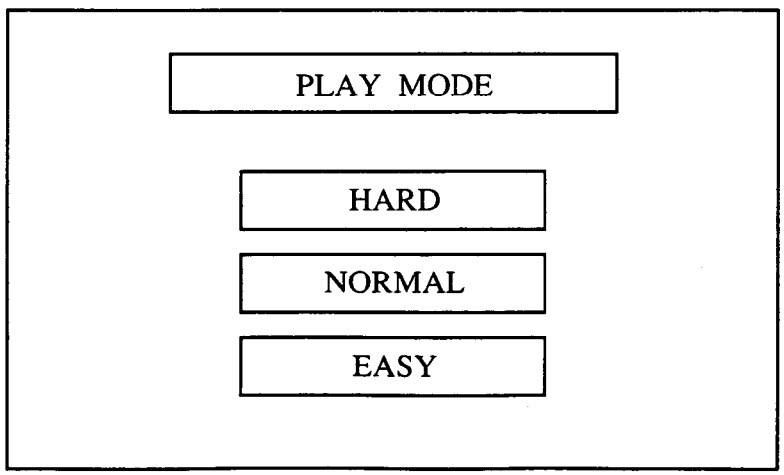

Next, heights of the game players are selected (Step S22). As shown in the display of FIG. 53B, "How tall are you?" is displayed while the first and the second game players select their heights roughly out of "more than 170 cm", "about 150 cm" and "more than 130 cm".

Then, difficulty of the game is selected (Step S23). As in the display of FIG. 53C, "PLAY Mode" is displayed while the first left game player and the second right game player select "HARD", "NORMAL" or "EASY" to select difficulty of the game.

Next, a song (one song) to be played on the first stage is selected (Step S24). Then, the music game of the first stage is executed to the song (Step S25). Subsequently, results of the music game of the first stage is displayed (Step S26). It is judged based on the results of the music game whether the first stage has been cleared (Step S27). When the first stage has not been cleared, it is asked whether or not the game is continued (Step S28). When the game is continued, Step S24 follows. When the game is not continued and ended, Step S39 follows. In the latter case, name entry is not necessary depending on a score of the game players, and Step S40 may be directly follow.

When the first stage has been cleared, songs (2 songs) to be played on the second stage are selected (Step S29). Then, the music game of the second stage is executed to the selected songs (Step S30). Subsequently, results of the music game of the second stage are displayed (Step S31). It is judged based on the results of the music game whether or not the second stage has been cleared (Step S32). When the second stage has not been cleared, it is asked whether or not the game is continued (Step S33). When the game is continued, Step S29 follows. When the game is not continued and ended, Step S39 follows. In the latter case, name entry is not necessary depending on a score of the game players, and Step S40 may be directly follow.

When the second stage has been cleared, it is judged whether the results are ones that admit the game players to proceed to the special stage where the game can be played to one more song as a bonus (Step S34). When the results admit the game players to the special stage, Step S35 follows, and when the results do not admit the game players to the special stage, Step S38 follows.

In the third stage of the special stage, the bonus song (the third song) played in the third stage is selected (Step S35). Then, the music game of the third stage is executed to the song (Step S36). Subsequently, results of the music game of the third stage is displayed (Step S26).

Next, an ending display of the music game is presented (Step S38). Then, when the result is within top tens, a name registration display is presented, and the name is entered (Step S40). An ending display of the music game is presented (Step S40).

The height selection display in Step S22 may be deleted, because the music game of the present embodiment uses the tambourine-shaped operation device 80, and a vertical position of the operation device 80 can be detected by simply detecting the top or the bottom of the operation device.

In the music game of the present embodiment, in order to detect a horizontal position of the operation device 80 it is necessary to detect the left end, the center or the right end of the operation device 80. Accordingly, it is preferable that the display of selecting a gripping hand of Step S21 is used. However, during the music game a position indicated by the operation device 80 is incessantly displayed. Based on the position display, game players can naturally adjust positions of the operation device 80. The display of selecting a gripping hand of Step S21 may be deleted.

As described above, according to the present embodiment, the tambourine-shaped operation device is operated to music, whereby game players can enjoy music, moving the bodies. The present embodiment enables the music game alone to be enjoyed. However, by applying the music game of the present embodiment to karaoke apparatuses, in karaoke, singing songs can be enjoyed but also designing dancing postures can be competed. Persons other a person who sings operate the operation device, whereby not only a singer but also other persons can participate in and enjoy karaoke.

A SEVENTH EMBODIMENT

Figure 54:
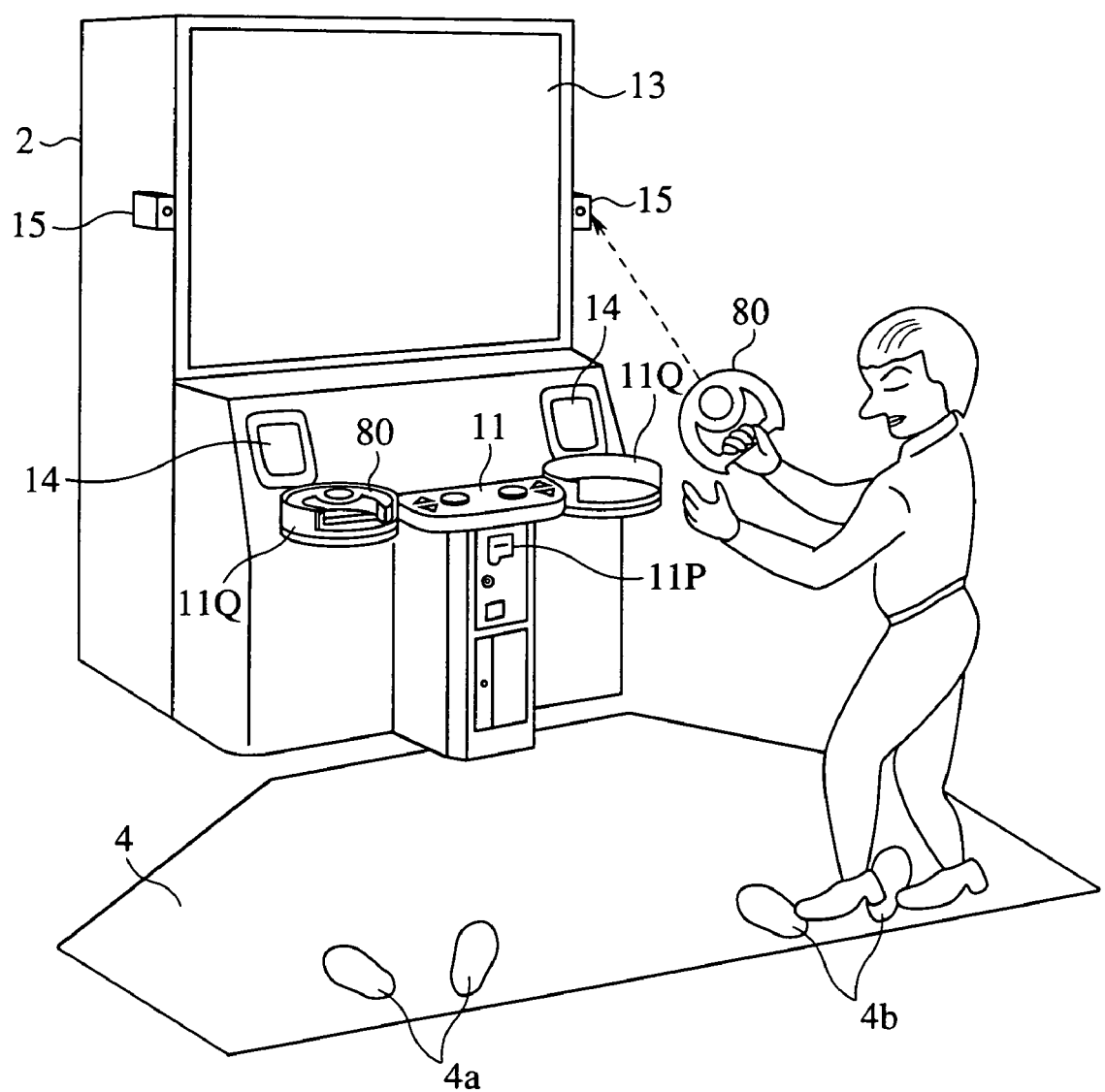
FIG. 54 is a schematic view of the game apparatus according to a seventh embodiment of the present invention.
Figure 55:
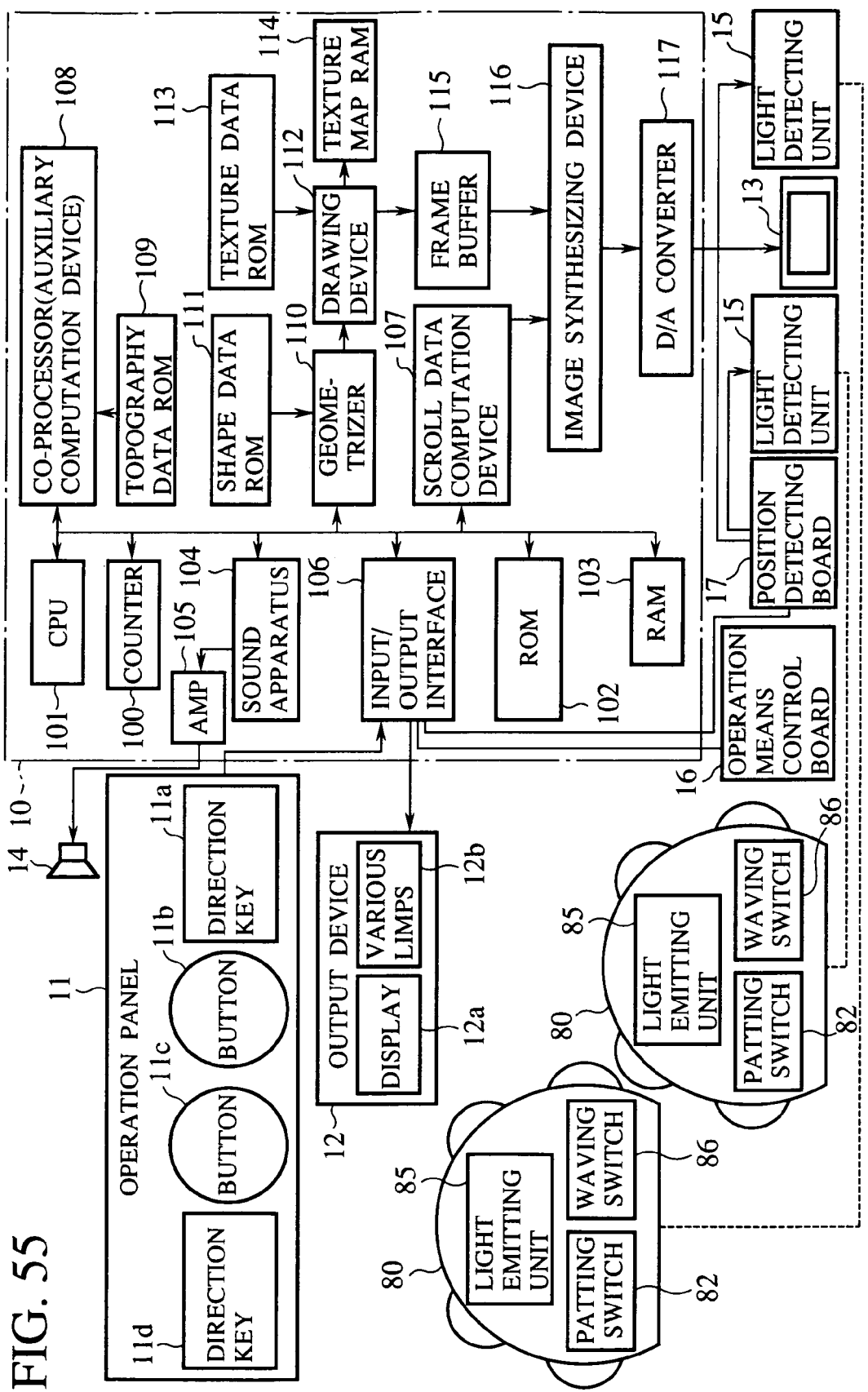
FIG. 55 is a block diagram of the game apparatus according to the seventh embodiment of the present invention.

The game apparatus according to a seventh embodiment of the present invention will be explained with reference to FIGS. 54 to 56. The same and the same kinds of members of the present embodiment as those of the sixth embodiment shown in FIGS. 46 to 53 are represented by the same reference numbers not to repeat or to simplify their explanation.

The basic structure of the game apparatus according to the present embodiment is the same as that of the game apparatus shown in FIG. 46 but is different from the latter in that, in the present embodiment, the tambourine-shaped operation device 80 is not connected to the game apparatus casing 2 by the cable 80A. In the present embodiment, the communication between the operation device 80 and the game apparatus casing 2 is made by transmitting photo-signals from the light emitting unit 85 of the operation device 80. That is, detected results of the hit switch 82 and the swing switch 86 are converted to photo-signal to be transmitted from the light emitting unit 85.

Figure 56A:
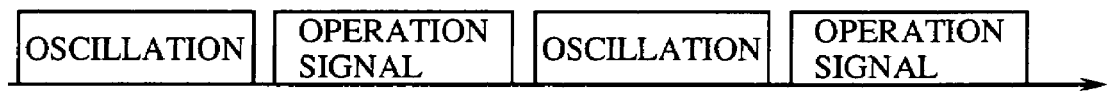
FIG. 56 is time charts of the game apparatus according to the seventh embodiment of the present invention, which explain a method for controlling the game apparatus.
Figure 56B:

Signals for detecting a position must be outputted from the light emitting unit 85 of the operation device 80. As shown in FIG. 56A, an oscillation signal for detecting a position and an operation signal are alternately transmitted. On the side of the game apparatus, as shown in FIG. 56B, the position detecting processing and the operation detecting processing are repeated in response to the photo-signals from the operation device 80.

The operation device 80 of the present embodiment incorporates a battery (not shown), such as dry batteries, a charged battery or others. It is possible that the battery is provided by a charged battery, and is changed while it is placed on the mount 11Q.

According to the present embodiment, the operation device is not connected to the game apparatus casing by a cable, which allows a game player to make free performances without considering the cable. No cable bothers a game player jumping, bending the knees and making turns. The game apparatus according to the present embodiment can be readily installed at places crowded with tables, chair, microphone cords, etc., such as karaoke boxes, etc.

The operation device can be easily replaced. A game player keeps his own operation device to play the game with his own operation device. The operation device can have his name and original designs.

The operation device has no cable. Neither cable trouble nor cable replacement takes place due to cable defects. Maintenance cost can be small.

For the prevention of steal of the operation device, the operation device may be connected to the game apparatus body or the mat with strings or others.

MODIFICATIONS

The present invention is not limited to the above-described embodiments. For example, programs for realizing the games of the above-described embodiments are provided by ROMs. However, the other constituent members are the same as those of the above-described embodiments, and may be provided by information storage mediums other than ROM. The information storage mediums can be memory cards, etc. which are supplied outside, memories in the game apparatus, information storage mediums such as HDD, etc. The information storage mediums can be rewritable information storage mediums and unrewritable information storage mediums such as CD-ROMs. The information storage mediums can be also other information storage mediums. The information storage mediums here are physical means storing information which can make the information processing means of the game apparatus perform prescribed functions, e.g., can make game programs executed.

The information storage medium includes, e.g., CD-Rs, game cartridges, floppy disks, magnetic tapes, photomagnetic disks, CD-ROMS, DVD-ROMS, DVD-RAMS, ROM cartridges, RAM memory cartridges with battery backup, flash memory cartridges, nonvolatile RAM cartridges, etc. The information storage medium also includes communication mediums of cable communication mediums, such as telephone circuits, etc., and of radio communication mediums, etc., such as microwave communication, etc., are included. The Internet is included in the communication mediums.

In the above-described embodiments, the present invention is applied to the game apparatus but is applicable to other electronic devices, such as personal computers, for control of games.

What is claimed is:

1. A game apparatus comprising:
a display unit having a display screen in front of which a game player takes a position;
an operation device to be operated by the game player;
a position detector configured to detect movements of said operation device; and
a game control unit,
the game control unit being configured to control a game progress by executing the acts of:
displaying at least four disappearance positions at outer areas on said display screen such that an inner area on the display screen is surrounded by said plurality of disappearance positions;
displaying a plurality of command marks on the display screen, which are blown out one after the other from a position in said inner area in concert with a rhythm of music, wherein each of the blown-out command marks moves from the appearance position toward one of said disappearance positions;
detecting, based on data detected by said detector, movements of said operation device operated by the game player who, at each time of blowing-out of the command marks, tries to move the operation device, in a timing before it disappears, along the movement of the command mark or toward one of the disappearance positions toward which the command mark moves; and
judging whether or not the directions of the movements of the operation device agree with the moving directions of the command marks as well as whether the movements of said operation device agree with the rhythm of music.

2. A game apparatus according to claim 1, further comprising a pair of said operation devices griped by hands of the game player, wherein said movement detection means detects movements of the operation devices operated by the game player.

3. A method for executing a game in response to a motion of a game player who takes in position in front of a monitor display connected to a game apparatus, the method comprising:
displaying on a display screen of said monitor display a least four target marks at outer areas on the display screen of the monitor with an inner area on the display screen surrounded by said outer areas;
displaying on the display screen a plurality of command marks which are blown out one after the other from said inner area in concert with a rhythm of music outputting from a speaker, wherein each of the blown-out command marks moves from the blown-out position toward one of said target marks and eventually disappears;
detecting, by a detecting means connected to said game apparatus, movements of hands of the game player, who, at each time of blowing-out of the command marks, tries to move, in a timing before it disappears, one of the hands along the movement of the command mark or toward one of the target marks toward which the command mark moves; and
judging whether or not the directions of the hand movements agree with the moving directions of the command marks as well as whether the hand movements agree with the rhythm of music.

4. A method for executing a game in response to a motion of a game player who takes a position in front of a monitor display connected to a game apparatus, the method comprising:
displaying on a display screen of the monitor display a plurality of target positions at outer areas on the display screen of the monitor with an inner area on the display screen surrounded by said outer areas;
displaying on the display screen a plurality of command marks which are blown out one after the other from said inner area in concert with a rhythm of music outputting from a speaker, wherein each of the blown-out command marks moves from the appearance position toward one of said target positions and eventually disappears;
detecting, with a detecting means connected to said game apparatus, movements of hands of the game player, who, at each time of blowing-out of the command marks, tries to move, in a timing before it disappears, one of the hands along the movement of the command mark or toward one of the target positions toward which the command mark moves; and
judging whether or not the directions of the hand movements agree with the moving directions of the command marks as well as whether the hand movements a agree with the rhythm of music.

5. A game apparatus comprising:
a display unit having a display screen;
a position detector configured to detect movements of hands of a game player who takes a position in front of said display screen; and
a game control unit,
wherein said game control unit controls a game progress by executing the acts of:
displaying on the display screen a plurality of disappearance positions at outer areas on the display screen with an inner area on the display screen surrounded by said outer areas;
displaying a plurality of command marks on the display screen, which are blown out one after the other from a position in the inner area in concert with a rhythm of music, wherein each of the blown-out command marks moves from the appearance position toward one of said plurality of disappearance positions and disappears at said one of the disappearance positions toward which the command mark moves;

detecting, based on data detected by said detector, movements of hands of the game player, who, at each time of blowing-out of the command marks, tries to move, in a timing before it disappears, one of the hands along the movement of the command mark or toward one of the disappearance positions toward which the command mark moves; and judging whether or not the directions of the hand movements agree with the moving directions of the command marks as well as whether the hand movements agree with the rhythm of music.

6. A game apparatus, comprising:

game control means;

image generator means which generates image data for displaying game elements on a display screen of a display unit;

a sound generator which outputs a sound from a speaker; and movement detection means which detects movements of a game player who takes a position in front of the screen of said display unit, wherein said game control means controls a game progress by executing the acts of:

displaying on the display screen a least four target marks at outer areas on the display screen of the monitor with an inner area on the display screen surrounded by said outer areas;

displaying command marks which are blown out one after the other from the inner area on said display screen in concert with a rhythm of music outputting from the speaker, wherein each of the command marks moves from the blown-out position toward one of said target marks and eventually disappears;

detecting, based on data detected by said movement detection means, movements of hands of the player who, at each time of blowing-out of the command marks, tries to move, in a timing before it disappears, one of the hands along the movement of the command mark or toward one of the target marks toward which the command mark moves; and judging whether or not the directions of the hand movements agree with the moving directions of the command marks as well as whether the hand movements agree with the rhythm of music.

7. A game apparatus, comprising:

game control means;

image generator means which generates image data for displaying game elements on a display screen of a display unit;

a sound generator which outputs a sound from a speaker; and movement detection means which detects movements of a game player who takes a position in front of the screen of said display unit, wherein said game control means controls a game progress by executing the acts of:

displaying on the display screen a least four target marks at outer areas on the display screen of the monitor with an inner area on the display screen surrounded by said outer areas;

displaying moving marks which are blown out one after the other from the inner area on said display screen in concert with a rhythm of music outputting from the speaker, wherein each of the moving marks moves from the blown-out position toward one of said target marks, wherein each of the moving marks eventually disappears;

detecting, based on data detected by said movement detection means, movements of hands of the player who, at each time of blowing-out of the moving marks, tries to move, in a timing before it disappears, one of the hands along the movement of the moving mark or toward one of the target marks toward which the moving mark moves; and judging whether or not the directions of the hand movements agree with the moving directions of the moving elements as well as whether the hand movements agree with the rhythm of music.

8. A game apparatus comprising:

game control means;

a monitor display;

sound generating means which outputs a sound from a speaker;

image generator means which generates image data to display game elements on the monitor display; and movement detection means which detects movements of a game player who take a position in front of said monitor display, wherein said game control means controls a game session by executing the acts of:

displaying on a display screen of said monitor display at least four target marks at outer areas on the display screen of the monitor;

displaying moving elements which appear one after the other from an inner area surrounded by said outer areas on said display screen in concert with a rhythm of music outputting from the speaker wherein each of the appeared moving elements moves toward one of said target marks, wherein each of the moving marks eventually disappears;

detecting, based on data detected by said movement detection means, movements of hands of the player who, at each appearance of the moving elements, tries to move, in a timing before it disappears, one of the hands toward one of the target marks to which the appeared moving element moves; and judging whether or not the directions of the hand movements agree with the moving directions of the moving elements as well as whether the hand movements agree with the rhythm of music.

9. A game apparatus comprising:

game control means;

a monitor display;

sound generating means which outputs a sound from a speaker;

image generator means which generates image data to display game elements on the monitor display; and movement detection means which detects movements of a game player who take a position in front of said monitor display, wherein said game control means controls a game session by executing the acts of:

displaying on a display screen of said monitor display at least four target marks at outer areas of the display screen of the monitor;

displaying moving elements which appear one after the other from a center area surrounded by said outer areas on said display screen in concert with a rhythm of music outputting from the speaker wherein each of the appeared moving elements moves toward one of said target marks, wherein each of the moving marks eventually disappears;

detecting, based on data detected by said movement detection means, movements of hands of the player who, at each appearance of the moving elements, tries to move, in a timing before it disappears, one of the hands toward one of the target marks to which the appeared moving element moves; and judging whether or not the directions of the hand movements agree with the moving directions of the moving elements as well as whether the hand movements agree with the rhythm of music.

* * * * *